US008082502B2

(12) United States Patent
Ijichi et al.

(10) Patent No.: US 8,082,502 B2
(45) Date of Patent: Dec. 20, 2011

(54) DISPLAY CONTROL APPARATUS, RECORDING MEDIA, DISPLAY CONTROL METHOD, AND DISPLAY CONTROL PROGRAM

(75) Inventors: Susumu Ijichi, Kanagawa (JP); Satoshi Araki, Kanagawa (JP); Ryo Mukaiyama, Tokyo (JP)

(73) Assignee: Sony Corporation, Tokyo (JP)

( * ) Notice: Subject to any disclaimer, the term of this patent is extended or adjusted under 35 U.S.C. 154(b) by 986 days.

(21) Appl. No.: 11/780,276

(22) Filed: Jul. 19, 2007

(65) Prior Publication Data

US 2008/0018625 A1 Jan. 24, 2008

(30) Foreign Application Priority Data

Jul. 21, 2006 (JP) ................................ 2006-200040

(51) Int. Cl.
*G06F 3/00* (2006.01)
*G06F 3/048* (2006.01)

(52) U.S. Cl. ......... 715/716; 715/764; 715/810; 715/704

(58) Field of Classification Search .................. 715/716, 715/704

See application file for complete search history.

(56) References Cited

U.S. PATENT DOCUMENTS 4,615,024 A * 9/1986 Usui ............................ 369/59.1
6,204,441 B1 * 3/2001 Asahi et al. ................. 84/470 R
6,222,947 B1 * 4/2001 Koba ............................ 382/284
2005/0108319 A1 5/2005 Kohno et al.
2006/0032360 A1 * 2/2006 Mizuno ......................... 84/483.2
2007/0165614 A1 * 7/2007 Kimura ......................... 370/356

FOREIGN PATENT DOCUMENTS

| | | |
|---|---|---|
| JP | 07-121348 | 5/1995 |
| JP | 08-063321 | 3/1996 |
| JP | 08-335387 | 12/1996 |
| JP | 09-198221 | 7/1997 |
| JP | 10-293856 | 11/1998 |
| JP | 11-272675 | 10/1999 |
| JP | 2001-266470 | 9/2001 |
| JP | 2001-352523 | 12/2001 |
| JP | 2002-055993 | 2/2002 |
| JP | 2003-045165 | 2/2003 |

(Continued)

OTHER PUBLICATIONS

U.S. Appl. No. 11/774,776, filed Jul. 9, 2007, Araki, et al.

(Continued)

*Primary Examiner* — Boris Pesin
*Assistant Examiner* — Sabrina Greene
(74) *Attorney, Agent, or Firm* — Oblon, Spivak, McClelland, Maier & Neustadt, L.L.P.

(57) ABSTRACT

A display control apparatus is provided for controlling displaying of a play list specifying a reproduction sequence of a plurality of pieces of content. The display control apparatus has a play list feature extraction block configured to extract a feature of a play list on the basis of a plurality of content belonging to the play list, a display pattern selection block configured to select a display pattern for displaying the play list on the basis of the feature of the play list, the feature being extracted by the feature extraction block, and a control block configured to execute control such that the play list is displayed on a display block on the basis of the display pattern selected by the display pattern selection block. The novel configuration provides new ways of enjoying content.

15 Claims, 47 Drawing Sheets

FOREIGN PATENT DOCUMENTS

| | | |
|---|---|---|
| JP | 2003-123268 | 4/2003 |
| JP | 2003-162285 | 6/2003 |
| JP | 2004-046695 | 2/2004 |
| JP | 3520030 | 2/2004 |
| JP | 2004-078484 | 3/2004 |
| JP | 2004-213858 | 7/2004 |
| JP | 2004-234807 | 8/2004 |
| JP | 2004-280624 | 10/2004 |
| JP | 2005-079988 | 3/2005 |
| JP | 2005-100541 | 4/2005 |
| JP | 2005-172948 | 6/2005 |
| JP | 2005-324464 | 11/2005 |
| JP | 2006-018878 | 1/2006 |
| JP | 2008-018879 | 1/2006 |
| JP | 2006-119572 | 5/2006 |
| JP | 2006-190385 | 7/2006 |
| JP | 2006-190465 | 7/2006 |
| JP | 2006-252598 | 9/2006 |
| JP | 2007-213748 | 8/2007 |
| JP | 2007-293385 | 11/2007 |
| JP | 2008-027536 | 2/2008 |

OTHER PUBLICATIONS

U.S. Appl. No. 11/778,920, filed Jul. 17, 2007, Ijichi, et al.

* cited by examiner

DISPLAY CONTROL APPARATUS, RECORDING MEDIA, DISPLAY CONTROL METHOD, AND DISPLAY CONTROL PROGRAM

CROSS REFERENCES TO RELATED APPLICATIONS

The present invention contains subject matter related to Japanese Patent Application JP 2006-200040 filed in the Japan Patent Office on Jul. 21, 2006, the entire contents of which being incorporated herein by reference.

BACKGROUND OF THE INVENTION

1. Field of the Invention

The present invention relates to a display control apparatus, a recording media, a display control method, and a display control program that are configured to be suitably applicable to controlling the displaying of a play list indicative of a sequence in which two or more pieces of content are reproduced, for example.

2. Description of the Related Art

Recently, content reproducing apparatuses have been widespread in which content (music data for example) recorded to a hard disk drive is read for reproduction and content accumulated in a server is downloaded for reproduction. These content reproducing apparatuses are configured to reproduce content on the basis of a play list and allow each user to select desired content from this play list displayed on a predetermined display monitor.

Also, a content reproducing apparatus is proposed in which a play list is displayed not as a mere content list but as a list regarded as a radio station broadcast list, thereby allowing each user to select desired content in a feeling in which the user tunes in on radio stations (refer to Japanese Patent Laid-open No. 2003-162285 for example).

SUMMARY OF THE INVENTION

The above-mentioned related-art content reproducing apparatus is configured so as to provide each user an operation system having a different operation feeling from that of traditional counterpart by displaying a play list regarded as a radio station's broadcast list. However, in the viewpoint of providing the enjoyment of reproducing content in a form determined by the production side, the above-mentioned traditional technology is not different from displaying a play list as a mere content list.

Therefore, the present invention addresses the above-identified and other problems associated with traditional methods and apparatuses and solves the addressed problems by providing an display control apparatus, a recording media, a display control method, and a display control program that are configured to provide a novel way of enjoying content.

In carrying out the invention and according to one embodiment thereof, there is provided a display control apparatus having a play list feature extraction block configured to extract a feature of a play list on the basis of a plurality of content belonging to the play list, a display pattern selection block configured to select a display pattern for displaying the play list on the basis of the feature of the play list, the feature being extracted by the feature extractor, and a control block configured to execute control such that the play list is displayed on a display block on the basis of the display pattern selected by the display pattern selection block.

Consequently, the above-mentioned play list specifying the reproduction sequence of content can be displayed in a display pattern suitable for the feature of that play list.

As described and according to the present invention, a display control apparatus has a play list feature extraction block configured to extract a feature of a play list on the basis of a plurality of pieces of content belonging to the play list, a display pattern selection block configured to select a display pattern for displaying the play list on the basis of the feature of the play list, the feature being extracted by the play list feature extraction block, and a control block configured to execute control such that the play list is displayed on a display block on the basis of the display pattern selected by the display pattern selection block. This novel configuration allows each play list to be displayed in a display pattern suitable for the feature of that play list, thereby realizing a display control apparatus, a recording media, a display control method, and a display control program that can provide new ways of enjoying content.

BRIEF DESCRIPTION OF THE DRAWINGS

Other features of the invention will become apparent from the following description of embodiments with reference to the accompanying drawings in which.

DETAILED DESCRIPTION OF THE PREFERRED EMBODIMENTS

This invention will be described in further detail by way of embodiments thereof with reference to the accompanying drawings.

(1) Basic Configuration

First, a basic configuration of the present invention will be described below, followed by the description of a first embodiment of the invention, a second embodiment of the invention, a third embodiment of the invention, and a fourth embodiment of the invention.

Figure 1:
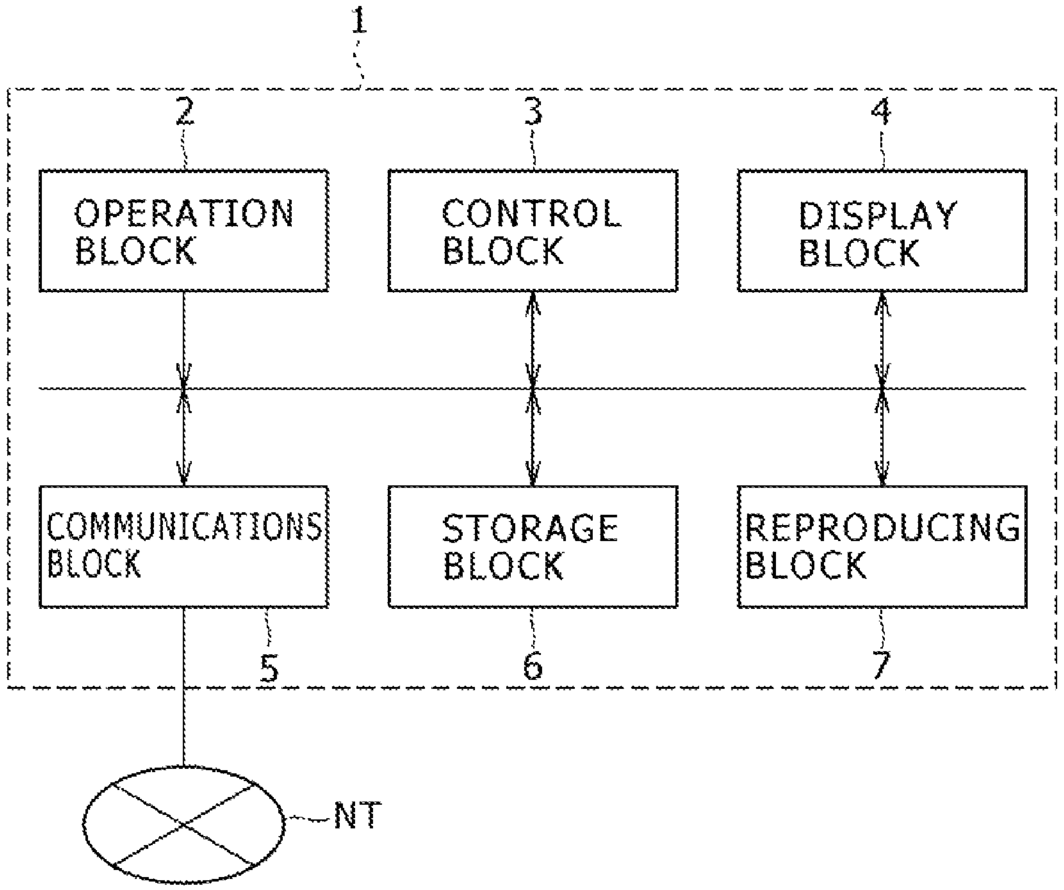
FIG. 1 is a block diagram illustrating an exemplary configuration of a content reproducing apparatus that provides a basic configuration of the present invention.

Now, referring to FIG. 1, reference numeral 1 denotes functional blocks of a content reproducing apparatus that provides a basic configuration of the present invention. This content reproducing apparatus 1 is configured such that a control block 3 controls the other functional blocks as instructed by an operation block 2, thereby executing various kinds of processing.

The content reproducing apparatus 1 is also configured to handle music data as content and have a plurality of functions associated with music data recording and reproduction. The control block 3 is configured to switch between these functions as instructed from the operation block 2 and accordingly display GUI (Graphical User Interface) screens corresponding to these functions onto a display block 4. It is assumed here that the music data to be handled be data corresponding to each piece of music (or each music track). It is also assumed here that the terms music data and music track have the same meanings as audio data and audio track, respectively.

To be more specific, if instructed through the operation block 2 to switch to the function for downloading music data (hereafter also referred to as a download function), for example, the control block 3 of the content reproducing apparatus 1 displays a GUI screen corresponding to the download function. Subsequently, if instructed to download music data, the control block 3 accordingly receives the music data from a music providing server, not shown, from a network NT through a communications block 5, storing the received music data into a storage block 6.

Further, if instructed through the operation block 2 to switch to a function for recording a CD (Compact Disc) (hereafter also referred to as a CD recording function), the control block 3 of the content reproducing apparatus 1 displays a GUI screen corresponding to the CD recording function onto the display block 4. Subsequently, if instructed to record a CD, the control block 3 reads music data from a CD, not shown, loaded on the content reproducing apparatus 1 and decompresses the read music data, storing the resultant music data into the storage block 6.

Still further, if instructed through the operation block 2 to switch to a function for reproducing music data (hereafter also referred to as a normal reproducing function), the control block 3 of the content reproducing apparatus 1 displays a GUI screen corresponding to the normal reproducing function onto the display block 4. Subsequently, if instructed to reproduce the music data, the control block 3 accordingly reads the music data from the storage block 6 and causes a reproducing block 7 to execute various kinds of reproduction processing on the music data, such as decompression, equalizing, digital-to-analog conversion, and amplification, for example, outputting the music (namely, a music track) based on this music data.

Yet further, if instructed through the operation block 2 to switch to a function for CD reproduction (hereafter also referred to a CD reproducing function), then the control block 3 of the content reproducing apparatus 1 displays a GUI screen corresponding to the CD reproducing function onto the display block 4. Subsequently, if instructed to reproduce a CD, the control block 3 reads music data from a CD, not shown, loaded on the content reproducing apparatus 1 and causes the reproducing block 7 to execute the reproduction processing on the read music data, outputting music (or a music track) based on the resultant music data.

Thus, the control block 3 of the content reproducing apparatus 1 executes various kinds of processing in accordance with various functions.

In addition to the above mention functions, the content reproducing apparatus 1 has a function configured to provide music (or music tracks) stored in the storage block 6 to each user in a feeling in which the user listens to the music broadcast from a radio station (this function hereafter referred to also as a MusicStation function), which will be described below.

First, a method of managing music data by the content reproducing apparatus 1 in correspondence with the reproduction of music by the MusicStation function will be described below.

Figure 2:
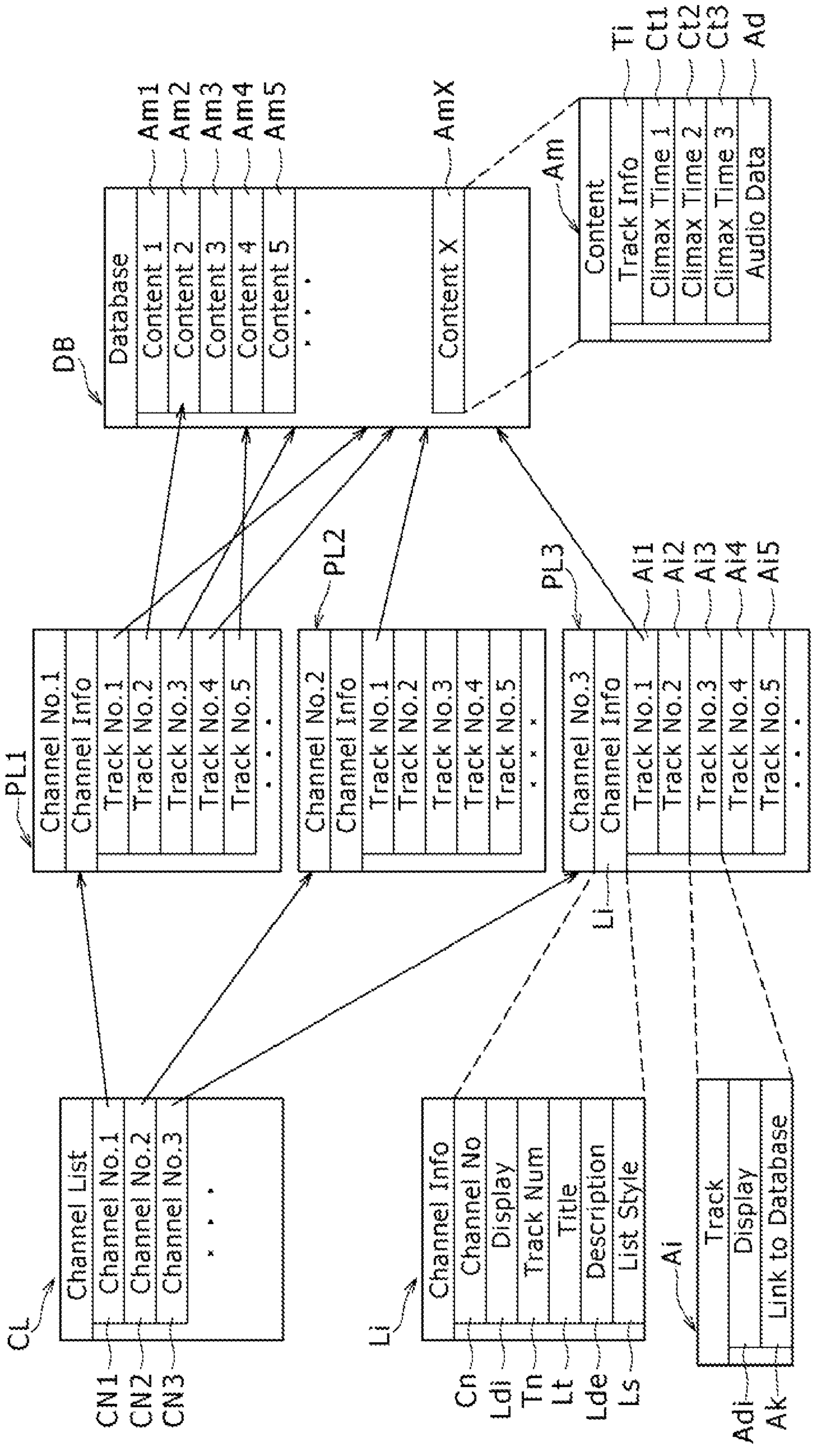
FIG. 2 is a schematic diagram illustrating an exemplary way of managing music data by the above-mentioned content reproducing apparatus.

As shown in FIG. 2, a database DB configured to manage music data Ad is constructed in the storage block 6. This database DB individually manages a plurality of music data Ad by a plurality of items of music data management information Am (Am1 through AmX). In addition to music data Ad, each of music data management information Am includes information Ti (hereafter referred to also as attribute information), such as music title, artist name, genre, recording date, reproducing time, cover photo, reproduction count, importance, and music feature corresponding to music data Ad. Music data management information Am also includes a plurality of feature positional information Ct (Ct1 through Ct3, for example) indicative of a feature reproduction position (such as a chorus position and a melody change position, being hereafter also referred to as feature positions) based on this music data Ad.

It is assumed here that the characteristic of each music track indicated in attribute information Ti be an impression value (a numeric value indicative of tempo, gaiety, tone quality, for example) obtained as a result of 12-tone analysis on music data Ad, for example. Also, it is assumed that attribute information Ti and feature positional information Ct (Ct1 through Ct3) be information that is provided by a music providing server, for example.

In addition, the storage block 6 stores a plurality of play lists (PL1 through PL3, . . . ) for managing the sequence of reproducing music data Ad. Each of these play lists corresponds to a list of music to be broadcast on each channel of each radio station, hereafter being sometimes referred to as channel play lists PL (PL1 through PL3, . . . ).

Each of these channel play lists is a list in which music data information Ai (Ai1 through Ai5, . . . ) that is content identification information for each music data Ad to be reproduced is arranged in sequence of music to be reproduced. The sequence of reproducing music data Ad is managed by music data information Ai (Ai1 through Ai5, . . . ) arranged in this sequence of music to be reproduced. It should be noted that the sequence of reproducing music data information Ai (Ai1 through Ai5, . . . ) provides the music numbers of music data information Ai (Ai1 through Ai5, . . . ) without change.

Each of music data information Ai (Ai1 through Ai5, . . . ) includes a link Ak to music data Ad in the database DB, the music data Ad to be reproduced being specified by this link AK. Also, each of the music data information Ai (Ai1 through Ai5, . . . ) includes music data reproduction setting Adi indicative of enabling or disabling, on a music data Ad basis, the reproduction of music data Ad to be specified by link Ak.

Namely, each of channel play lists PL (PL1 through PL3, . . . ) has a reproduced music sequence of music data Ad and the reproduction setting (namely, reproduction enabled or reproduction disabled) on a music data Ad basis.

Further, each of channel play lists PL (PL1 through PL3, . . . ) includes list information Li that is list identification information for each channel play list PL. This list information Li has channel number Cn allocated to channel play list PL, list reproduction setting Ldi indicative of enabling or disabling, on a channel play list basis, the reproduction of music data Ad registered in channel play list PL, the number of music data information Ai Tn in channel play list PL (namely, the number of music data registered in channel play list PL, thereafter also being referred to as registered data count), list name Lt that is the name of channel play list PL, list description Lde that is the description of channel play list PL, and music sequence setting Ls in channel play list PL.

It should be noted that list reproduction setting Ldi can normally be set either to "reproduction enabled" or "reproduction disabled" by the user (a method of this setting will be described later). There is at least one channel play list with this list reproduction setting Ldi fixed to "reproduction enabled". Namely, this channel play list is always enabled for the reproduction of music data Ad and therefore hereafter also referred to as a default play list DPL. The list description Lde has a text specifically describing each channel play list PL (for example, "cheerful music numbers have been collected") and a keyword (for example, "cheerful") indicative of the characteristic of this channel play list PL. In addition, music setting Ls has information that music data Ad is reproduced in a fixed reproduction sequence (namely, in the sequence of list) indicated in channel play list PL and information that reproduction is executed by randomly sorting the reproduction sequence shown in channel play list PL.

Further, the storage block 6 stores a list CL of channels usable by the MusicStation function (hereafter referred to as a channel list), in addition to the plurality of channel play lists PL (PL1 through PL3, . . . ). This channel list CL is a list of a plurality of channel numbers CN (CN1 through CN3, . . . ) arranged in the sequence of numbers, the channel numbers CN corresponding to channel numbers Cn allocated to channel play lists PL. Namely, this channel list CL is configured to manage a plurality of channel lists PL (PL1 through PL3, . . . ) by channel numbers CN.

It should be noted that the channels usable in the MusicStation function and the channel play lists PL (PL1 through PL3, . . . ) need not correspond with each other one by one; namely, a plurality of channel play lists PL may be allocated to one channel.

As described above, the content reproducing apparatus 1 manages a plurality of channel play lists PL by channel list CL and manages the reproduction sequence of music data Ad by each of the plurality of channel play lists PL.

It should be noted that the above-mentioned channel play lists PL (PL1 through PL3, . . . ) to be handled by the MusicStation function include such channel play lists PL configured on the basis of a reproduction count indicated in attribute information Ti of music data Ad as a channel play list PL made up of music data Ad corresponding to a newly added music track (hereafter referred to also as a newly added list) and a channel play list PL made up of music data Ad corresponding to a music track that has been reproduced infrequently (or frequently) (hereafter referred to also as an infrequently (or frequently) reproduced music track list). The above-mentioned channel play lists PL (PL1 through PL3, . . . ) further include such channel play lists PL configured on the basis of music impression values indicated in attribute information Ti of music data Ad as a channel play list PL made up of music data Ad corresponding to rhythmic music (hereafter referred to also as a rhythmic music list) and a channel play list made up of music data Ad corresponding to cheerful music (hereafter referred to also as a cheerful music list). The above-mentioned channel play lists PL (PL1 through PL3, . . . ) still further include such channel play lists PL configured on the basis of genre indicated in attribute information Ti of music data Ad as a channel play list PL made up of music data Ad corresponding to classical music (hereafter referred to also as a classical music list) and a channel play list PL made up of music data Ad corresponding to heavy metal (hereafter referred to also as a heavy metal music list), for example.

The channel play list PL based on reproduction count is automatically updated every time music data Ad is newly stored in the storage block 6 and every time music data Ad is reproduced.

To be more specific, the frequently reproduced music list PL has keywords, such as "reproduction count" and "top 10", for example. After newly storing music data Ad or reproducing music data Ad, the control block 3 of the content reproducing apparatus 1 chooses 10 tracks of music data Ad that have been reproduced most frequently from music data stored in the storage block 6 on the basis of these keywords "reproduction count" and "top 10", thereby updating the frequently reproduced music list PL so as to configure this music list with the selected music data Ad.

The channel play list PL based on music impression value and the channel play list PL based on genre are automatically updated every time music data Ad is newly stored in the storage block 6. To be more specific, the cheerful music list PL has "cheerful" as a keyword, for example. After newly storing music data Ad into the storage block 6, the control block 3 of the content reproducing apparatus 1 updates this cheerful music list PL so as to additionally register this music data Ad to the cheerful music list PL if the value indicative of the cheerfulness of the impression value of newly stored music data Ad is found higher than a predetermined level on the basis of this keyword "cheerful". The classical music list PL has "classical" as a keyword. After newly storing music data Ad into the storage block 6, the control block 3 of the content reproducing apparatus 1 updates the classical music list PL so as to additionally register this music data Ad to the classical music list PL if the genre of the newly stored music data Ad is found to be "classical" on the basis of this keyword "classical".

Thus, the MusicStation function has channel play lists PL for such genres considered to be required by users as newly added music, infrequently reproduced music, rhythmical music, cheerful music, classical music, and heavy metal music, for example. The content reproducing apparatus 1 is configured to automatically execute channel play list updating by registering music data Ad stored in the storage block 6 into corresponding one of the prepared channel play lists PL on the basis of reproduction count, music impression value, and genre, for example, every time music data Ad is stored or reproduced.

Then, the content reproducing apparatus 1 selects, on a GUI screen to be described later, on the basis of user operation, a channel play list PL classified by newly added music, infrequently reproduced music, rhythmical music, cheerful music, classical music, or heavy metal music, for example, as channels, thereby allowing the user to easily find desired music in a feeling in which the user switches between radio channels.

The following describes GUI screens that are displayed when the MusicStation function is turned on. When a MusicStation function startup command is given by the user through the operation block 2, the content reproducing apparatus 1 starts the MusicStation function, thereby displaying a selection screen 10 for channel and music selection onto the display block 4 as a GUI screen shown in FIG. 3, for example.

With the selection screen 10, a channel selection area 11 is arranged vertically at the left end of the screen and a music selection area 12 is arranged in the remaining space of the screen. In the center of the channel selection area 11, currently selected channel number CNs ("3" for example) is shown, which is one of channel numbers CN (CN1 through CN3, . . . ) in channel list CL. In the top and bottom of the channel selection area 11, channel numbers CNr ("2" for example) and CNt ("4" for example) are shown which are selectable from the currently selected channel, in a sequence of channel numbers CN (CN1 through CN3, . . . ) in channel list CL.

Further, in the top vicinity of channel number CNr, a triangular first mark M1 pointing upward is shown. In the bottom vicinity of channel number CNt, an upside down triangular second mark M2 is shown. These first and second marks are used to represent that the channel to be selected by the user through the operation block 2 can be switched to the channel denoted by the channel number CNr, or the channel number CNt, respectively.

In response to the channel switching operation through the operation block 2, the control block 3 of the content reproducing apparatus 1 switches between channel numbers denoted by CNs to be displayed in the channel selection area 11 in the sequence of channel numbers CN (CN1 through CN3, . . . ) (namely, switches between channels), thereby allowing the user to easily recognize channel switching.

On the other hand, the music selection area 12 shows a list name ("Heart-Beat Hard Disk" for example) of a channel play list allocated to a channel in selection (hereafter referred to also as a list in selection) and a list description text ("Rhythmical tunes are collected" for example) on the left side of the music selection area 12. In response to a channel switching operation through the operation block 2, the control block 3 of the content reproducing apparatus 1 switches between list names and list description texts to be displayed in the music selection area 12, thereby allowing the user to easily recognize the contents of a channel in selection.

The right side of the music selection area 12 shows a cover photo Jp corresponding to the music in selection (namely, a music track based on music data Ad corresponding to music data information Ai selected from the list PL in selection) and, below the cover photo Jp, a music title and an artist name corresponding to the music in selection.

In addition, in the left vicinity of the cover photo Jp, a triangular third mark M3 is shown with its top directed to the left, while, in the right vicinity of the cover photo Jp, a triangular fourth mark M4 is shown with its top directed to the right. These third mark M3 and fourth mark M4 are used to switch to a music track to be selected by the user through the operation block 2 to a music track based on the last music data Ad and a music track based on the next music data Ad, respectively.

Then, in response to a music track switching operation through the operation block 2, the control block 3 of the content reproducing apparatus 1 switches between cover photos Jp, music titles, and artist names to be displayed in the music selection area 12 (namely switches between music tracks), thereby allowing the user to easily recognize the contents of music based on the music data Ad in selection.

Thus, the content reproducing apparatus 1 switches between channels as instructed by the user through the operation block 2 while allowing the user to visually recognize the contents of channel and music on the selection screen 10 and, at the same time, switches music tracks to be reproduced.

It should be noted that, starting up the MusicStation function, the control block 3 of the content reproducing apparatus 1 selects a channel selected at the end of the last MusicStation function and, at the same time, selects music data Ad registered in a channel play list PL allocated to this channel, thereby automatically starting reproduction from the feature position this music data Ad. Therefore, the selection screen 10 immediately after the MusicStation function is started displays the channel as it was at the end of the last MusicStation function and the music track based on the music data Ad registered in the channel play list PL allocated to this channel.

Figure 4:
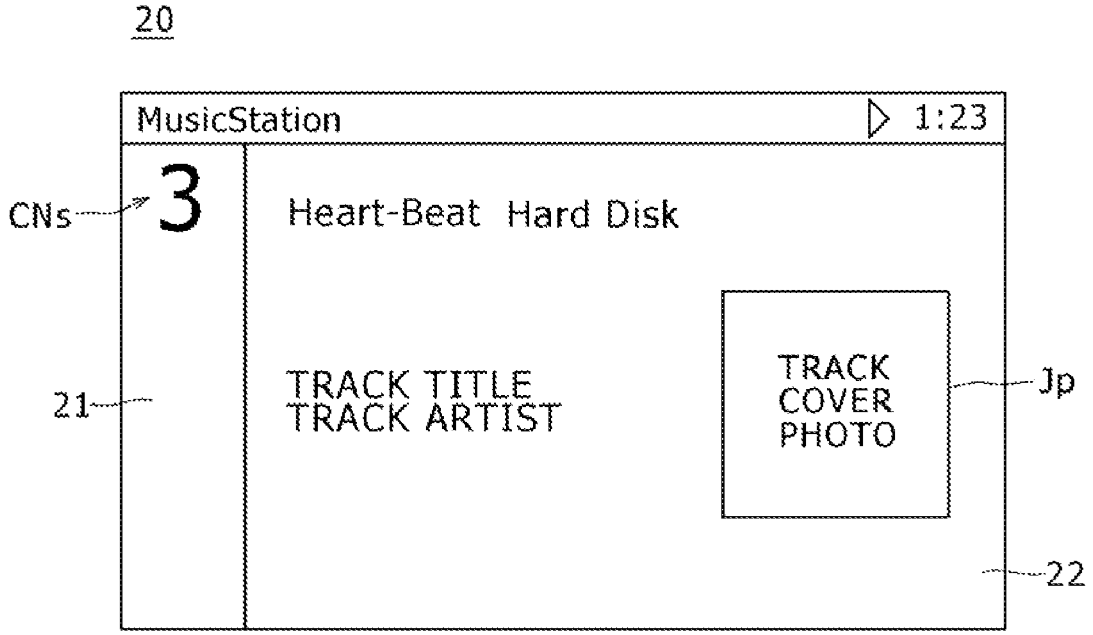
FIG. 4 is a diagram illustrating an exemplary configuration of a reproducing screen.

If music track selecting operation is done through the operation block 2 with the selection screen 10 in this state displayed, the control block 3 of the content reproducing apparatus 1 switches the GUI screen to a reproducing screen 20 as shown in FIG. 4.

In the reproducing screen 20, a selected channel display area 21 is arranged at the left end of the screen and a selected music display area 22 is arranged in the rest of the screen. The selected channel display area 21 shows only channel number CNs ("3" for example) of the channel in selection. On the other hand, the selected music display area 22 shows the list name of a channel play list PL (namely, the a list in selection) allocated to the channel in selection at the left of the screen and the track title and track artist corresponding to the music track in selection. In addition, cover photo Jp corresponding to the music track in selection is shown at the right side of the screen.

Thus, the content reproducing apparatus 1 is configured to allow the user to visually recognize the selected channel and the contents of music on the reproducing screen 20.

It should be noted that, if no operation has been done through the operation block 2 a predetermined period after displaying the selection screen 10, the control block 3 of the content reproducing apparatus 1 also switches between GUI screens from the selection screen 10 to the reproducing screen 20 as with the case in which a music track enter operation has been done.

Further, recognizing a channel switching operation done through the operation block 2 with the reproducing screen 20 displayed, the control block 3 of the content reproducing apparatus 1 switches between GUI screens from the reproducing screen 20 to the selection screen 10 again.

Figure 5:
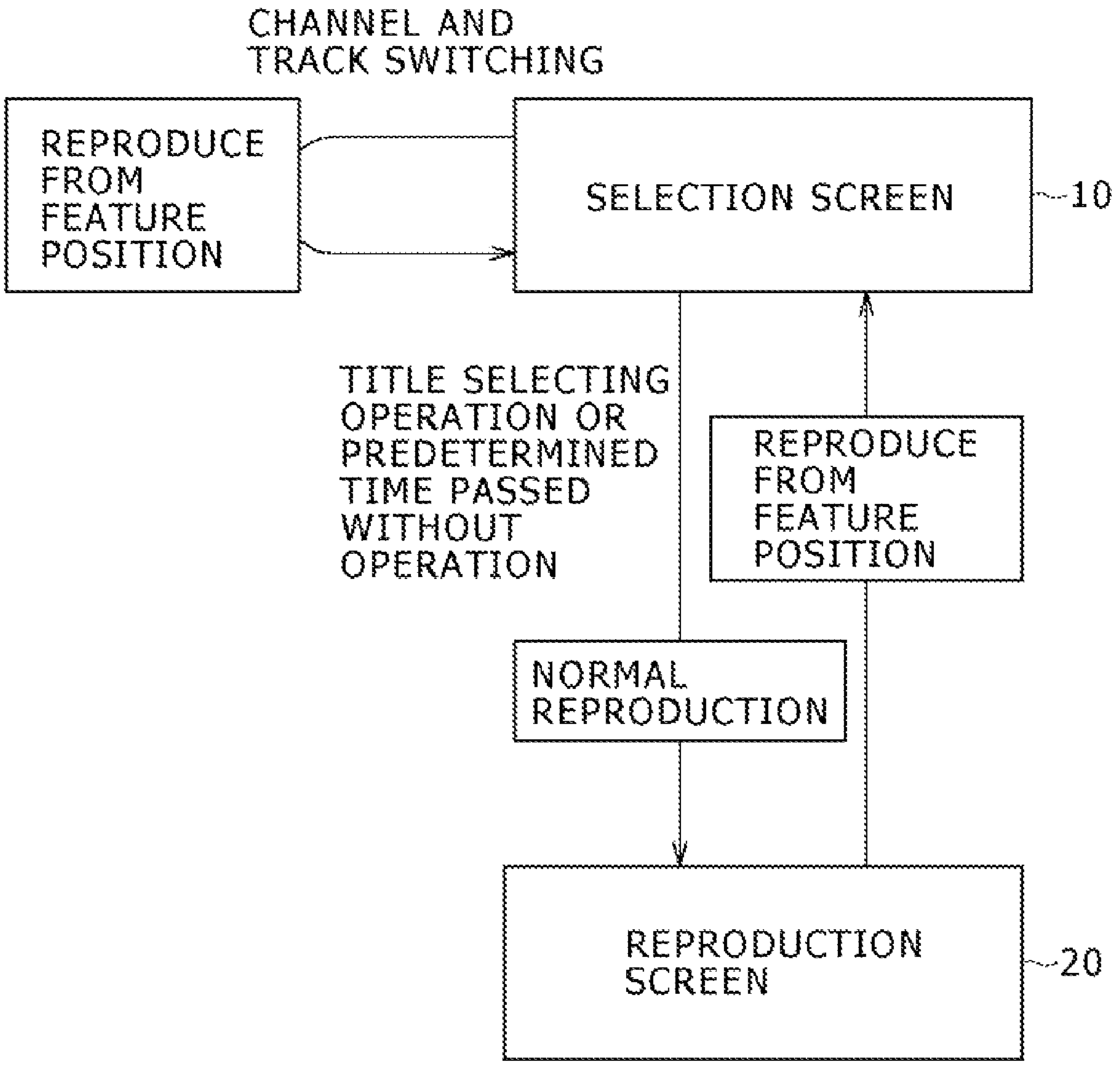
FIG. 5 is a block diagram illustrating screen switching processing and accompanying reproduction control processing.

The following describes the above-mentioned GUI screen switching operation and the accompanying reproduction control of music data Ad with reference to FIG. 5. Starting up the MusicStation function, the control block 3 of the content reproducing apparatus 1 displays the selection screen 10 and, at the same time, gets in a partial reproduction mode in which to reproduce music data Ad from a feature position.

In this partial reproduction mode, the control block 3 of the content reproducing apparatus 1 executes channel switching in accordance with a channel switching operation done on the selection screen 10 and, at the same time, switches music to a music track of the channel after the switching and, in accordance with a music track switching operation, switches between music tracks within the same channel. Every time the music track switching is executed, the control block 3 of the content reproducing apparatus 1 reproduces the music data Ad of the newly selected music track from the feature position thereof.

It should be noted that many users remember feature parts of music (namely, a chorus and a melody change part, for example) and recognize particular music tracks by listening these feature parts. Namely, the content reproducing apparatus 1 lets each user listen these feature parts by reproducing music data Ad from feature positions, thereby allowing the user to easily recognize a particular music track based on the reproduced music data Ad.

Also, every time a channel switching operation and a music track switching operation is executed, the content reproducing apparatus 1 reproduces the music data Ad corresponding to a newly selected music track from a feature position thereof, thereby allowing the user execute channel and music track switching in a zapping manner.

Further, also at the time of channel switching, the content reproducing apparatus 1 can execute music track switching to reproduce the music data Ad corresponding to a newly selected music track, thereby letting the user hear the music track as if the user heard music broadcast from a radio station without discontinuation of the reproduction of the music data Ad after the channel switching.

Still further, because the content reproducing apparatus 1 allocates channel play lists PL corresponding to user-desired categories to selectable channels as described above, thereby allowing the user to switch to any desired channel to retrieve any desired music tracks.

When a music track enter operation is executed through the operation block 2 in the partial reproduction mode or a predetermined period of time has passed without a user operation, then the control block 3 of the content reproducing apparatus 1 switches GUI screen display to the reproducing screen 20 and, at the same time, gets in a normal reproduction mode in which music data Ad is normally reproduced. In this normal reproduction mode, the music data Ad corresponding to the selected music track is reproduced up to the end thereof to let the user hear the entire part of the music track.

Then, the control block 3 of the content reproducing apparatus 1 sequentially reproduces the music track Ad from the start position thereof in accordance with the selected list PL until a channel switching operation or a music track switching operation is done through the operation block 2. Next, when a channel switching operation or a music track switching operation is done through the operation block 2, the control block 3 of the content reproducing apparatus 1 gets in the partial reproduction mode again.

Thus, the control block 3 of the content reproducing apparatus 1 appropriately switches between the partial reproduction mode and the normal reproduction mode. In any of these modes, music data Ad is always reproduced without discontinuation as far as the MusicStation function is executed.

Figure 6:
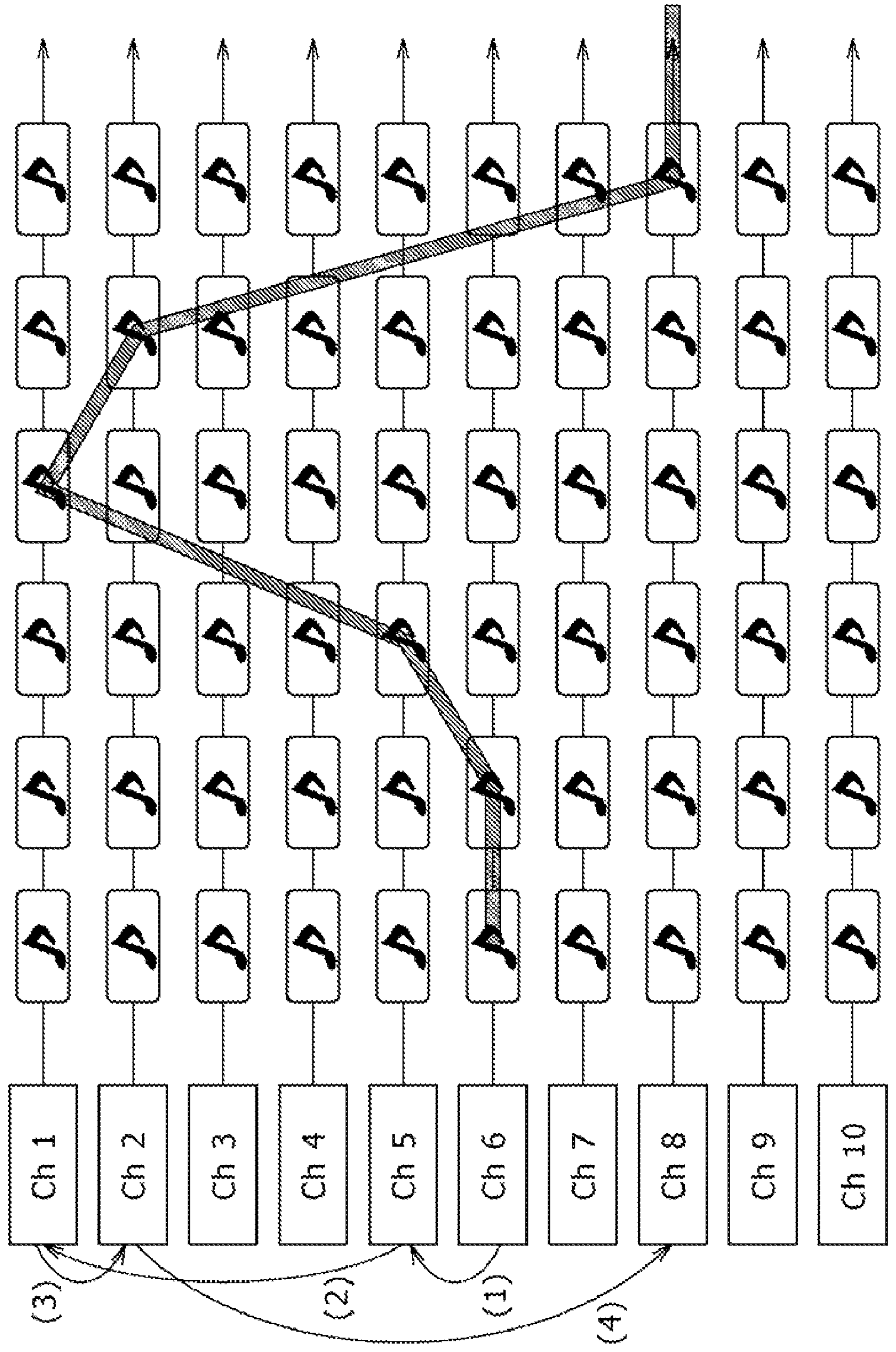
FIG. 6 is a diagram illustrating an manner of channel switching and music track switching.

Consequently, when the MusicStation function is executed, the content reproducing apparatus 1 allows the switching between channel play lists PL on a channel basis as if preset radio stations were switched between and the switching between music tracks within each channel as shown in FIG. 6, thereby letting the user hear desired music tracks as if the user heard music tracks broadcast from a radio station.

The following describes a MusicStation function startup procedure, a channel switching procedure, and a music track switching procedure.

Figure 7:
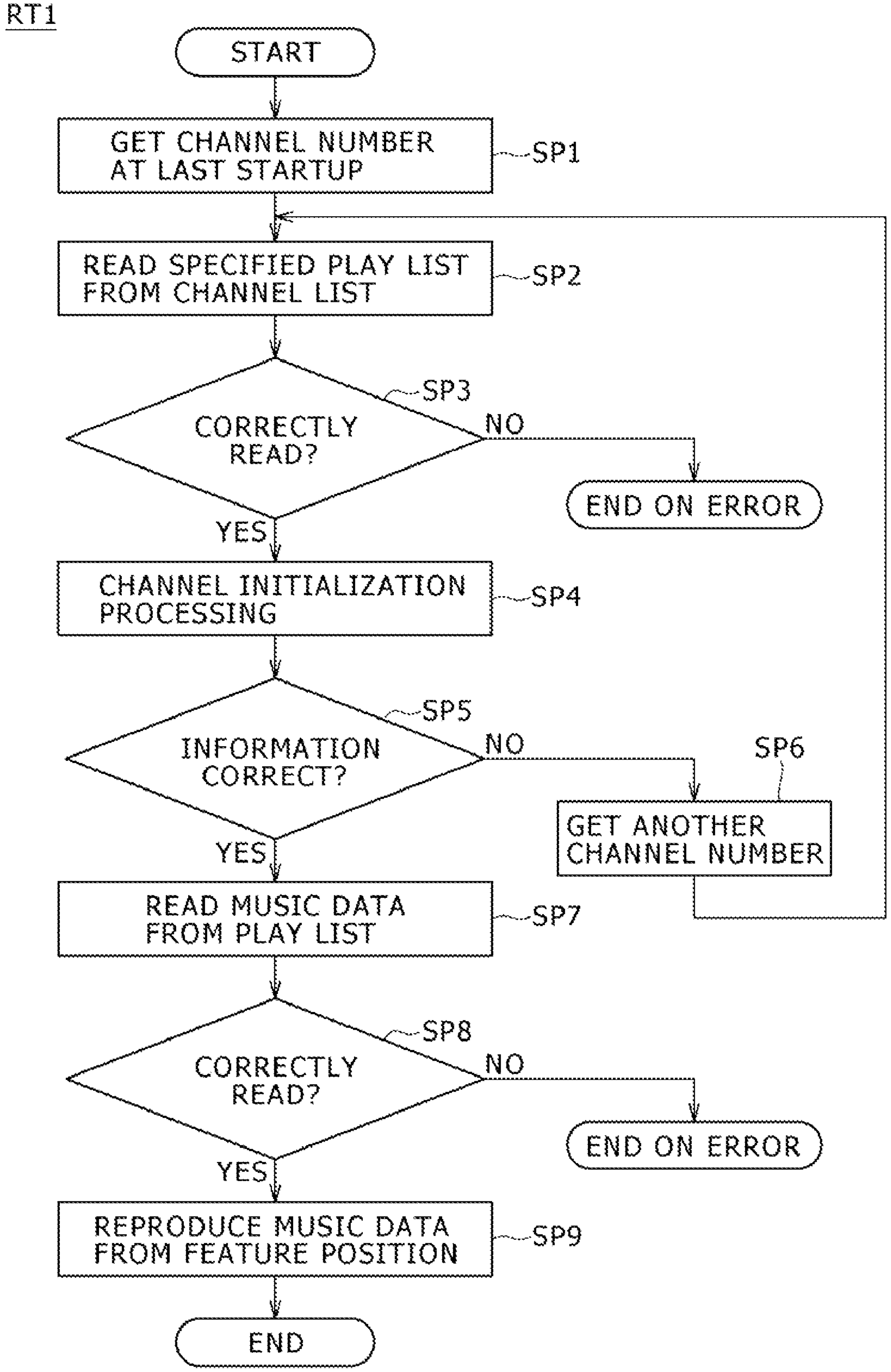
FIG. 7 is a flowchart indicative of a MusicStation function startup procedure.

First, the MusicStation function startup procedure will be described. As shown in FIG. 7, recognizing a MusicStation function startup operation done through the operation block 2, the control block 3 of the content reproducing apparatus 1 starts MusicStation function startup procedure RT1, upon which the procedure goes to step SP1.

In step SP1, the control block 3 gets the channel number CN of a channel selected last at the last startup of the MusicStation function, upon which the procedure goes to step SP2. It should be noted that the control block 3 of the content reproducing apparatus 1 stores the information indicative of the channel number CN of the channel in selection (hereafter referred to also as selected channel information) into the storage block 6 and, at the same time, updates this selected channel information every time channel number switching is executed. Namely, the channel number CN indicated in the selected channel information stored in the storage block 6 at this moment is the channel number CN selected last. By getting this selected channel information, the control block 3 gets the channel number CN selected last at the time of the last startup.

In step SP2, the control block 3 specifies a channel play list PL corresponding to the obtained channel number CN on the basis of channel list CL and reads this specified channel play list (hereafter referred to also as a specified list) from the storage block 6, upon which the procedure goes to step SP3.

In step SP3, the control block 3 determines whether the specified list LP has been correctly read. If the determination is in the negative, then it indicates that the specified list PL has not been correctly read due to data damage in the specified list PL, for example, upon which the control block 3 abnormally ends this MusicStation function startup procedure RT1.

On the other hand, if the determination is in the affirmative, then the control block 3 recognizes the that the specified list PL has been correctly read, upon which the procedure goes to step SP4.

In step SP4, the control block 3 initializes the specified list PL (hereafter referred to also as channel initialization processing). This channel initialization processing includes the sort processing in which, if shuffle reproduction is specified in the music track sequence setting Ls of the channel play list PL, the sequence of music tracks to be reproduced is sorted in a random manner, for example. After the execution of this channel initialization processing, the procedure goes to step SP5.

In step SP5, the control block 3 determines whether the information of the specified list PL after the channel initialization processing (namely, list information Li and music data information Ai) is correct or not. If the determination is in the negative in step SP5, it indicates that the information of the specified list PL is not correct because the reproduction of the music data Ad by the specified list PL is disabled by the list reproduction setting Ldi contained in the list information Li of specified list PL, for example, upon which the procedure goes to step SP6. In step SP6, the control block 3 newly gets the channel number CN of a channel allocated with default play list DPL, for example, in which the reproduction of music data Ad is permitted. Then, the procedure returns to step SP2 to read the channel play list PL corresponding to the newly obtained channel number CN.

On the other hand, if the determination in SP5 is in the affirmative, then the control block 3 recognizes that the information of the specified list PL is correct, upon which the procedure goes to step SP7.

In step SP7, the control block 3 specifies one piece of music data Ad (for example, music data Ad to be reproduced first) from the specified list PL and reads the specified music data Ad (hereafter referred to also as specified music data) from the storage block 6, upon which the procedure goes to step S8.

In step SP8, the control block 3 determines whether the specified music data Ad has been correctly read or not. If the determination is in the negative, then it indicates that the specified music data Ad has not been correctly read because of the damage of the specified music data Ad, for example, upon which the control block 3 abnormally ends this MusicStation function startup processing RT1.

On the other hand, if the determination is in the affirmative in step SP8, the control block 3 recognizes that the specified music data Ad has been correctly read, upon which the procedure goes to step SP9. In step SP9, the control block 3 displays the channel number CN obtained in step SP1 or step SP6 as the channel number CNs of the channel in selection, displays, on the display block 4, the selection screen 10 with list information Li (list name Lt and list description Lde) of the specified list PL read in step SP2 and attribute information Ti (cover photo, track title, and artist name) of the specified list PL read in step S2, and starts the reproduction of the specified music data Ad from a feature position (for example, a position indicated by one of three feature positional information Ct1 through Ct3), thereby ending this MusicStation function startup procedure RT1.

By following MusicStation function startup procedure RT1 described above, the content reproducing apparatus 1 starts up the MusicStation function.

Thus, the control block 3 of the content reproducing apparatus 1 automatically starts the reproduction of music data Ad after starting up the MusicStation function, thereby providing the user with the music based on music data Ad as if broadcast from a radio station.

Figure 8:
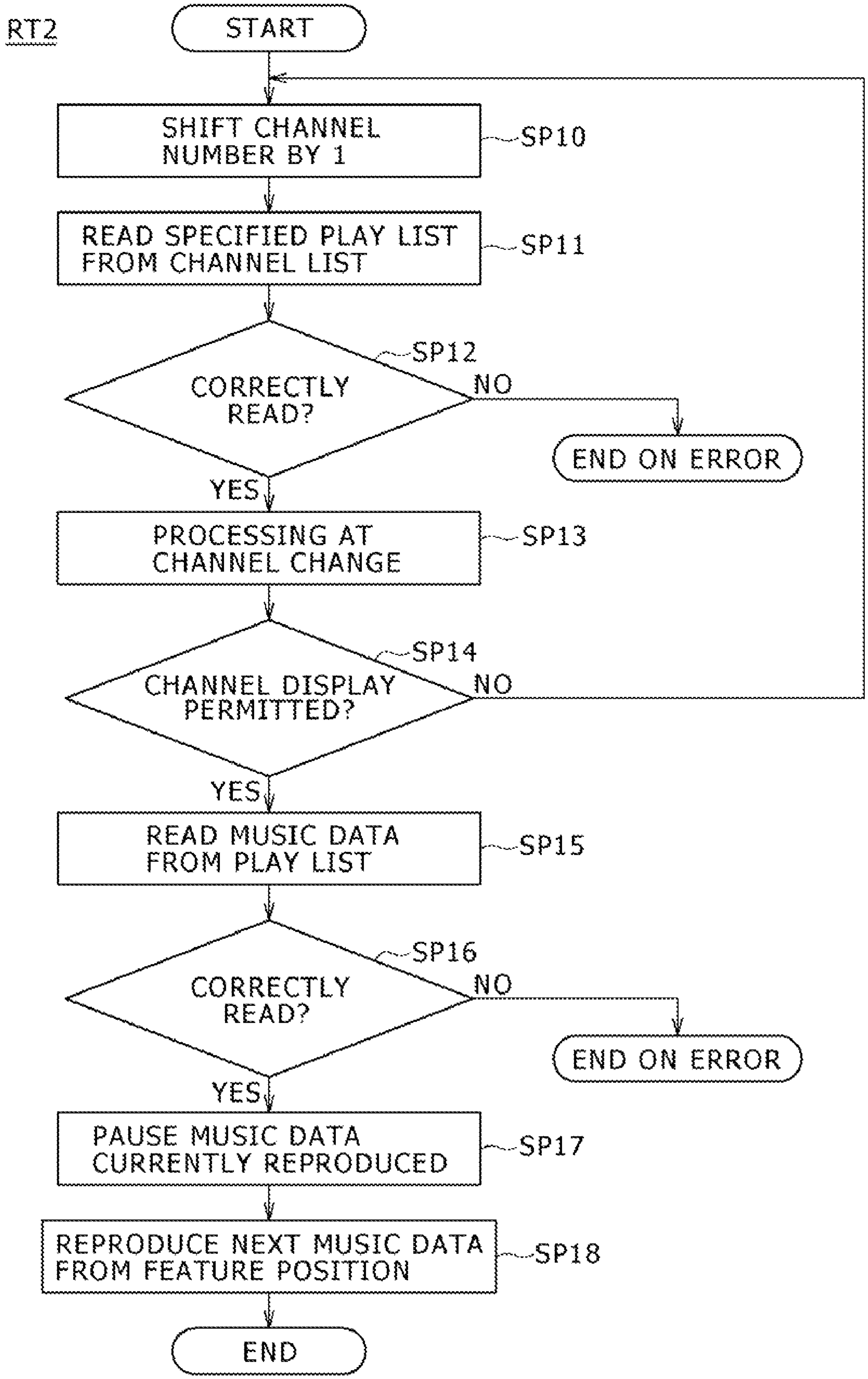
FIG. 8 is a flowchart indicative of a channel switching procedure.

The following describes a channel switching procedure in the MusicStation function. As shown in FIG. 8, the control block 3 of the content reproducing apparatus 1 starts the MusicStation function and, upon recognition of a channel switching operation done through the operation block 2 while music data Ad is being reproduced, starts channel switching procedure TR2, upon which the procedure goes to step SP10.

In step SP10, according to the recognized channel switching operation, the control block 3 decrements the channel number CN by 1 (namely, channel number CNr) or increments by 1 (namely, channel number CNt) with reference to the channel number CN of the channel selected immediately before this channel switching operation is done (namely, the channel number CNs displayed on the selection screen 10) and uses the resultant channel number as channel number CN after switching, upon which the procedure goes to step SP11.

It should be noted that the control block 3 is configured to control the switching of channel numbers CN in a circular manner by connecting the head of channel numbers CN with the tail thereof. Namely, while recognizing head channel number CN minus 1 as the tail channel number CN in step SP10, the control block 3 recognizes tail channel number CN plus 1 as the head channel number CN.

In step SP11, the control block 3 specifies the channel play list PL corresponding to the channel number CN after switching on the basis of channel list CL and reads this specified channel play list PL (or the specified list) from the storage block 6, upon which the procedure goes to step SP12.

In step SP12, the control block 3 determines whether the specified list PL has been correctly read or not. If the determination is in the negative, it indicates that this specified list PL has not been correctly read because of damaged data in the specified list PL, for example, upon which the control block 3 abnormally ends this channel switching procedure RT2.

On the other hand, if the determination is in the affirmative in step S12, then the control block 3 recognizes that the specified list PL has been correctly read, upon which the procedure goes to step SP13.

In step SP13, the control block 3 executes the processing (hereafter referred to also as channel change time processing) on the specified list PL. This channel change time processing includes the reconfiguration of the channel play list PL made up of the music data Ad corresponding to frequently reproduced music tracks in accordance with the reproduction count of each music data Ad up to this moment. When this channel change time processing has been completed, the procedure goes to step SP14.

In step SP14, the control block 3 determines on the basis of list reproduction setting Ldi included in list information Li of the specified list PL after the channel change time processing whether the displaying of a channel allocated with this specified list PL is permitted or not. If the determination is in the negative, it indicates that the displaying of the channel allocated with this specified list PL is disabled because the reproduction of the music data Ad registered in the specified list PL is disabled, upon which the procedure returns to step SP10. In step SP10, the control block 3 further increments or decrements the channel number CN after switching obtained previously by 1 and uses the resultant channel number as a new channel number CN after switching.

On the other hand, if the determination is in the affirmative in step SP14, then the control block 3 recognizes that the displaying of the channel allocated with this specified list PL is enabled because the reproduction of the music data Ad registered in the specified list PL is permitted, upon which the procedure goes to step SP15.

In step SP15, the control block 3 specifies music data Ad (for example, the music data to be reproduced first in a reproduction sequence) from the specified list PL and reads the specified music data Ad from the storage block 6, upon which the procedure goes to step SP16.

In step SP16, the control block 3 determines whether the specified music data Ad has been correctly read or not. If the determination is in the negative in step SP16, it indicates that this specified music data Ad has not been correctly read because the specified music data Ad is damaged, for example, upon which the control block 3 abnormally ends this channel switching procedure RT2.

On the other hand, if the determination is in the affirmative in step SP16, then the control block 3 recognizes that the specified music data Ad has been correctly read, upon which the procedure goes to step SP17. In step SP17, the control block 3 pauses the reproduction of the currently reproduced music data Ad, displays the channel number CN after switching obtained in step SP10 as the channel number CNs in selection, displays, on the display block 4, the selection screen 10 showing list information Li (list name Lt and list description Lde) of the specified list PL read in step SP15 and attribute information Ti (cover photo, track title, and artist name) of the specified music data Ad read in step SP15, and starts the reproduction of the specified music data Ad from a feature position (for example, a position indicated by one of three feature positional information Ct1 through Ct3), thereby ending this channel switching procedure RT2. By the above-mentioned channel switching procedure RT2, the content reproducing apparatus 1 switches between channels.

Figure 9:
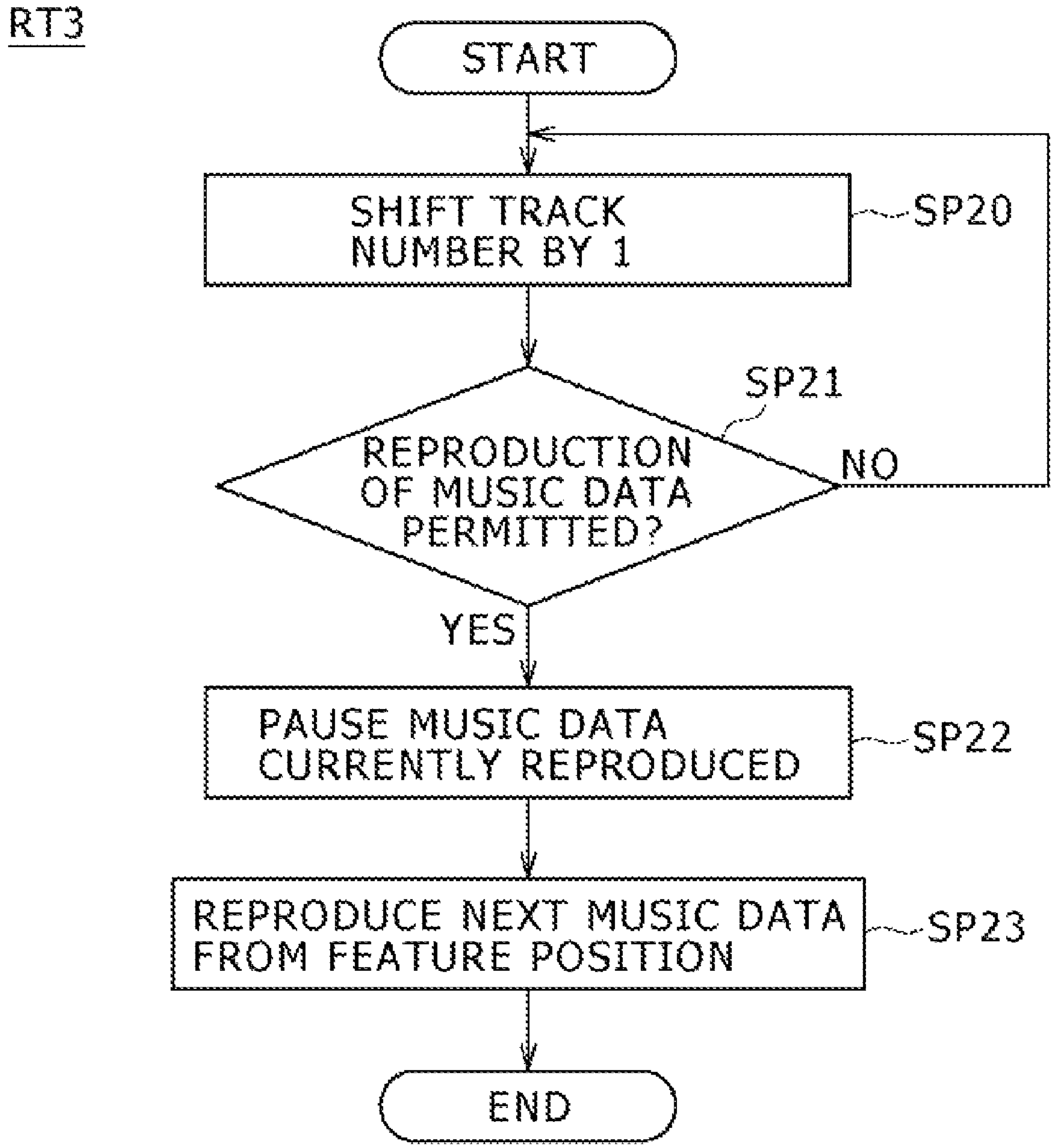
FIG. 9 is a flowchart indicative of a music track switching procedure.

The following describes a music track switching procedure in the MusicStation function. As shown in FIG. 9, the control block 3 of the content reproducing apparatus 1 starts the MusicStation function and, upon recognition of a music track switching operation done through the operation block 2 while music data Ad is being reproduced, starts music track switching procedure TR3, upon which the procedure goes to step SP20.

In step SP20, according to the recognized music track switching operation, the control block 3 decrements the number by 1 or increments by 1 within the channel play list PL allocated to the channel in selection with reference to the music track number of the music data information Ai corresponding to a music track selected immediately before the music track switching operation and uses the resultant number as the music track number after switching, upon which the procedure goes to step SP21.

It should be noted that the control block 3 is configured to control the switching of music track numbers in a circular manner by connecting the head of music track numbers with the tail thereof. Namely, while recognizing head music track number minus 1 as the tail music track number in step SP20, the control block 3 recognizes tail music track number plus 1 as the head music track number.

In step SP21, the control block 3 determines on the basis of music data reproduction setting Adi of the music data Ad corresponding to the music track number after switching whether the reproduction of the music data Ad (or the specified music data) to be specified by this music data information Ai is permitted or not. If the determination is in the negative, it indicates that the reproduction of the specified music data Ad is disabled, upon which the procedure returns to step SP20. In step SP20, the control block 3 further increments or decrements the music track number after switching obtained previously by 1 and uses the resultant number as a new music track number after switching.

On the other hand, if the determination is in the affirmative in step SP21, then the control block 3 recognizes that the reproduction of the specified music data Ad is permitted, upon which the procedure to step SP22.

In step SP22, the control block 3 pauses the reproduction of the currently reproduced music data Ad.

In step SP23, the control block 3 displays, on the display block 4, the selection screen 10 showing attribute information Ti (cover photo, track title, and artist name) of the specified music data Ad and starts the reproduction of the specified music data Ad from a feature position (for example, a position indicated by one of three feature positional information Ct1 through Ct3), thereby ending this music track switching procedure RT3.

By this music track switching procedure, the content reproducing apparatus 1 switches between music tracks.

The following describes a method of setting list reproduction setting Ldi of channel play lists PL (PL1 through PL3, . . . ) allocated to channels. It should be noted here that, in the MusicStation function, as described above with the channel switching procedure RT2, if the list reproduction setting Ldi of channel play list PL permits the reproduction of the music data Ad registered in channel play list PL, the displaying of the channel allocated with this channel play list PL is permitted; if the list reproduction setting Ldi disables the reproduction of the music data Ad registered in channel play list PL, the displaying of the channel allocated with this channel play lists PL is disabled.

Namely, in the MusicStation function, the displaying and non-displaying of each channel on GUI screens can be set on the basis of this list reproduction setting Ldi. Therefore, the method of setting list reproduction setting Ldi is described herein as a channel display setting method.

Figure 10:
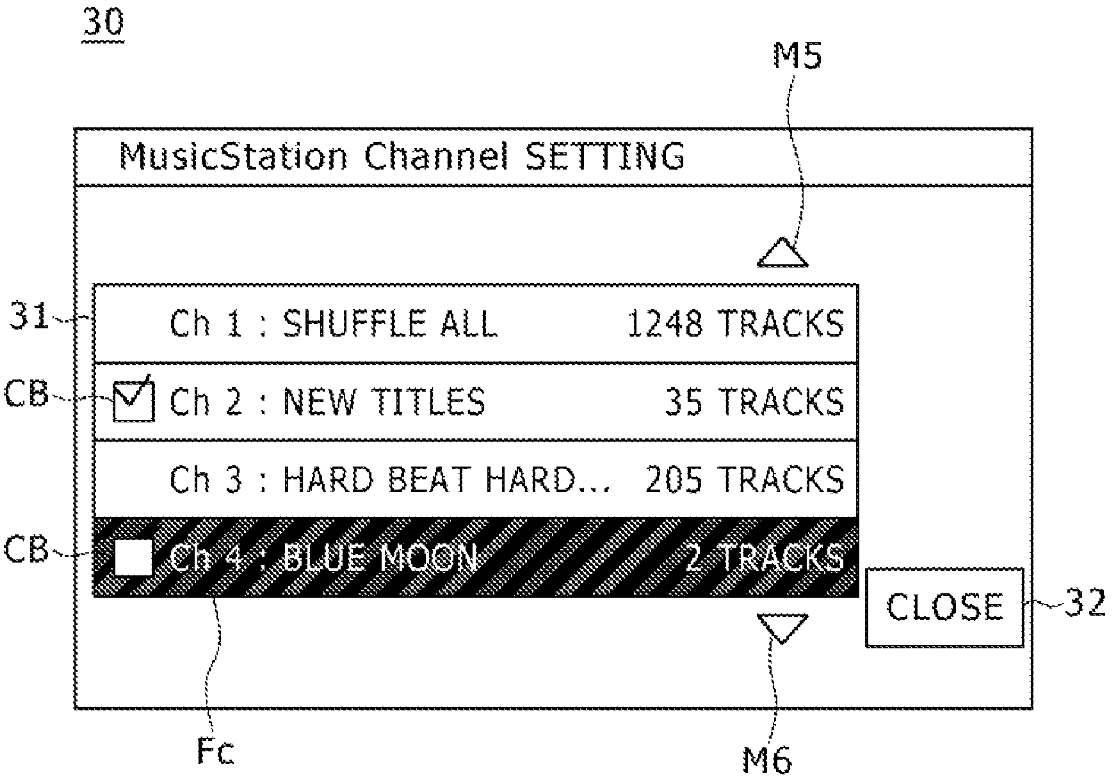
FIG. 10 is a diagram illustrating an exemplary configuration of a channel display setting screen.
Figure 11:
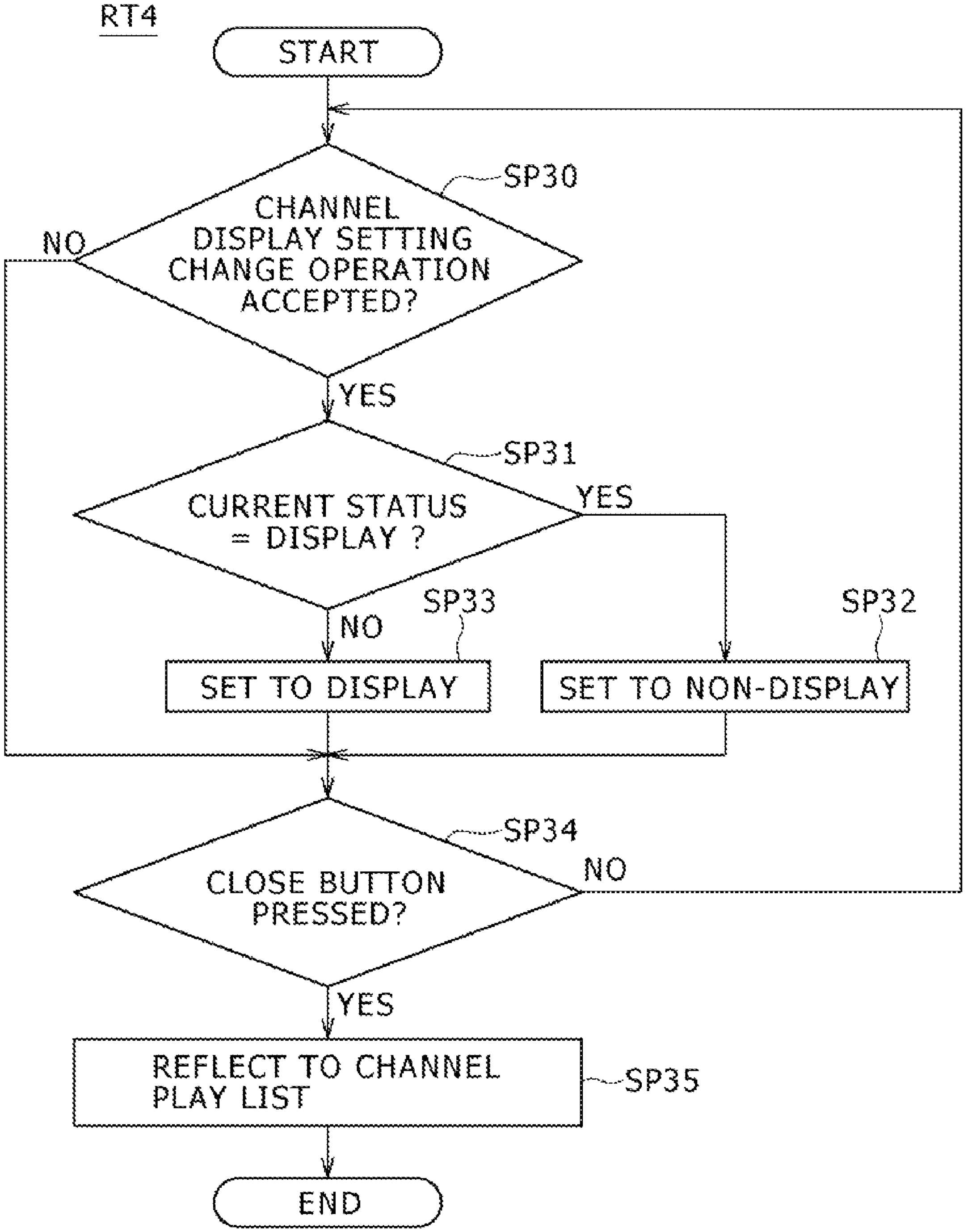
FIG. 11 is a flowchart indicative of channel display setting procedure.

To be more specific, recognizing that a setting call operation has been done through the operation block 2 during the execution of the MusicStation function, the control block 3 displays a channel display setting screen 30 onto the display block 4 as shown in FIG. 10.

The channel display setting screen 30 has, in the center thereof, a channel information list 31 in which information of each channel usable by the MusicStation function (hereafter referred to also as channel information) is arranged in a sequence of channel lists CL and a close button 32 for closing the channel display setting screen 30 at the end of the setting.

Due to the restriction of the display block 4, this channel information list 31 can show only four channels of channel information (namely, four lines of channel information) of the channel information of all channels. The channel information includes check box CB indicative of channel display setting, a channel number (for example, "Ch2"), list name (for example, "new music") of channel play list PL allocated to this channel, and the number of music data Ad (for example "35 tracks") registered in this channel play list PL. It should be noted that, if the check box CB is checked, the channel display setting is "display"; if not, the channel display setting is "non-display". A channel with the check box CD not shown is a default channel with channel display setting fixed to "display", namely, a channel allocated with the default play list DPL with list reproduction setting Ldi fixed to "reproduction permitted".

Further, with this channel information list 31, focus Fc is displayed for the selected channel information.

In the top vicinity of the channel information list 31, a triangular fifth mark M5 pointing upward is displayed. In the bottom vicinity of the channel information list 31, an upside down triangular sixth mark M6 is displayed. These fifth and sixth marks M5 and M6 are used to shift focus Fc to be displayed on the channel information list 31 as instructed through the operation block 2 one line up and down, respectively.

Then, in accordance with a focus moving operation done through the operation block 2, the control block 3 of the content reproducing apparatus 1 shifts focus Fc inside the channel information list 31 for the selection of channel information.

It should be noted that channel information list 31 can show only four channels of channel information; however, if a focus moving operation for moving focus Fc one line up with focus Fc displayed on the top channel information is executed or a focus moving operation for moving focus Fc one line down with focus Fc displayed on the bottom channel information is executed, the channel information displayed in the channel information list 31 is scrolled up or down by one line, thereby allowing the user to recognize the channel information of all channels.

Also, at this moment, by continuously reproducing the music data Ad registered in the channel play list PL of a channel corresponding to the channel information selected by focus Fc from a feature position of the music data Ad for every several seconds, the control block 3 allows the user to preview music tracks to be carried on that channel.

Then, if a display setting change operation is done through the operation block 2 with channel information selected, the control block 3 of the content reproducing apparatus 1 unchecks the check box CB of the selected channel information if it is checked, thereby the control block 3 changes channel display setting from "display" to "non-display". On the other hand, the control block 3 newly checks the check box CB of the selected channel information if it is not checked, thereby the control block 3 changes channel display setting from "non-display" to "display".

Next, when the close button 32 of the channel display setting screen 30 is pressed through the operation block 2, the control block 3 of the content reproducing apparatus 1 reflects the channel display setting (namely, checking or unckecking of the check box CB) in the channel display setting screen 30 onto list reproduction setting Ldi of the channel play list PL allocated to each channel, thereby closing the channel display setting screen 30.

Thus, on the channel display setting screen 30, channel display setting can be changed for each channel. Those channels with channel display setting changed to "non-display" are not displayed on the GUI screen (namely, the selection screen 10 and the reproducing screen 20) and therefore cannot be selected.

Consequently, the content reproducing apparatus 1 allows the user to set channels to be selectively displayed on the selection screen 10 and the reproducing screen 20, thereby setting a channel configuration to be displayed on the selection screen 10 to that liked by the user, for example.

The following describes a procedure of this channel display setting (hereafter referred to also as channel display setting processing). Recognizing that a setting calling operation has been done through the operation block 2 during the execution of the MusicStation function, the control block 3 of the content reproducing apparatus 1 switches the GUI screen of the MusicStation function to the channel display setting screen 30 and, at the same time, starts channel display setting procedure RT4, upon which the procedure goes to step SP30.

In step SP30, the control block 3 determines whether a display setting change operation has been accepted through the operation block 2 with channel information selected with focus Fc. If the determination is in the affirmative, then the procedure goes to step SP31.

In step SP31, the control block 3 determines whether the current setting of the channel information in selection is "display" or not. If the determination is in the affirmative in step SP31, it indicates that the current display setting of the channel information in selection is "display", namely, the check box CB is checked, upon which the procedure goes to step SP32.

In step SP32, the control block 3 changes the display setting from "display" to "non-display" by unchecking the check box CB of the channel information in selection, upon which the procedure goes to step SP34.

On the other hand, if the determination is in the negative in step SP 31, it indicates that the current display setting of the channel information in selection is "non-display", namely, the check box CB is unchecked, upon which the procedure goes to step SP33.

In step SP33, the control block 3 changes the display setting from "non-display" to "display" by checking the check box CB of the channel information in selection, upon which the procedure goes to step SP34.

On the other hand, if the determination is in the negative in step SP30, then the procedure goes to step SP34 by skipping steps SP31 through SP33.

In step SP34, the control block 3 determines whether the close button 32 of the channel display setting screen 30 has been pressed through the operation block 2. If the determination is in the negative in step SP34, it indicates that the user still wants the channel display setting, upon which the procedure returns to step SP30, in which the control block 3 determines whether a display setting operation has been done or not.

On the other hand, if the determination is in the affirmative in step SP34, it indicates that the user wants to end the channel display setting, upon which the procedure goes to step SP35. In step SP35, the control block 3 reflects the channel display setting done on the channel display setting screen 30 onto the list reproduction setting Ldi of the channel play list PL allocated to each channel and closes the channel display setting screen 30, thereby ending this channel display setting procedure RT4.

By this channel display setting procedure RT4, the content reproducing apparatus 1 changes channel display setting.

As described above, the content reproducing apparatus 1 providing the basic configuration of the present invention has the MusicStation function as one of music data reproducing functions. Through this MusicStation function, the user can hear music (or music tracks) based on music data Ad as if the music were broadcast from a radio station.

The following describes the first, second, third, and fourth embodiments of the invention having basic configurations based on the MusicStation function.

(2) The First Embodiment

(2-1) Outline of the First Embodiment:

First, the outline of the first embodiment of the invention will be described, followed by the description of a specific example of thereof.

Figure 12:
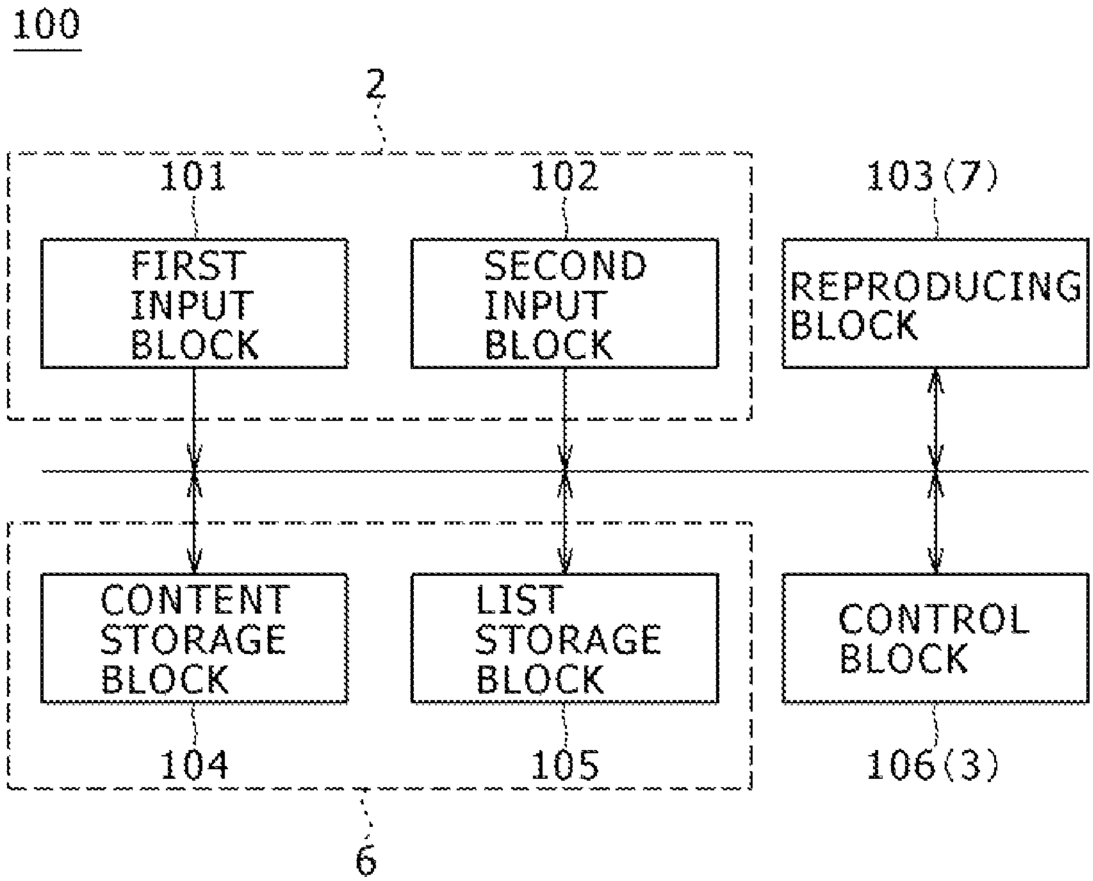
FIG. 12 is a block diagram illustrating an outline of a content reproducing apparatus practiced as a first embodiment of the invention.

As shown in FIG. 12, a content reproducing apparatus 100 has a first input block 101 through which a quantity of operation in a first direction is entered, a second input block 102 through which a quantity of operation in a second direction is entered, a reproducing block 103 for reproducing content specified through the first input block 101 or the second input block 102, a content storage block 104 for storing one or more pieces of content, and a list storage block 105 for storing a plurality of lists having content identification information. The content reproducing apparatus 100 further has a control block 106 configured to execute control such that, when an input is made through the first input block 101, one of the plurality of lists stored in the list storage block 105 is selected in accordance with the entered quantity of operation in the first direction and the content corresponding to the content identification information in the selected list is read from the content storage block 104 to make the reproducing block 103 reproduce the content. The control block 106 is further configured to execute control such that, when an input is made through the second input block 102, in accordance with the entered quantity of operation in the second direction, one piece of content identification information is selected from the selected list and the content corresponding to the selected content identification information is read from the content storage block 104 to make the reproducing block 103 reproduce the content.

It should be noted that the first input block 101 and the second input block 102 correspond to the operation block 2 of the above-mentioned content reproducing apparatus 1 (FIG. 1), the content storage block 104 and the list storage block 105 correspond to the storage block 6 of the content reproducing apparatus 1, and the reproducing block 103 and the control block 106 correspond to the reproducing block 7 and the control block 3, respectively, of the content reproducing apparatus 1.

Having the above-mentioned configuration, the content reproducing apparatus 100 practiced as the first embodiment of the invention requires, for the reproduction of desired content, a maximum of only two steps of selecting operations, namely, the selection of a list through the first input block 101 and the selection of content from the selected list through the second input block 102. Because the first input block 101 and the second input block 102 are separate input blocks, the user can concurrently execute list selection and content selection, resulting in the easier reproduction of content than before.

Figure 13:
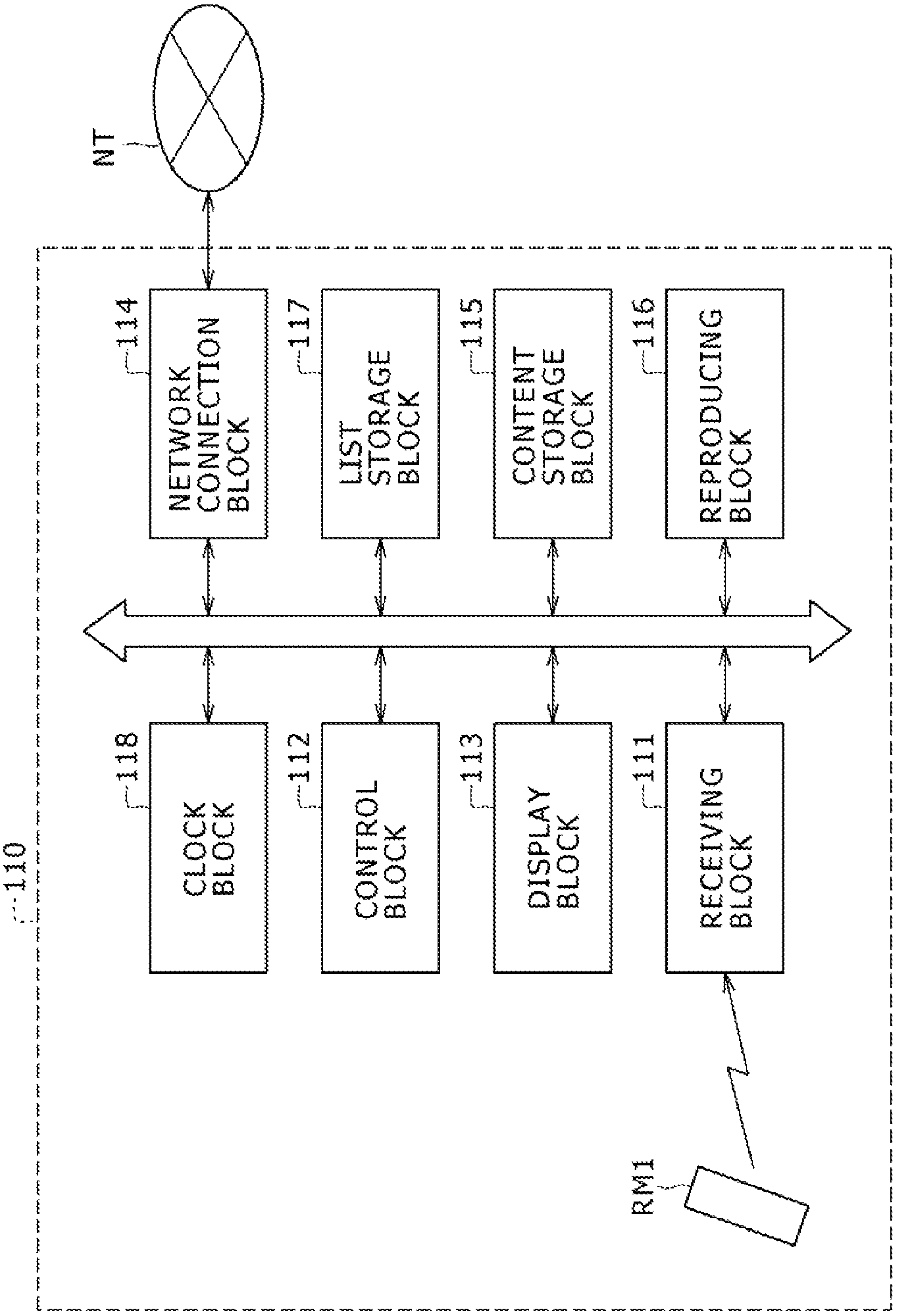
FIG. 13 is a block diagram illustrating an outline of a music reproducing apparatus practiced as the first embodiment of the invention.

(2-2) Specific Example of the First Embodiment:

The following describes a specific example of the first embodiment of the invention. A music reproducing apparatus 110 shown in FIG. 13, one embodiment of the content reproducing apparatus 100 described above, receives an operation signal from a remote controller RM1 at a receiving block 111, and converts the received signal into an operation command. In accordance with this operation command, a control block 112 controls other component blocks to execute various processing operations.

The music reproducing apparatus 110 has a plurality of functions associated with the recording and reproduction of music data. The control block 112 switches between these functions as instructed through the remote controller RM1 and, at the same time, displays a GUI (Graphical User Interface) screen corresponding to a selected function onto a display block 113. It should be noted that the music data is data corresponding to a music track.

To be more specific, if instructed to switch to a download function for downloading music data, for example, the control block 112 of the music reproducing apparatus 110 displays a GUI screen corresponding to the download function onto the display block 113 and, if subsequently instructed to download music data, accordingly receives the music data supplied from a music providing server at a network connection block 114 via network NT, not shown, thereby storing the supplied music data into a content storage block 115.

Further, if instructed to switch to a CD reading function for recording CD from the remote controller RM1, the control block 112 of the music reproducing apparatus 110 displays a GUI screen corresponding to the CD recording function onto the display block 113 and, if subsequently instructed to record a CD, accordingly reads music data from the CD, not shown, loaded on the music reproducing apparatus 110, executes data compression processing on the read music data, thereby storing the compressed music data into the content storage block 115.

If instructed to switch to a normal reproduction function for reproducing the music data stored in the content storage block 115 from the remote controller RM1, the control block 112 of the music reproducing apparatus 110 displays a GUI screen corresponding to the normal reproduction function onto the display block 113, and, if subsequently instructed to reproduce music data, accordingly reads the music data from the content storage block 115, and executes decompression, equalizing, digital-to-analog conversion, and amplification, for example, on the read music data in a reproducing block 116, thereby sounding a music track based on this music data.

In addition, if instructed to switch to a CD reproduction function for recording CD from the remote controller RM1, the control block 112 of the music reproducing apparatus 110 displays a GUI screen corresponding to the CD reproduction function onto the display block 113 and, if subsequently instructed to reproduce a CD, reads music data from the CD, not shown, loaded on the music reproducing apparatus 110, and executes reproduction processing on the read music data, thereby sounding a music track based on this music data.

Thus, the control block 112 of the music reproducing apparatus 110 executes processing operations in accordance with various functions as described above.

Figure 14:
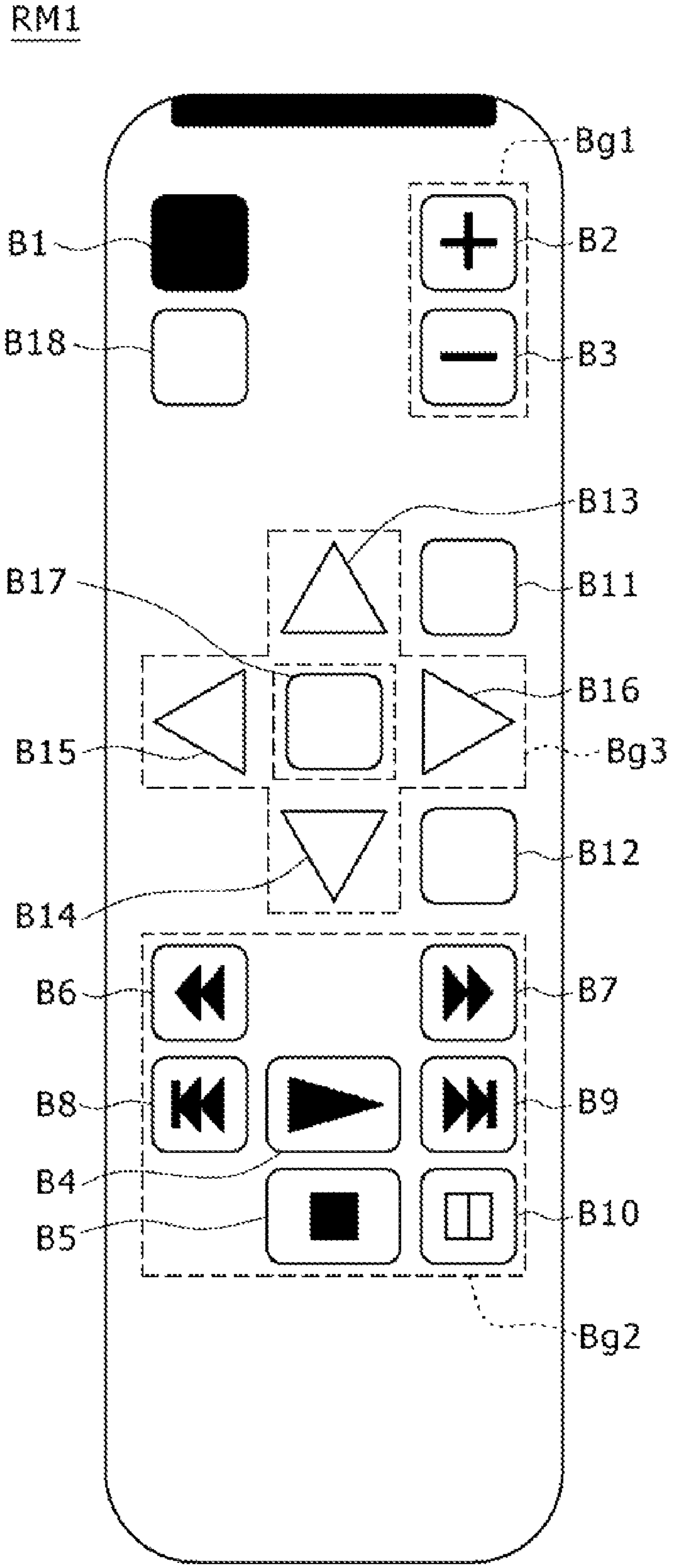
FIG. 14 is a top view of a remote controller practiced as the first embodiment of the invention.

The following describes a configuration of the remote controller RM1 with reference to FIG. 14. The remote controller RM1 has a power button B1 allocated with power on/off commands of the music reproducing apparatus 110, a volume control section Bg1 made up of a volume control buttons B2 and B3 allocated with volume up and down commands, a play section Bg2 made up of reproduction control buttons B4, B5, B6, B7, B8, B9, and B10 allocated with music data reproduction commands (play, stop, fast forward, rewind, next, previous, and pause), and a function switching button B11 allocated with function switching commands. The remote controller RM1 further has a setting button B12 allocated with various setting call commands, a cross operation section Bg3 made up of an up button B13 and a down button B14 allocated with up and down operation commands on GUI screen and a left button B15 and a right button B16 allocated with lateral-direction operation commands, an enter button B17 allocated with an enter command on GUI screen, and a preset button B18 allocated with an automatic channel selection command to be described later.

Namely, the control block 112 of the music reproducing apparatus 110 switches between functions in accordance with a user operation done through the function switching button B11 arranged on the remote controller RM1, controls the reproduction of music data in the normal reproduction function, for example, in accordance with a user operation done through the play section Bg2, and selects and enter the music data to be downloaded in the download function, for example, in accordance with a user operation done through the cross operation section Bg3 and the enter button B17.

It should be noted that the up button B13 and the down button B14 of the remote controller RM1 correspond to the first input block 101 of the content reproducing apparatus 100 (FIG. 12) described above and the left button B15 and the right button B16 correspond to the second input block 102. The control block 112 of the music reproducing apparatus 110, the content storage block 115, the reproducing block 116, and the list storage block 117 correspond to the control block 106, the content storage block 104, the reproducing block 103, and the list storage block 105 of the content reproducing apparatus 100, respectively.

Further, like the basic configuration described above, this music reproducing apparatus 110 has the MusicStation function, which will be described below. It should be noted that the MusicStation function of the music reproducing apparatus 110 is adapted to the remote controller RM1 on the basis of the above-mentioned MusicStation function described with reference to the above-mentioned basic configuration. The following mainly describes an operation system of the MusicStation function of the music reproducing apparatus 110.

First, a method of managing music data Ad in the MusicStation function of the music reproducing apparatus 110 will be described. This management method is substantially the same as the management method of the above-mentioned basic configuration except that a database DB is built in the content storage block 115 (or music content Ad is stored in the content storage block 115) and each channel play list PL and channel list CL are stored in the list storage block 117. Therefore, details of this management method can be understood with reference to the description of the above-mentioned basic configuration.

Namely, as with the basic configuration described above, the music reproducing apparatus 110 is also configured to manage a plurality of channel play lists PL by a channel list CL as shown in FIG. 2 and manage a sequence of reproducing music data Ad by each of the plurality of channel play lists PL.

As with the above-mentioned basic configuration, this MusicStation function has, beforehand, channel play lists PL for categories considered to be required by the user, such as newly added music, infrequently reproduced music, rhythmical music, cheerful music, classical music, and heavy metal music, for example. In accordance with the storage or reproduction of music data Ad, the control block 112 of the music reproducing apparatus 110 automatically update channel play lists PL by registering the music data Ad stored in the content storage block 115 into corresponding channel play lists PL of the prepared channel play lists PL on the basis of the reproduction count, music impression value, and genre of the music data Ad.

Then, the music reproducing apparatus 110 allows the user to select, through the remote controller RM1 and on a GUI screen to be described later, desired channel play lists PL classified as newly added music, infrequently reproduced music, rhythmical music, cheerful music, classical music, and heavy metal music, for example, thereby allowing the user to easily find desired music in a feeling in which the user switches between radio channels.

The following describes a GUI screen to be displayed when the MusicStation function is selected. This GUI screen is substantially the same in configuration as the above-described basic configuration except for the responsiveness to the operation of the remote controller RM1. The following mainly describes the differences.

Figure 3:
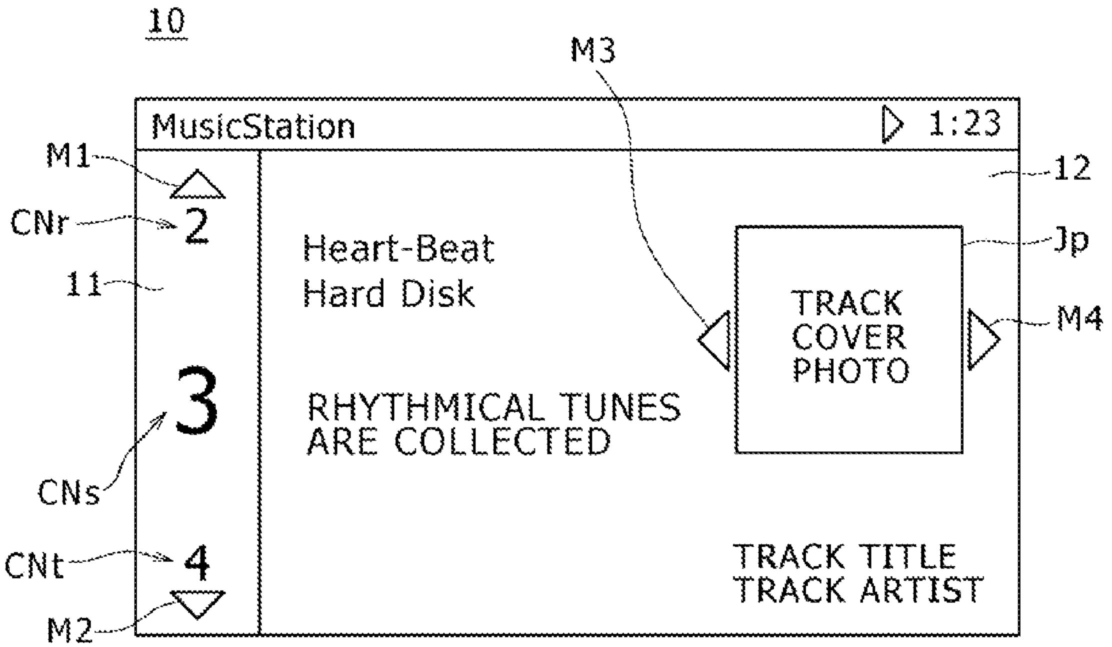
FIG. 3 is a diagram illustrating an exemplary configuration of a selection screen.
Figure 15:
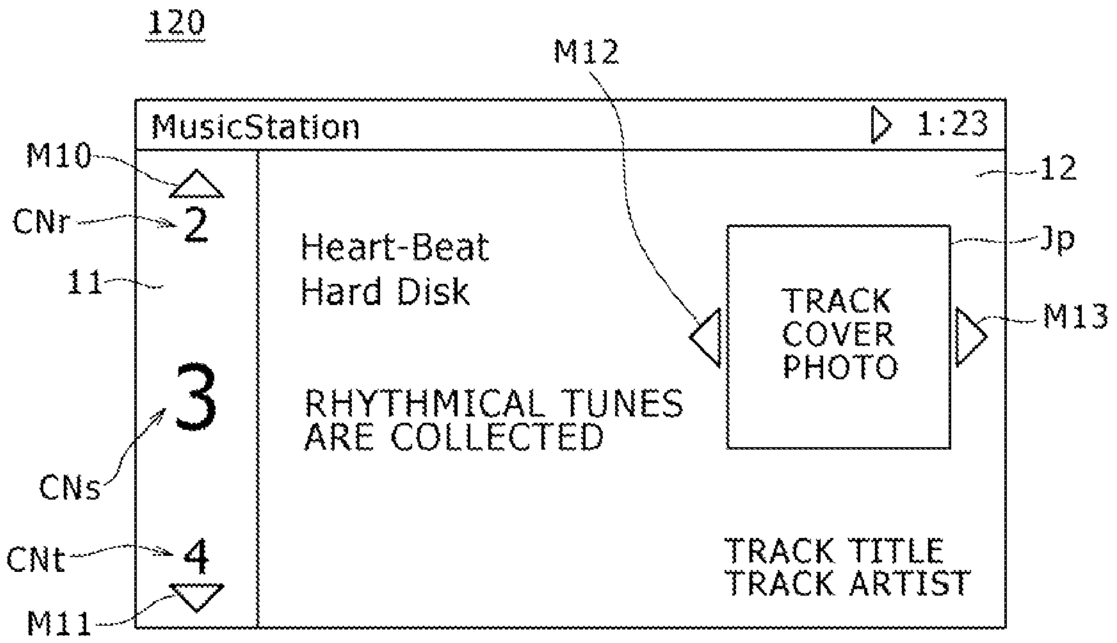
FIG. 15 is a diagram illustrating an exemplary configuration of a selection screen practiced as the first embodiment of the invention.

To be more specific, starting the MusicStation function in response to a MusicStation function start operation entered when the user presses the function switching button B11 of the remote controller RM1, the music reproducing apparatus 110 displays a selection screen 120 onto the display block 113 as a GUI screen shown in FIG. 15 of which reference numerals are substantially the same as those shown in FIG. 3.

As with the selection screen 10 of the above-described basic configuration, the selection screen 120 has a channel selection area 11 with its longitudinal direction extends upward and downward at the left of the screen and a music selection area 12 in the rest of the space of the screen as shown. In the center of the channel selection area 11, channel number CNs ("3" for example) of the currently selected channel is displayed. In the upper and lower portions in the channel selection area 11, channels numbers CNr ("2" for example) and CNt ("4" for example) of the channels that are selectable from the currently selected channel.

Further, in the top vicinity of channel number CNr, a triangular first mark M10 pointing upward is shown. In the bottom vicinity of channel number CNt, an upside down triangular second mark M11 is shown. These first and second marks are shaped in correspondence with the up button B13 and the down button B14 of the remote controller RM1. Operating the up button B13 can switch the currently selected channel to a channel of channel number CNr and operating the down button B14 can switch the currently selected channel to a channel of channel number CNt.

Then, in response to a channel switching operation done through the up button B13 and the down button B14 of the remote controller RM1, the control block 112 of the music reproducing apparatus 110 switches between channel numbers CNs (namely, switches between channels) to be displayed in the channel selection area 11 in a sequence of channel numbers CN (CN1 through CN3, . . . ) in the channel list CL, thereby allowing the user to easily recognize channel switching.

On the other hand, the music selection area 12 shows a list name of a channel play list (or a list in selection) allocated to a channel in selection and a list description text on the left side of the music selection area 12. In response to a channel switching operation done through the up button B13 and the down button B14 of the remote controller RM1, the control block 112 of the music reproducing apparatus 110 switches between list names and list description texts to be displayed in the music selection area 12, thereby allowing the user to easily recognize the contents of a channel in selection.

The right side of the music selection area 12 shows a cover photo Jp corresponding to the music in selection (namely, a music track based on music data Ad corresponding to music data information Ai selected from the list PL in selection) and, below the cover photo Jp, a track title and an artist name corresponding to the music being reproduced.

In addition, in the left vicinity of the cover photo Jp, a triangular third mark M12 is shown with its top directed to the left, while, in the right vicinity of the cover photo Jp, a triangular fourth mark M13 is shown with its top directed to the right. These third and fourth marks M12 and M13 correspond in shape to the left button B15 and the right button B16 of the remote controller RM1, respectively. Operating the left button B15 can switch to a music track based on the immediately preceding music data Ad in the list PL in selection and operating the right button B16 can switch to a music track based on the next music data Ad in the list PL in selection.

Then, the control block 112 of the music reproducing apparatus 110 switches between cover photos Jp, track titles, and artist names in response to a music track switching operation done through the left button B15 or the right button B16 of the remote controller RM1 (namely, switches between music tracks), thereby allowing the user to easily recognize the contents of a music track in selection.

Thus, while letting the user visually recognize the contents of channel and music track through the selection screen 120, the music reproducing apparatus 110 switches between channels and selects a specified channel in response to a user operation done through the up button B13 or the down button B14 of the remote controller RM1 and switches between music tracks and selects a specified music track in response to a user operation done through the left button B15 or the right button B16 of the remote controller RM1.

Figure 16:
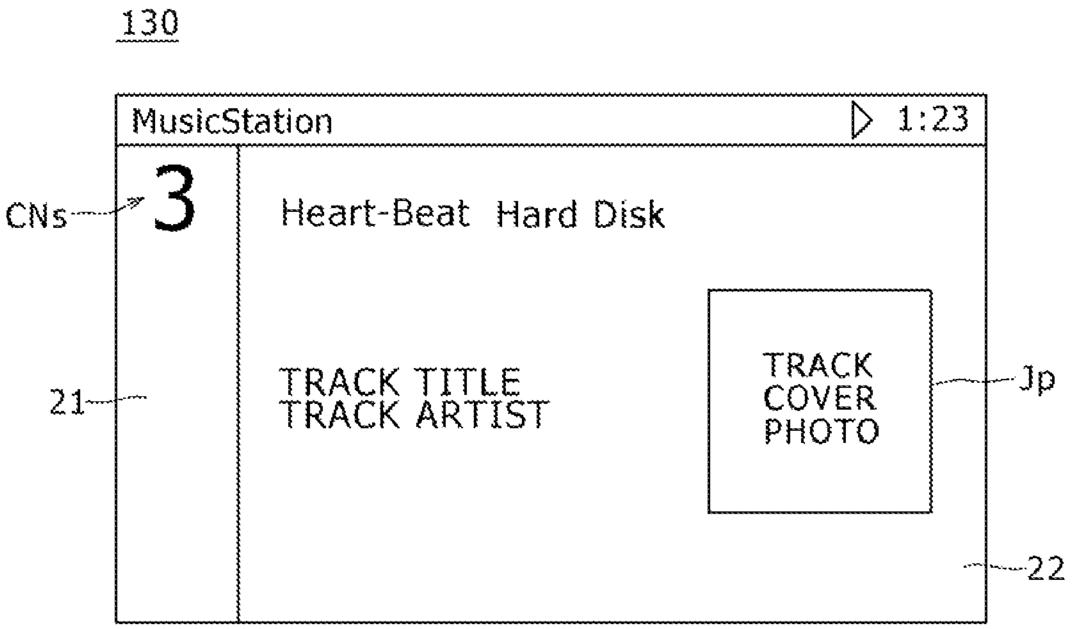
FIG. 16 is a diagram illustrating an exemplary configuration of a reproducing screen practiced as the first embodiment of the invention.

If the enter button B17 of the remote controller RM1 is operated with the selection screen 120 displayed, the control block 112 of the music reproducing apparatus 110 switches the selection screen 120 to the reproducing screen 130 shown in FIG. 16 of which reference numerals are substantially identical to those shown in FIG. 4.

In the left side of the reproducing screen 130, a selected channel display area 21 is arranged and, in the rest of this screen, a selected music display area 22 is arranged. The selected channel display area 21 shows only channel number CNs ("3" for example) of the currently selected channel. On the other hand, the selected music display area 22 shows the list name of a channel play list PL (namely, a list in selection) allocated to the channel in selection and the track title and artist name corresponding to the music track in selection. In the right side of the selected music display area 22, a cover photo Jp corresponding to the music track in selection is displayed.

Thus, the music reproducing apparatus 110 allows the user to visually recognize the contents of the selected channel and music track on the reproducing screen 130.

It should be noted that, if no operation has been executed by the user in a predetermined period of time after the displaying of the selection screen 120, the control block 112 of the music reproducing apparatus 110 also switches the selection screen 120 to the reproducing screen 130 like when the enter button B17 of the remote controller RM1 is operated.

Further, recognizing that a channel switching operation has been done through the up button B13 or the down button B14 of the remote controller RM1 with the reproducing screen 130 displayed or a music track switching operation has been done through the left button B15 or the right button B16 with the reproducing screen 130 displayed, the control block 112 of the music reproducing apparatus 110 switches the GUI screen from the reproducing screen 130 to the selection screen 120 again.

Figure 17:
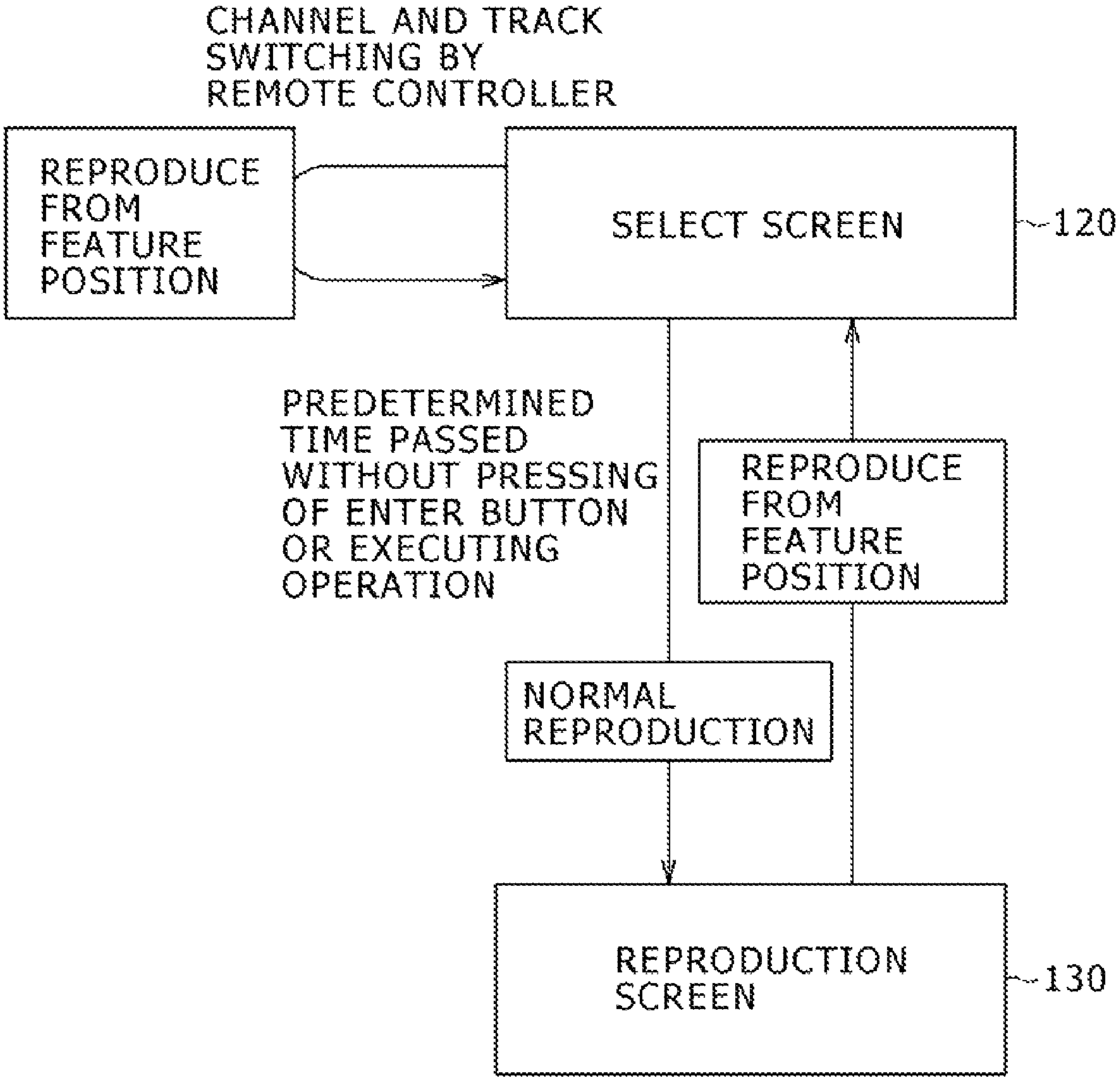
FIG. 17 is a block diagram illustrating screen switching processing and accompanying reproduction control processing practiced as the first embodiment of the invention.

The following further describes GUI screen switching described above and accompanying music data reproduction control with reference to FIG. 17. Starting the MusicStation function, the control block 112 of the music reproducing apparatus 110 displays the selection screen 120 and, at the same time, gets in a partial reproducing mode for reproducing music data from a feature position thereof.

In this partial reproducing mode, the control block 112 of the music reproducing apparatus 110 switches between channels in accordance with a channel switching operation done through the remote controller RM1 and switches to a music track of the selected channel or switches between music tracks on the same channel on the selection screen 120 in accordance with a music track switching operation. Every time music track switching takes place, the control block 112 of the music reproducing apparatus 110 reproduces the music data Ad corresponding to the selected music track from a feature position thereof.

If the enter button B17 of the remote controller RM1 is pressed in the partial reproducing mode or a predetermined period of time has passed without a user operation through the remote controller RM1, then the control block 112 of the music reproducing apparatus 110 switches the display to the reproducing screen 130 and, at the same time, gets in the normal reproducing mode in which music data Ad is normally reproduced.

Then, until a channel switching operation or a music track switching operation is executed through the remote controller RM1, the control block 112 of the music reproducing apparatus 110 sequentially reproduces the music data Ad from the head position thereof in accordance with the selected list PL. Next, when a channel switching operation or a music track switching operation is executed through the remote controller RM1, the control block 112 of the music reproducing apparatus 110 gets in the partial reproducing mode again.

Thus, the control block 112 of the music reproducing apparatus 110 appropriately switches between the partial reproducing mode and the normal reproducing mode, thereby reproducing music data Ad always without discontinuation during the execution of the MusicStation function regardless in which mode the control block 112 is running.

Figure 18:
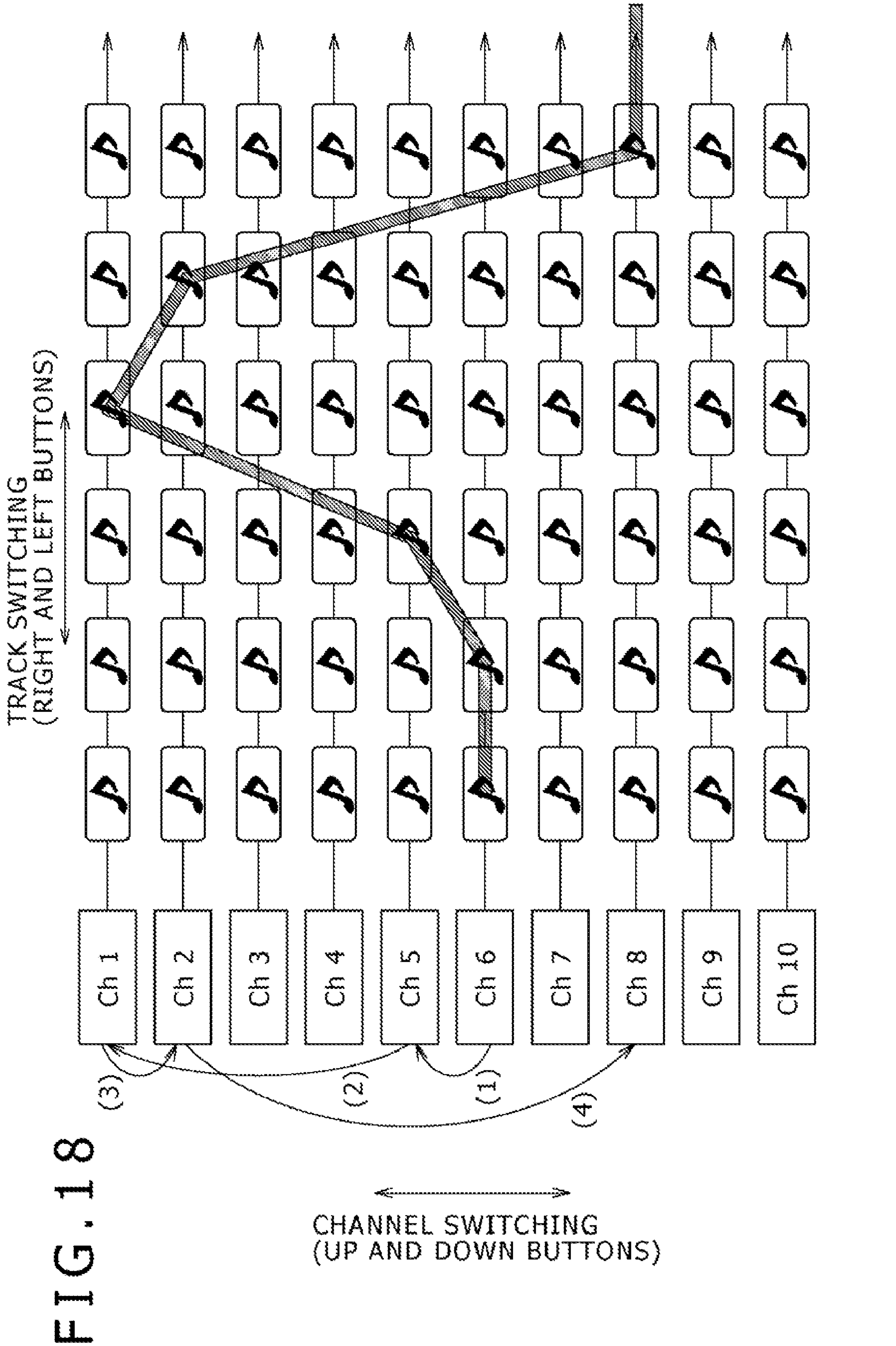
FIG. 18 is a schematic diagram illustrating manners of channel switching and music track switching practiced as the first embodiment of the invention.

Consequently, when this MusicStation function is being executed, the music reproducing apparatus 110 can switch between channel play lists PL on a channel basis in accordance with an operation done by the user through the up button B13 or the down button B14 of the remote controller RM1 and between music tracks to be reproduced within a channel in accordance with an operation done through the left button B15 or the right button B16 as if switching between radio preset stations as shown in FIG. 18, thereby allowing the user to more easily hear desired music tracks as if hearing music broadcast from radio stations.

The following describes a MusicStation function startup procedure, a channel switching procedure, and a music track switching procedure. These processing operations are substantially the same as those of the basic configuration described above except for the processing corresponding to the operations of the remote controller RM1. The following mainly describes these differences.

Figure 19:
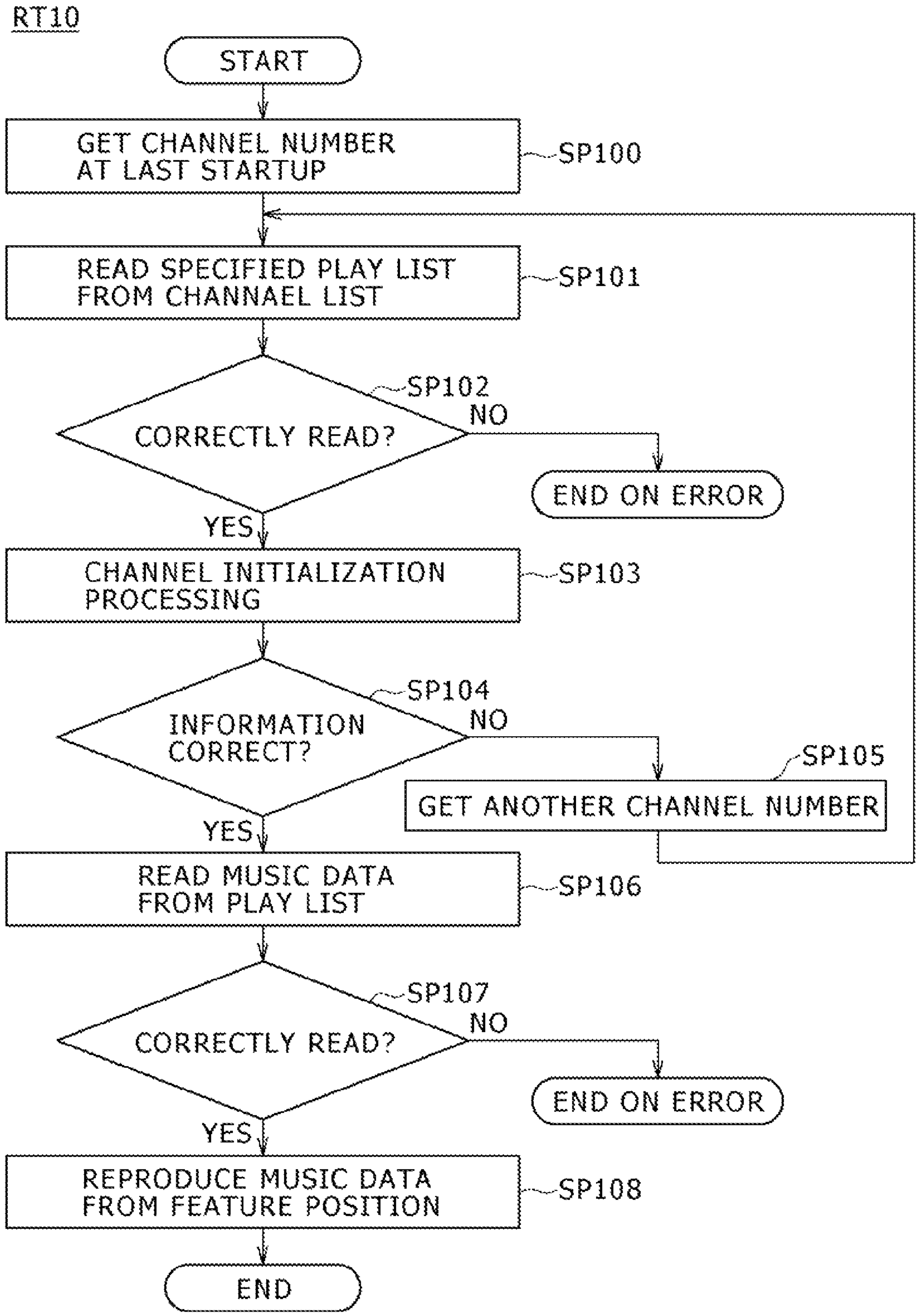
FIG. 19 is a flowchart indicative of a MusicStation function startup procedure practiced as the first embodiment of the invention.

First, the MusicStation function startup procedure will be describes. As shown in FIG. 19, recognizing that a switching operation to the MusicStation function has been done by the user through the remote controller RM1, the control block 112 of the music reproducing apparatus 110 starts a MusicStation function startup procedure RT10, upon which the procedure goes to step SP100.

In step SP100, the control block 112 gets the channel number CN of a channel selected last at the time of the last startup of the MusicStation function, upon which the procedure goes to step SP101. It should be noted that the control block 112 of the music reproducing apparatus 110 stores selected channel information indicative of the channel number CN of a channel in selection to the content storage block 115 or the list storage block 117 and, at the same time, updates this selected channel information every time channel numbers CN are switched between.

In step SP101, the control block 112 specifies a channel play list PL corresponding to the obtained channel number CN on the basis of a channel list CL and reads the specified channel play list (or specified list) PL from the list storage block 117, upon which the procedure goes to step SP102.

In step SP102, the control block 112 determines whether the specified list PL has been correctly read. If the determination in step SP102 is in the negative, the control block 112 abnormally ends this MusicStation function start up procedure RT10. If the determination is in the affirmative, the procedure goes to step SP103.

In step SP103, the control block 112 executes channel initialization processing (for example, randomly sorting music tracks to be reproduced within the specified list PL) on the specified list PL, upon which the procedure goes to step SP104. In step SP104, the control block 112 determines whether the information of the initialized specified list PL (namely, list information Li and music data information Ai) is correct. If the determination is in the negative in step SP104, then the procedure goes to step SP105, in which the control block 112 newly gets the channel number CN of the channel allocated with a default play list DPL, upon which the procedure returns to step SP101, reading the channel play list PL corresponding to the newly obtained channel number CN.

On the other hand, if the determination is in the affirmative in step SP104, then the procedure goes to step SP106. In step SP106, the control block 112 specifies one piece of music data Ad (for example, the music data Ad to be reproduced first) from the specified list PL and reads the specified music data Ad from the content storage block 115, upon which the procedure goes to step SP107.

In step SP107, the control block 112 determines whether the specified music data has been correctly read. If the determination is in the negative in step SP107, then the control block 112 abnormally ends this MusicStation function startup procedure RT10. On the other hand, if the determination is in the affirmative in step SP107, then the procedure goes to step SP108.

In step SP108, the control block 112 displays the channel number CN obtained in step SP100 or SP105 as the channel number CNs of the channel in selection, displays, on the display block 113, the selection screen 120 showing list information Li (list name Lt and list description Lde) of the specified list PL read in step SP101 and attribute information Ti (cover photo, track title, and artist name) of the specified music data Ad read in step SP106, and starts the reproduction of the specified music data Ad from a feature position (for example, a position indicated by one of three feature positional information Ct1 through Ct3), thereby ending this MusicStation function startup procedure RT10.

By this MusicStation function procedure RT10, the music reproducing apparatus 110 starts up the MusicStation function.

Figure 20:
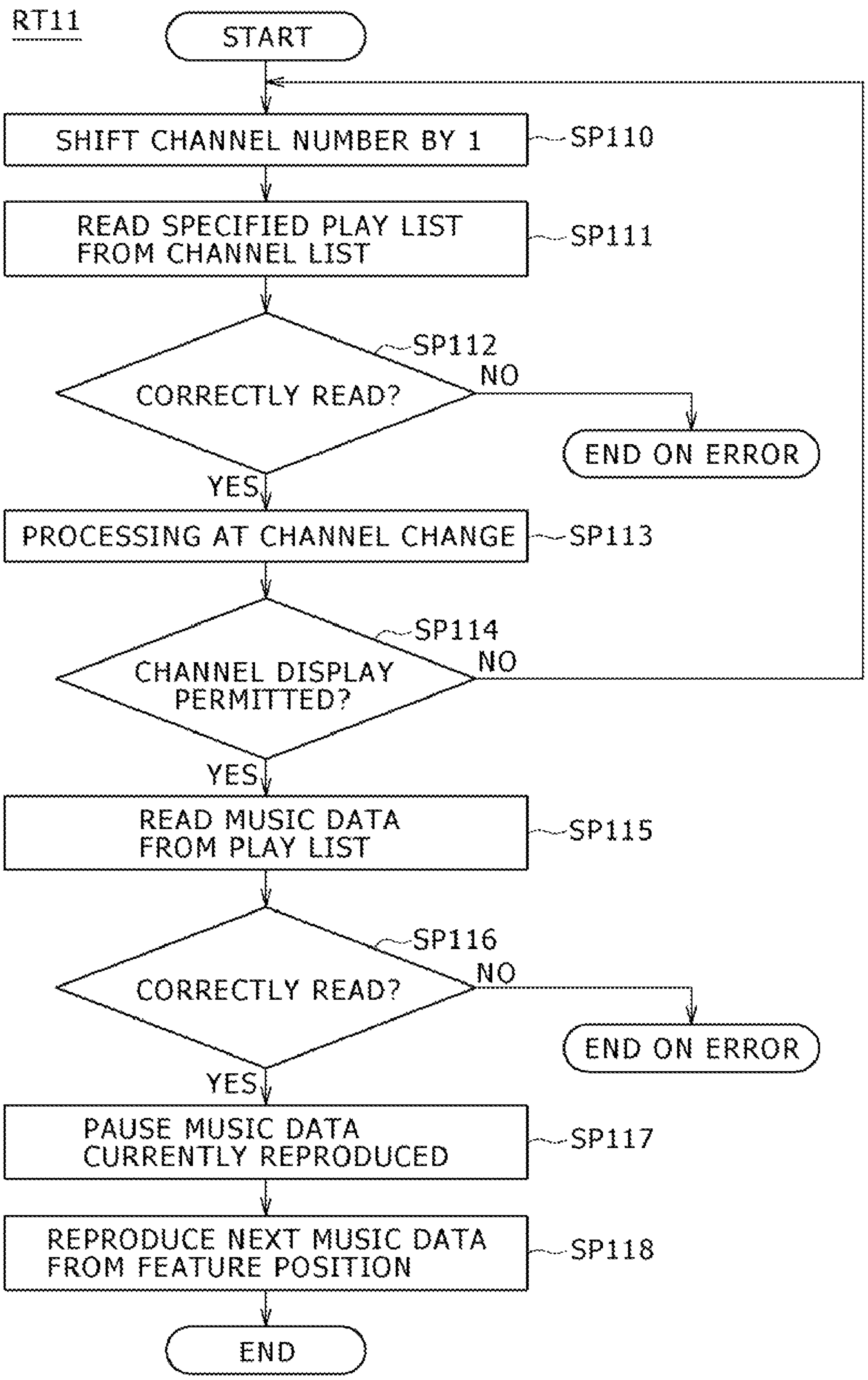
FIG. 20 is a flowchart indicative of a channel switching procedure practiced as the first embodiment of the invention.

The following describes a channel switching procedure to be executed in the MusicStation function. As shown in FIG. 20, recognizing that a channel switching operation has been done through the up button B13 or the down button B14 during the reproduction of the music data Ad by executing MusicStation function, the control block 112 of the music reproducing apparatus 110 starts a channel switching procedure RT11, upon which the procedure goes to step SP110.

In step SP110, with reference to the channel number CN (namely, channel number CNs displayed on the selection screen 120) of the channel selected until the channel switching operation, if the up button B13 of the remote controller RM1 is operated, the control block 112 increments this channel number CN by 1 (namely, channel number CNr) and uses it as the channel number CN after switching and, if the down button B14 has been operated, decrements this channel number by 1 (namely, channel number CNt) and uses it as the channel number CN after switching, upon which the procedure goes to step SP111.

It should be noted that the control block 112 is configured to control the switching of channel numbers CN in a circular manner by connecting the head of channel numbers CN with the tail thereof.

In step SP111, the control block 112 specifies the channel play list PL corresponding to the channel number CN after switching on the basis of channel list CL and reads the specified channel play list (or the specified list) from the list storage block 117, upon which the procedure goes to step S112.

In step SP112, the control block 112 determines whether the specified list has been correctly read or not. If the determination is in the negative, then the control block 112 abnormally ends this channel switching procedure RT111. On the other hand, if the determination is in the affirmative, then the procedure goes to step SP113.

In step SP113, the control block 112 executes channel change time processing (for example, reconfiguration of the specified list PL) on the specified list PL, upon which the procedure goes to step SP114. In step SP114, the control block 112 determines on the basis of list reproduction setting Ldi included in list information Li of the specified list PL after channel change time processing whether the displaying of the channel allocated with this specified list is permitted. If the determination is in the negative in step SP114, then the procedure returns to step SP110 to increment or decrement the obtained channel number CN after switching and provides a resultant number as a new channel number CN after switching.

On the other hand, if the determination is in the affirmative at step SP114, the procedure goes to step SP115. In step SP115, the control block 112 specifies one piece of music data Ad (for example, the music data Ad to be reproduced first) from the specified list PL and reads the specified music data Ad from the content storage block 115, upon which the procedure goes to step SP116.

In step SP116, the control block 112 determines whether the specified music data Ad has been correctly read or not. If the determination is in the negative, then the control block 112 abnormally ends this channel switching procedure RT11. On the other hand, if the determination is in the affirmative, the procedure goes to step SP117.

In step SP117, the control block 112 stops the reproduction of the currently reproduced music data Ad, displays the channel number CN after switching obtained in step SP110 as channel number CNs in selection, displays, on the display block 113, the selection screen 120 showing list information Li (list name Lt and list description Lde) of the specified list PL read in step SP111 and attribute information Ti (cover photo, track title, and artist name) of the specified music data Ad read in step SP115, and starts the reproduction of the specified music data Ad from a feature position (a position indicated by one of three feature positional information Ct1 through Ct3), thereby ending this channel switching procedure RT11.

By this channel switching procedure RT11, the music reproducing apparatus 110 switches between channels in accordance with operations done through the remote controller RM1.

Figure 21:
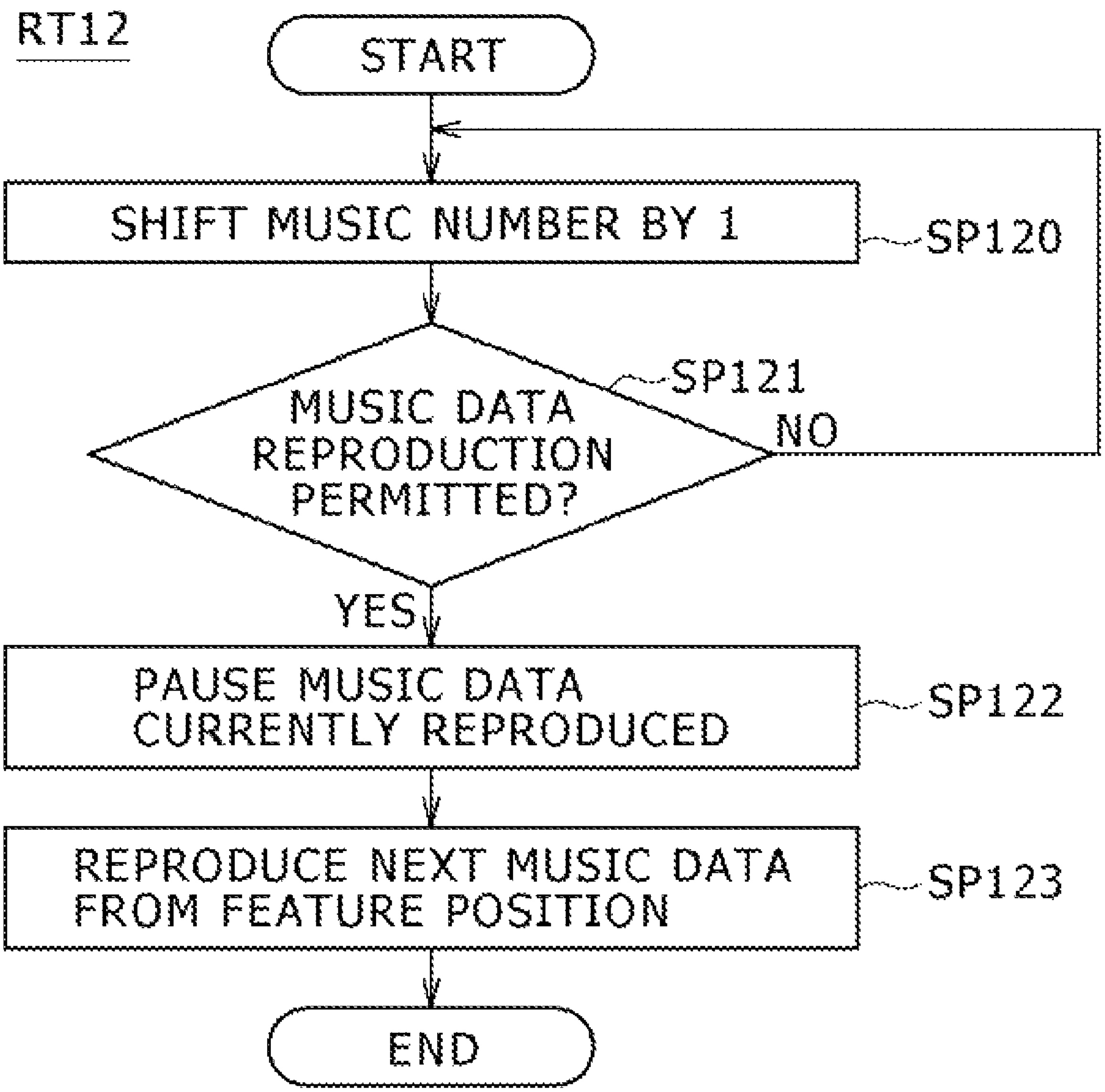
FIG. 21 is a flowchart indicative of a music track switching procedure practiced as the first embodiment of the invention.

The following describes a music track switching operation to be executed in the MusicStation function. As shown in FIG. 21, recognizing that a music track switching operation has been done through the left button B15 or the right button B16 during the reproduction of the music data Ad by executing MusicStation function, the control block 112 of the music reproducing apparatus 110 starts a music track switching procedure RT12, upon which the procedure goes to step SP120.

In step SP120, with reference to the music track number in the music data Ai corresponding to the music track selected until the music track switching operation, if the left button B15 of the remote controller RM1 is operated, the control block 112 decrements this music track number by 1 and uses it as the music track number after switching and, if the right button B16 has been operated, increments this music track number by 1 and uses it as the music track number after switching, upon which the procedure goes to step SP121.

It should be noted that the control block 112 is configured to control the switching of music track numbers in a circular manner by connecting the head of music track numbers with the tail thereof.

In step SP121, the control block 112 determines on the basis of music data reproduction setting Adi of the music data information Ai corresponding to the music track number after switching whether the reproduction of the music data Ad (or specified music data) specified in this music data information Ai is permitted or not. If the determination is in the negative in step SP121, then the procedure returns to step SP120 to further increment or decrement by 1 the obtained music track number after switching to provide a resultant number as a new music track number after switching.

On the other hand, if the determination is in the affirmative in step SP121, then the procedure goes to step SP122. In step SP122, the control block 112 stops the reproduction of the currently reproduced music data Ad, upon which the procedure goes to step SP123. In step SP123, the control block 112 displays, on the display block 113, the selection screen 120 showing attribute information Ti (cover photo, track title, and artist name) of the specified music data Ad and starts the reproduction of the specified music data Ad from a feature position (a position indicated by one of three feature positional information Ct1 through Ct3), thereby ending this music track switching procedure RT12.

By this music track switching procedure RT12, the channel selection area 11 switches between music tracks in accordance with operations done through the remote controller RM1.

The following describes a method of channel display setting. This display setting method is substantially the same as that of the basic configuration except for the points corresponding to the operation of the remote controller RM1. Therefore, the following mainly describes these differences.

Figure 22:
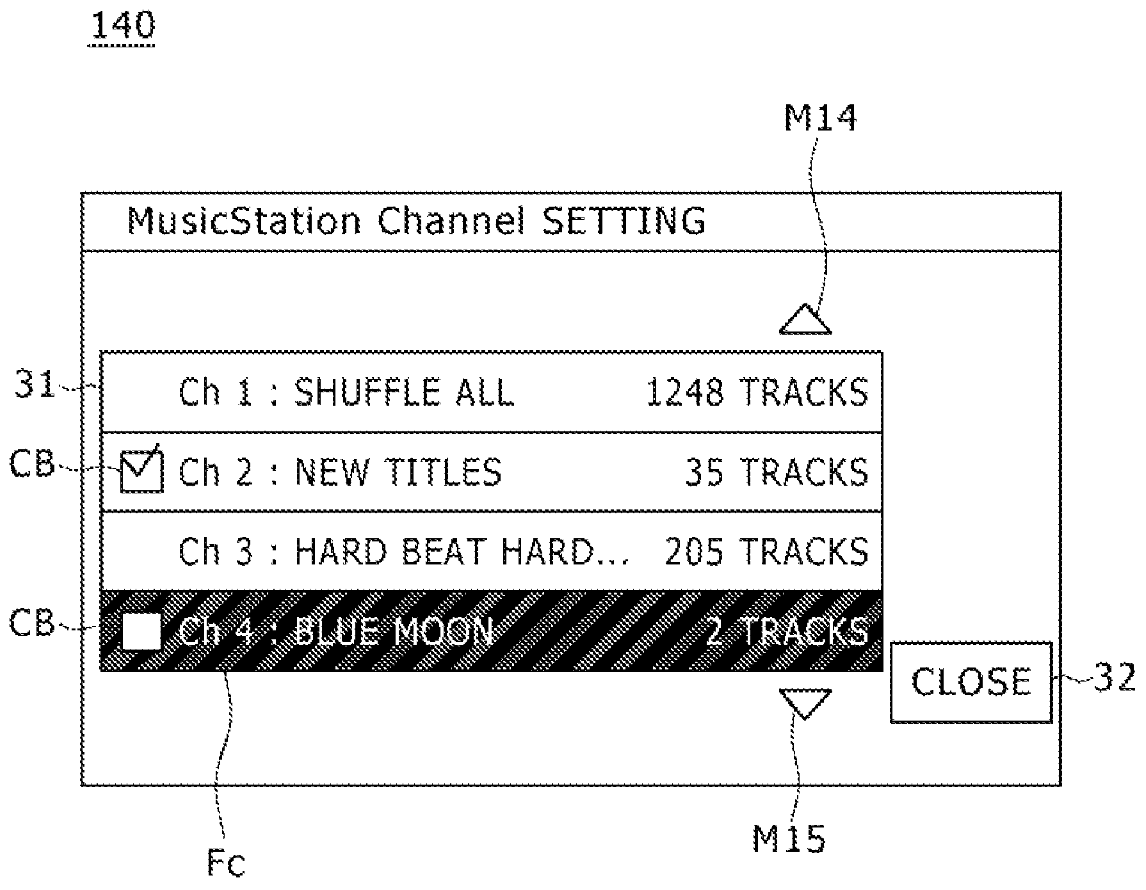
FIG. 22 is a diagram illustrating an exemplary configuration of a channel display setting screen practiced as the first embodiment of the invention.
Figure 23:
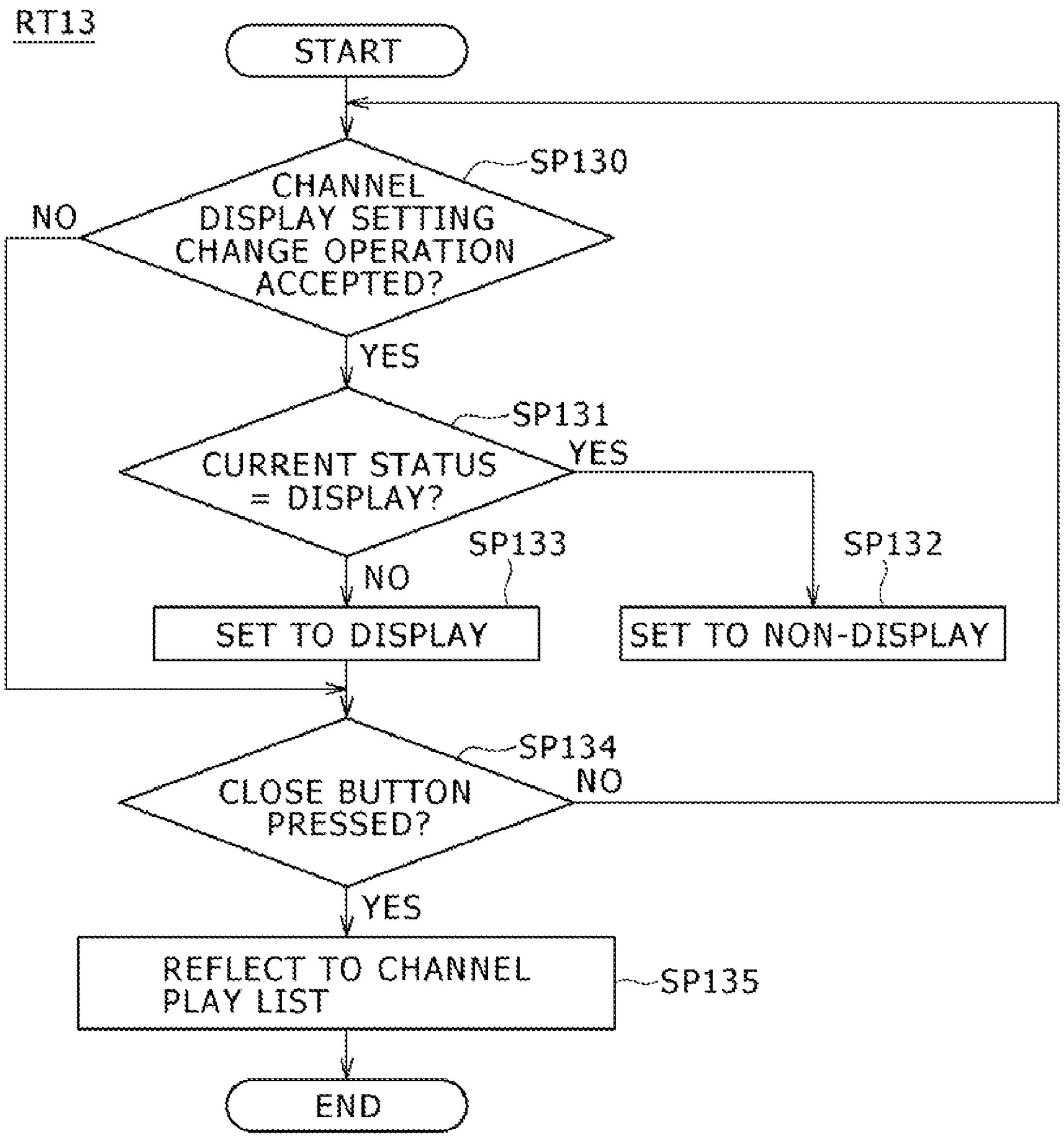
FIG. 23 is a flowchart indicative of a channel display setting procedure practiced as the first embodiment of the invention.

To be more specific, recognizing that the setting button B12 of the remote controller RM1 has been operated during the execution of the MusicStation function, the control block 112 of the music reproducing apparatus 110 displays a channel display setting screen 140 as shown in FIG. 22 in which the same parts are denoted by the same reference numerals shown in FIG. 10.

The channel display setting screen 140 shows, in the center thereof, a channel information list 31 in which channel information for each of channels usable by the MusicStation function is arranged in a sequence of channel lists CL and, in the lower right corner, a close button 32 for closing the channel display setting screen 140 upon ending of the setting.

The channel information list 31 shows focus Fc for the selected channel information.

In the top vicinity of this channel information list 31, a triangular fifth mark M14 pointing upward is shown. In the bottom vicinity of the channel information list 31, an upside down triangular sixth mark M15 is shown. These fifth and sixth marks are shaped in correspondence with the up button B13 and the down button B14, respectively, of the remote controller RM1. Operating the up button B13 can shift focus Fc displayed in the channel information list 31 to channel information one line up and operating the down button B14 can shift focus Fc to the channel information one line down.

The control block 112 of the music reproducing apparatus 110 is configured to shift focus Fc within the channel information list 31 in accordance with a focus move operation done through the up button B13 or the down button B14 of the remote controller RM1, thereby selecting desired channel information.

It should be noted that this channel information list 31 shows only four channels of channel information at a time; however, operating the up button B13 of the remote controller RM1 with focus Fc located to the channel information at the top line or the down button B14 with focus Fc located to the channel information at the bottom line scrolls up or down the channel information displayed in the channel information list 31 by one line, thereby allowing the user to confirm the channel information of all channels.

At this moment, the control block 112 of the music reproducing apparatus 110 can continuously the music data Ad registered in the channel play list PL of a channel corresponding to the channel information selected by use of focus Fc from the feature position of the music data Ad every several seconds, thereby letting the user preview the music carried on the channel.

Then, when the enter button B17 of the remote controller RM1 is operated with the channel information selected, the control block 112 of the music reproducing apparatus 110 changes channel display setting from "display" to "non-display" if the check box CB of the selected channel information is checked; if the check box CB is unchecked, the control block 112 changes channel display setting from "non-display" to "display" by newly checking the check box CB.

Next, when the close button 32 of the channel display setting screen 140 is operated by the user through the remote controller RM1, the control block 112 of the music reproducing apparatus 110 reflects the channel display setting in the channel display setting (namely, the status of check box CB) screen 140 onto the list reproduction setting Ldi of the channel play list PL allocated to each channel, thereby closing this channel display setting screen 140.

Thus, the channel display setting screen 140 allows the changing of the channel display setting for each channel as instructed by the user through the remote controller RM1. The channel of which channel display setting has been changed to "non-display" will not be displayed on the GUI screens (namely, the selection screen 120 and the reproducing screen 130) and therefore cannot be selected.

Consequently, the music reproducing apparatus 110 allows the user to set channels on the selection screen 120 and the reproducing screen 130 for selection, thereby providing user-preferred channel configurations to be displayed on the selection screen 120 and the reproducing screen 130.

The following describes a procedure of this channel display setting. Recognizing that the setting button B12 of the remote controller RM1 has been operated during the execution of the MusicStation function, the control block 112 of the music reproducing apparatus 110 switches the GUI screen of the MusicStation function to the channel display setting screen 140 and, at the same time, starts a channel display setting procedure RT13, upon which the procedure goes to step SP130.

In step SP130, the control block 112 determines whether the enter button B17 of the remote controller RM1 has been operated with channel information selected with focus Fc, namely, whether a display setting change operation has been accepted or not. If the determination is in the affirmative in step SP130, then the procedure goes to step SP131.

In step SP131, the control block 112 determines whether the current display setting of the selected channel information is "display" or not. If the determination is in the affirmative in step SP131, then the procedure goes to step SP132.

In step SP132, the control block 112 unchecks the check box CB of the selected channel information to change the display setting from "display" to "non-display", upon which the procedure goes to step SP134.

On the other hand, if the determination is in the negative in step SP131, then the procedure goes to step SP133. In step SP133, the control block 112 checks the check box CB of the selected channel information to change the display setting from "non-display" to "display", upon which the procedure goes to step SP134.

On the other hand, if the determination is in the negative in step SP130, then the procedure jumps to step SP134 by skipping steps SP131 through SP133.

In step SP134, the control block 112 determines whether the close button 32 of the channel display setting screen 140 has been operated through the remote controller RM1. If the determination is in the negative at step SP134, then the procedure returns to step SP130, in which the control block 112 determines whether a display setting change operation has been done by the user.

On the other hand, if the determination is in the affirmative, then the procedure goes to step SP135, in which the control block 112 reflects the channel display setting in the channel display setting screen 140 onto the list reproduction setting Ldi of the channel play list PL allocated to each channel and closes the channel display setting screen 140, thereby ending this channel display setting procedure RT13.

By this channel display setting procedure RT13, the music reproducing apparatus 110 changes channel display setting as instructed by the user through the remote controller RM1.

As described so far, the music reproducing apparatus 110 of the first embodiment of the invention has the MusicStation function corresponding to the operation of the remote controller RM1 and is configured to allow the user to easily execute the startup of the MusicStation function, channel switching, music track switching, and channel display setting as instructed by the user through the remote controller RM1.

It should be noted that the music reproducing apparatus 110 of the first embodiment of the invention has, as one of channels to be handled by the MusicStation function, a special channel (hereafter referred to also as a preset channel) in which the channel play lists PL to be allocated in accordance with time zones (for example, morning, afternoon, evening, night, and midnight) are automatically switched between.

The channel play lists PL allocated to this preset channel include those corresponding to time zones, such as a channel play list PL made up of the music data Ad corresponding to the music suitable for morning (hereafter referred to also as a morning list), a channel play list PL made up of the music data Ad corresponding to the music suitable for afternoon (hereafter referred to also as a afternoon list), a channel play list PL made up of the music data Ad corresponding to the music suitable for evening (hereafter referred to also as an evening list), a channel play list PL made up of the music data Ad corresponding to the music suitable for night (hereafter referred to also as a night list), and a channel play list PL made up of the music data Ad corresponding to the music suitable for midnight (hereafter referred to also as a midnight list), for example.

The channel play lists PL corresponding to time zones are automatically updated every time music data Ad is stored in the content storage block 115.

To be more specific, the night list PL has "quiet" as a keyword, for example. The control block 112 of the music reproducing apparatus 110 newly stores music data Ad in the content storage block 115 and then, on the basis of this keyword "quiet", selects the music data Ad of which music impression value indicative of quietness is higher than a predetermined level from the music data Ad stored in the content storage block 115 and updates the night list PL so as to configure this list with the selected music data Ad.

Then, when the preset channel is selected as a result of a channel switching operation through the up button B13 or the down button B14 of the remote controller RM1 during the execution of the MusicStation function, the control block 112 of the music reproducing apparatus 110 identifies the current time zone on the basis of a clock signal supplied from a clock block 118, specifies one of the morning list PL, the afternoon list PL, the evening list PL, the night list PL, and the midnight list PL allocated to the preset channel in accordance with the identified time zone, and reproduces the music data Ad in accordance with this specified list.

Thus, when the preset channel is selected, the music reproducing apparatus 110 selects a channel play list PL corresponding to the current time zone and reproduces music data Ad in accordance with the selected channel play list PL, thereby letting the user hear the music suitable for the current time zone.

When the preset button B18 of the remote controller RM1 is operated, the control block 112 of the music reproducing apparatus 110 is adapted to immediately switch the channel in section to the preset channel regardless of the sequence of channel numbers CN in a channel list CL. Thus, when the preset button B18 is operated, the music reproducing apparatus 110 immediately switches to the preset channel, thereby letting the user hear the music suitable for the current time zone with a simpler operation by skipping the channel switching operation to be executed through the up button B13 or the down button B14.

Figure 24:
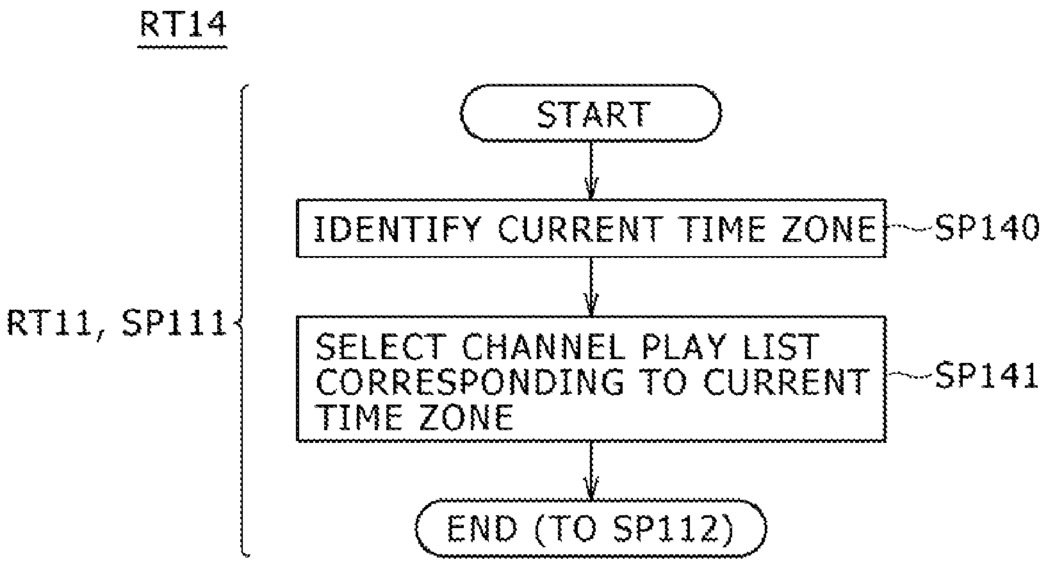
FIG. 24 is a flowchart indicative of list specification procedure practiced as the first embodiment of the invention.

The following describes channel play list PL specification processing (hereafter referred to also as list specification processing) to be executed when switching to the preset channel is executed, with reference to FIG. 24. It should be noted that this processing is executed in step SP111 if the channel number CN after switching in step SP110 in the above-mentioned channel switching procedure RT11 (FIG. 20) is the channel number CN of the preset channel.

To be more specific, if the channel number CN after switching is the channel number CN of the preset channel, the control block 112 of the music reproducing apparatus 110 starts a list specification procedure RT14, upon which the procedure goes to step SP140.

In step SP140, the control block 112 identifies the current time zone on the basis of a clock signal supplied from the clock block 118, upon which the procedure goes to step SP141. In step SP141, the control block 112 specifies one of the morning list PL, the afternoon list PL, the evening list PL, the night list PL, and the midnight list PL allocated to the preset channel in accordance with the identified time zone and reads the specified list PL from the list storage block 117, ending this list specification procedure RT14 (the procedure goes to step SP112 of the channel switching procedure RT11).

By this list specification procedure RT14, the music reproducing apparatus 110 can specify one of the morning list PL, the afternoon list PL, the evening list PL, the night list PL, and the midnight list PL allocated to the preset channel.

It should be noted that, if the preset button B18 is operated, the channel number CN after switching becomes the channel number CN of the preset channel, so that the music reproducing apparatus 110 may only immediately start this list specification procedure RT14 by skipping step SP110 of the above-mentioned channel switching procedure RT11.

(2-3) Operations and Effects of the First Embodiment:

In the above-mentioned configuration, the music reproducing apparatus 110 manages a plurality of music data Ad stored in the content storage block 115 by use of a plurality of channel play lists PL with the music data information Ai listed, this music data information being stored in the list storage block 117 and providing the content identification information of music data Ad.

In accordance with an operation done through the up button B13 or the down button B14 of the remote controller RM1, the control block 112 of the music reproducing apparatus 110 selects one of the plurality of channel play lists PL, selects one of the music data Ad registered in this selected channel play list, reproduces the selected music data Ad, and, in accordance with an operation done through the left button B15 or the right button B16 of the remote controller RM1, selects one of the music data Ad registered in the selected channel play list PL, reproducing the selected music data Ad.

As a result, until the user reproduces desired music data Ad, the music reproducing apparatus 110 may let the user execute only two selective operations at most of selecting a channel play list PL through the up button B13 or the down button B14 of the remote controller RM1 and selecting music data Ad through the left button B15 or the right button B16. In addition, because the up button B13 and the down button B14 for the selection of channel play list PL and the left button B15 and the right button B16 for the selection of music data Ad are separate buttons, the selection of channel play list PL and the selection of music dada Ad can be executed concurrently.

As described above, the information (allocated channel number, list name, and list description) of the selected channel play list PL and the information (cover photo, track title, and artist name) of the selected music data Ad are displayed on the same screen, so that the control block 112 of the music reproducing apparatus 110 can let the user select a channel play list PL and music data Ad while letting the user recognize the contents of channel play lists PL and the contents of music data Ad on the same screen.

Further, as described above, the control block 112 of the music reproducing apparatus 110 stores channel play lists PL according to time zones, such as a morning list, an afternoon list, an evening list, a night list, and a midnight list into the list storage block 117, selects one of these lists according to the current time zone, and reproduces music data Ad according to the selected channel play list, thereby letting the user hear the music suitable for the current time zone.

As described and according to the above-mentioned novel configuration, the music reproducing apparatus 110 practiced as the first embodiment of the invention may let the user execute only two selective operations at most of selecting a channel play list PL through the up button B13 or the down button B14 of the remote controller RM1 and selecting music data Ad through the left button B15 or the right button B16 until the user reproduces desired music data Ad. In addition, because the up button B13 and the down button B14 for the selection of channel play list PL and the left button B15 and the right button B16 for the selection of music data Ad are separate buttons, the selection of channel play list PL through the up button B13 or the down button B14 and the selection of music dada Ad through the left button B15 or the right button B16 can be executed concurrently. Consequently, the reproduction of desired content can be executed more easily than the related-art counterpart.

(2-4) Variations to the First Embodiment

It should be noted that, as with the above-described basic configuration, the first embodiment has been described in which the MusicStation function is started up with the channel selected last at the last startup selected. However, the present invention is not limited to this configuration; for example, the channel to be selected at the startup may be fixed to a particular channel.

Figure 25:
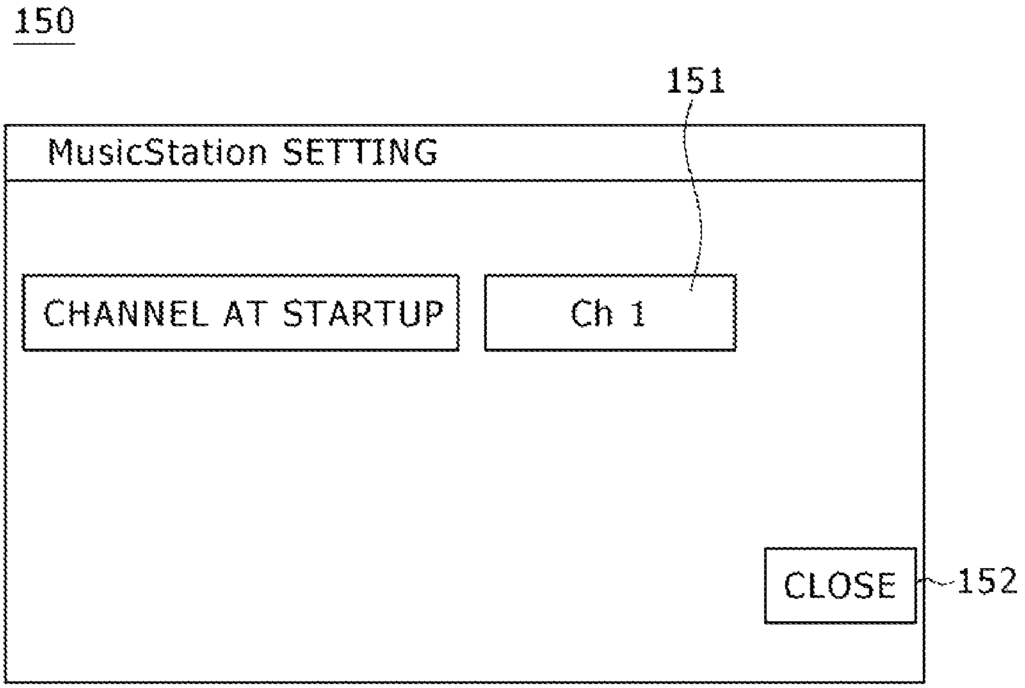
FIG. 25 is a diagram illustrating an exemplary configuration of a channel setting screen at startup practiced as a variation to the first embodiment of the invention.

In this case, the setting of a channel to be selected at the startup is executed on a startup-time channel setting screen 150 shown in FIG. 25, for example. Recognizing that the setting button B12 of the remote controller RM1 has been operated during the execution of the MusicStation function, the control block 112 of the music reproducing apparatus 110 displays the startup-time channel setting screen 150 on the display block 113.

It should be noted that the setting button B12 is also allocated with a calling command for calling the above-mentioned channel display setting screen 140, so that switching may be made between the channel display setting screen 140 and the startup-time channel setting screen 150 every time the setting button B12 is operated. However, it is also practicable to arrange, on the remote controller RM1, a setting button corresponding to the calling command for the channel display setting screen 140 and a setting button corresponding to the calling command for the startup-time channel setting screen 150.

The startup-time channel setting screen 150 has a startup-time channel display box 151 for displaying the channel number ("Ch1" for example) to be selected at startup and a close button 152 for closing the startup-time channel setting screen 150 at the end of the setting.

In accordance with an operation done through the up button B13 or the down button B14 of the remote controller RM1, the control block 112 of the music reproducing apparatus 110 switches between channel numbers to be displayed in the startup-time channel display box 150. When the close button 152 is operated through the remote controller RM1, the control block 112 stores the channel number displayed in the startup-time channel display box 151 into the content storage block 115 or the list storage block 117 as information (hereafter referred to also as startup-time channel information) indicative of the channel number of the channel to be selected at startup.

Thus, the control block 112 of the music reproducing apparatus 110 can let the user set channels to be selected at the time of startup. In this case, the processing of SP100 of the above-mentioned MusicStation function startup procedure RT10 may be changed from the getting of the channel number of the channel selected last at the last startup to the getting of the channel number to be shown in the startup-time channel information.

Further, it is also practicable to let the user select the channel selected last at the last startup or the channel set as a startup channel for the channel to be selected at the startup of the MusicStation function. In this case, either the channel number of a channel selected last at the last startup or the channel number of a channel set as the channel at the time of startup may be written to the startup-time channel information, for example.

It should be noted that, in the above-mentioned example, the startup-time channel information is used as the information indicative of the channel number of a channel to be selected at the time of startup, namely, the list selection information indicative of a channel play list PL to be selected first; however, it is also practicable to use various other kinds of information as far as these pieces of information are indicative of a channel play list PL to be selected first.

In the first embodiment of the invention, as with the above-described basic configuration, if shuffle reproduction is specified in the music track setting Ls of a channel play list PL, the music tracks in the channel play list PL are randomly sorted for reproduction at the time of channel initialization (step SP103 of the MusicStation function startup procedure RT10) to realize the random reproduction within the channel play list. However, it is also practicable to randomly sort the music tracks in the channel play list PL for reproduction at the time of channel changing processing (step SP113 of the channel switching procedure RT11).

Alternatively, it is practicable to randomly select one of the music data Ad registered in a channel play list PL every time music track switching is executed, thereby realizing the random reproduction within the channel play list PL, for example. To be more specific, if, for the processing in step SP120 of the music track switching procedure RT12, the shuffle reproduction is specified in the music track sequence setting Ls of the channel play list PL allocated to the channel in selection, then a music track number may only be selected in this channel play list PL to add the processing in which the selected music track number provides a music track number after switching.

Further, in the first embodiment of the invention, the remote controller RM1 is used for an operation block; however, the present invention is not limited to this. It is also practicable to arrange the buttons substantially the same in function as the buttons arranged on the remote controller RM1 onto the housing of the music reproducing apparatus 110, thereby providing an operation block.

Still further, in the first embodiment of the invention, the up button B13 and the down button B14 of the remote controller RM1 are used for the first input block 101 and the left button B15 and the right button B16 are used for the second input block 102; however, the present invention is not limited to this. It is also practicable to use a jog dial that is rotatable in the up and down directions for the first input block 101 and another jog dial that is rotatable in the left and right directions for the second input block 102, for example. Obviously, other various kinds of input devices are also be available for the first input block 101 and the second input block 102.

Yet further, in the first embodiment of the invention, in accordance with a channel switching operation and a music track switching operation done through the remote controller RM1, the reproduction of selected music data Ad is started from a feature position (a chorus, a melody change position, or the like); however, the present invention is not limited to this. It is also practicable to start the reproduction of selected music data Ad from the head position of each music track, for example.

In addition, in the first embodiment of the invention, at the selection of a preset channel as a special list made up of morning list PL, afternoon list PL, evening list PL, night list PL, and midnight list PL, the control block 112 of the music reproducing apparatus 110 selects one of morning list PL, afternoon list PL, evening list PL, night list PL, and midnight list PL in accordance with a time zone at that moment and reproduces music data Ad in accordance with the selected channel play list PL; however, the present invention is not limited to this. It is also practicable to change the volume or tone quality at the time of reproducing music data Ad.

In this case, as the volume setting at the time of reproducing music data Ad, the music reproducing apparatus 110 provides morning volume setting, afternoon volume setting, evening volume setting, night volume setting, and midnight volume setting, for example. To be more specific, the volume for the morning is highest, followed by the volumes for afternoon, evening, night, and midnight in this order, for example.

Then, at the reproduction of music data Ad and in accordance with the current time zone, the control block 112 of the music reproducing apparatus 110 selects one of morning volume setting, afternoon volume setting, evening volume setting, night volume setting, and midnight volume setting and controls the amplification in the reproducing block 116 so as to reproduce music data Ad at the volume level based on the selecting volume setting. Consequently, the music reproducing apparatus 110 can let the user hear music at a volume level suitable for the current time zone.

On the other hand, as the tone quality setting at the time of reproducing music data Ad, the music reproducing apparatus 110 provides morning tone quality setting, afternoon tone quality setting, evening tone quality setting, night tone quality setting, and midnight tone quality setting, for example. To be more specific, the bass emphasis for the morning is highest, followed by those of afternoon, evening, night, and midnight in this order, for example.

Then, at the reproduction of music data Ad and in accordance with the current time zone, the control block 112 of the music reproducing apparatus 110 selects one of morning tone quality setting, afternoon tone quality setting, evening tone quality setting, night tone quality setting, and midnight tone quality setting and controls the equalizing in the reproducing block 116 so as to reproduce music data Ad with the selected tone quality setting. Consequently, the music reproducing apparatus 110 can let the user hear music with a tone quality suitable for the current time zone.

In addition to the volume and the tone quality, the brightness or coloring of the display block 113 may be changed. In this case, as the brightness setting of the display block 113, the music reproducing apparatus 110 provides morning brightness setting, afternoon brightness setting, evening brightness setting, night brightness setting, and midnight brightness setting, for example. To be more specific, the brightness for the morning is darkest, following by those of afternoon, evening, night, and midnight in this order, for example.

Then, at the time of startup and in accordance with the current time zone, the control block 112 of the music reproducing apparatus 110 selects one of morning brightness setting, afternoon brightness setting, evening brightness setting, night brightness setting, and midnight brightness setting and displays each GUI screen onto the display block 113 with the selected brightness. Consequently, the music reproducing apparatus 110 can let the user see each GUI screen with the brightness suitable for the current time zone.

On the other hand, as the coloring setting for the display block 113, the music reproducing apparatus 110 provides morning coloring setting, afternoon coloring setting, evening coloring setting, night coloring setting, and midnight coloring setting, for example. To be more specific, the coloring for the morning is lightest, following by those of afternoon, evening, night, and midnight in this order, for example.

At the time of startup and in accordance with the current time zone, the control block 112 of the music reproducing apparatus 110 selects one of morning coloring setting, afternoon coloring setting, evening coloring setting, night coloring setting, and midnight coloring setting and displays each GUI screen onto the display block 113 with the selected coloring. Consequently, the music reproducing apparatus 110 can let the user see each GUI screen with the coloring suitable for the current time.

In addition, in the first embodiment of the invention, list reproduction setting Ldi included in list information Li is used as list selectable/non-selectable information indicative of whether each channel play list PL can be selected or not (namely, whether each channel play list PL can be displayed or not); however, the present invention is not limited to this. It is also practicable to use any other kinds of information as far as these kinds of information are indicative of whether each channel play list PL can be selected or not (namely, whether each channel play list PL can be displayed or not).

Further, in the first embodiment of the invention, music track sequence setting Ls is used as list reproduction sequence information for specifying the sequence of reproduction in each channel play list PL; however, the present invention is not limited to this. It is also practicable to use any other kinds of information as far as these kinds of information specify the sequence of reproduction in each channel play list PL.

Still further, in the first embodiment of the invention, switching is made between the reproducing screen 130 as the first display and the selection screen 120 as the second display; however, the present invention is not limited to this. It is also practicable to switch between other screens than the selection screen 120 and the reproducing screen 130 as the first and second screens.

Yet further, in the first embodiment of the invention, a keyword indicative of the characteristic of each channel play list PL is written to the list description Lde of list information Li as text information ("bright" for example); however, the present invention is not limited to this. It is also practicable to write information other than text information, such as "KW01" for example as the information for identifying a keyword. In this case, the control block 112 of the music reproducing apparatus 110 recognizes keyword "bright" on the basis of identification information "KW01" written to this list description Lde, for example.

In addition, in the first embodiment of the invention, when channel switching operation or a music track switching operation is executed with the reproducing screen 130 displayed, the GUI screen is switched from the reproducing screen 130 to the selection screen 120; however, the present invention is not limited to this. It is also practicable to switch the GUI screen from the reproducing screen 130 to the selection screen 120 only when a channel switching operation is executed with the reproducing screen 130 displayed and, when a music track switching operation is executed, switch between track titles, artist names, and cover photos Jp displayed on the reproducing screen 130 with the reproducing screen 130 kept displayed.

(3) Second Embodiment

(3-1) Outline of the Second Embodiment:

The following describes the outline of a second embodiment of the invention, followed by specific examples thereof.

Figure 26:
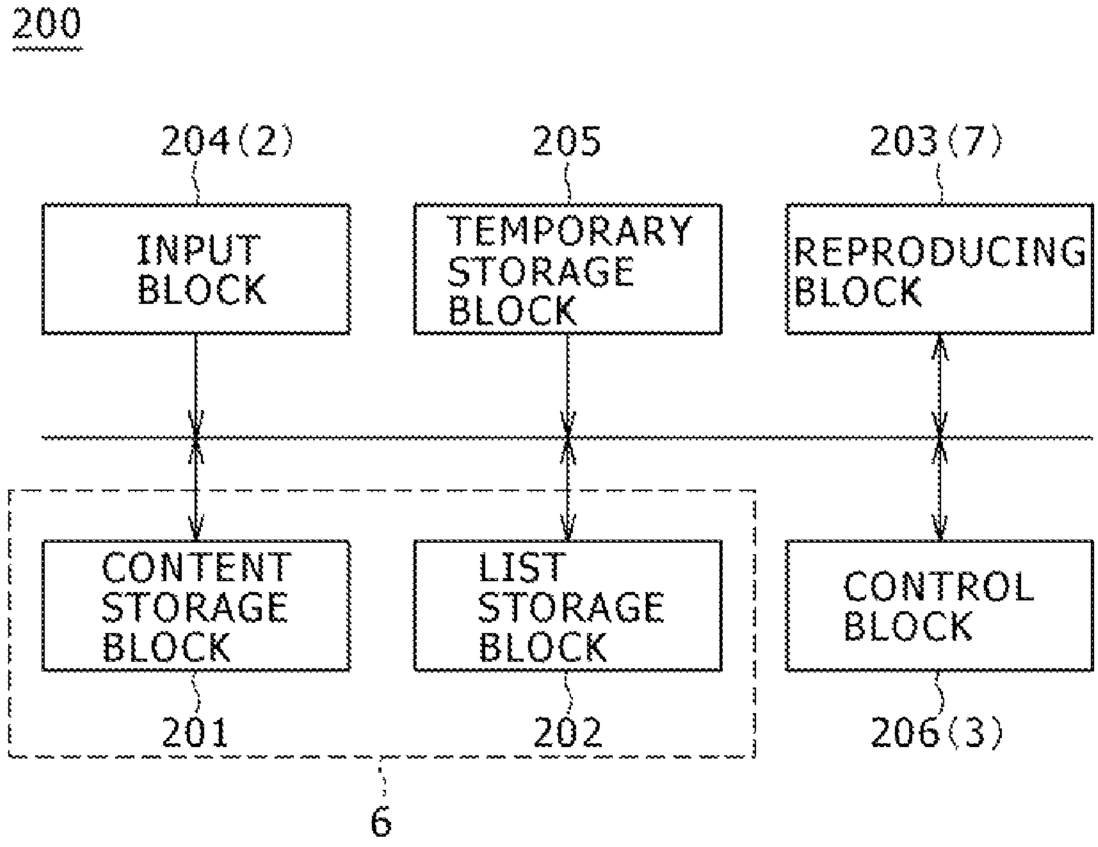
FIG. 26 is a block diagram illustrating an outline of the a content reproducing apparatus practiced as a second embodiment of the invention.

As shown in FIG. 26, a content reproducing apparatus 200 has content storage block 201 for storing one or more items of content, a list storage block 202 for storing a plurality of lists having content identification information for identifying contents, a reproducing block 203 for reproducing the content stored in the content storage block 201 on the basis of lists stored in the list storage block 202, an input block 204 through which an operation done by the user is entered in the content reproducing apparatus 200. The content reproducing apparatus 200 further has a control block 206 for selecting one of the lists stored in the list storage block 202, detecting a predetermined operation done through the input block 204 while the reproducing block 203 is reproducing content on the basis of the selected list, temporarily stores the content identification information of the reproduced content and the list identification information of the selected list into a temporary storage block 205, detecting a predetermined operation done through the input block 204 again, determining whether the list identification information selected this time matches the list identification information stored in the temporary storage block 205, and, if these two pieces of information are found mismatching, adding the content identification information stored in the temporary storage block 205 to the list selected this time.

It should be noted that the content storage block 201 and the list storage block 202 correspond to the storage block 6 of the content reproducing apparatus 1 (FIG. 1) that provides the above-described basic configuration, the input block 204 corresponds to the operation block 2 of the content reproducing apparatus 1, and the reproducing block 203 and the control block 206 correspond to the reproducing block 7 and the control block 3 of the content reproducing apparatus 1, respectively.

Configured as such, the content reproducing apparatus 200 according to the second embodiment of the invention allows the user to recognize the contents of content and can add user-desired content to another list only by repeating a predetermined operation twice, thereby significantly facilitating user-intended edit processing as compared with related-art technologies.

Figure 27:
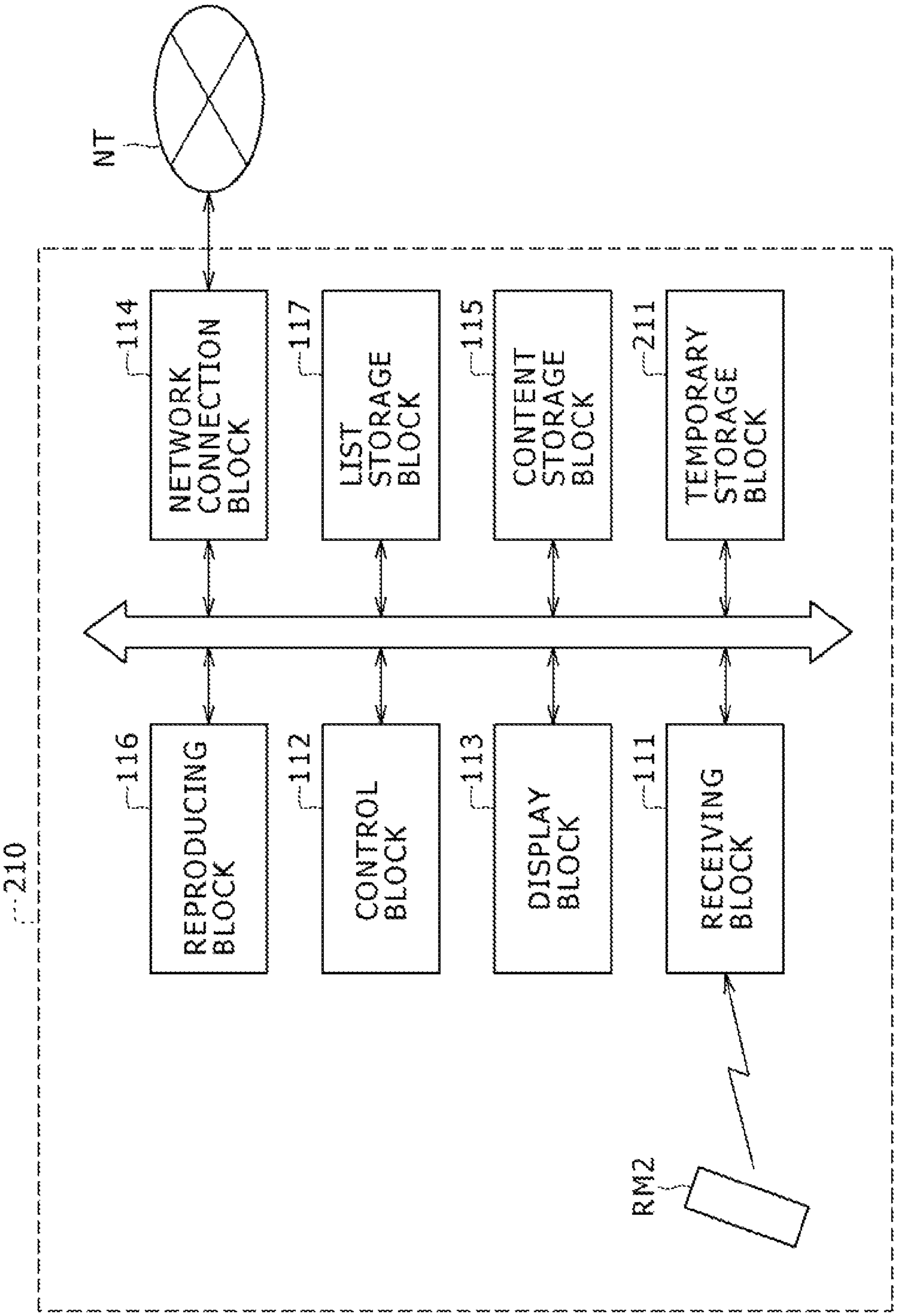
FIG. 27 is a block diagram illustrating an exemplary configuration of a music reproducing apparatus practiced as the second embodiment of the invention.

(3-2) Specific Examples of the Second Embodiment:

The following describes specific examples of the second embodiment of the invention. A music reproducing apparatus 210 shown in FIG. 27 is a specific example of the above-described content reproducing apparatus 200. As indicated by the same reference numerals as those shown in FIG. 13, the music reproducing apparatus 210 has no clock block 118 and has a temporary storage block 211 unlike the music reproducing apparatus 110 of the first embodiment.

Figure 28:
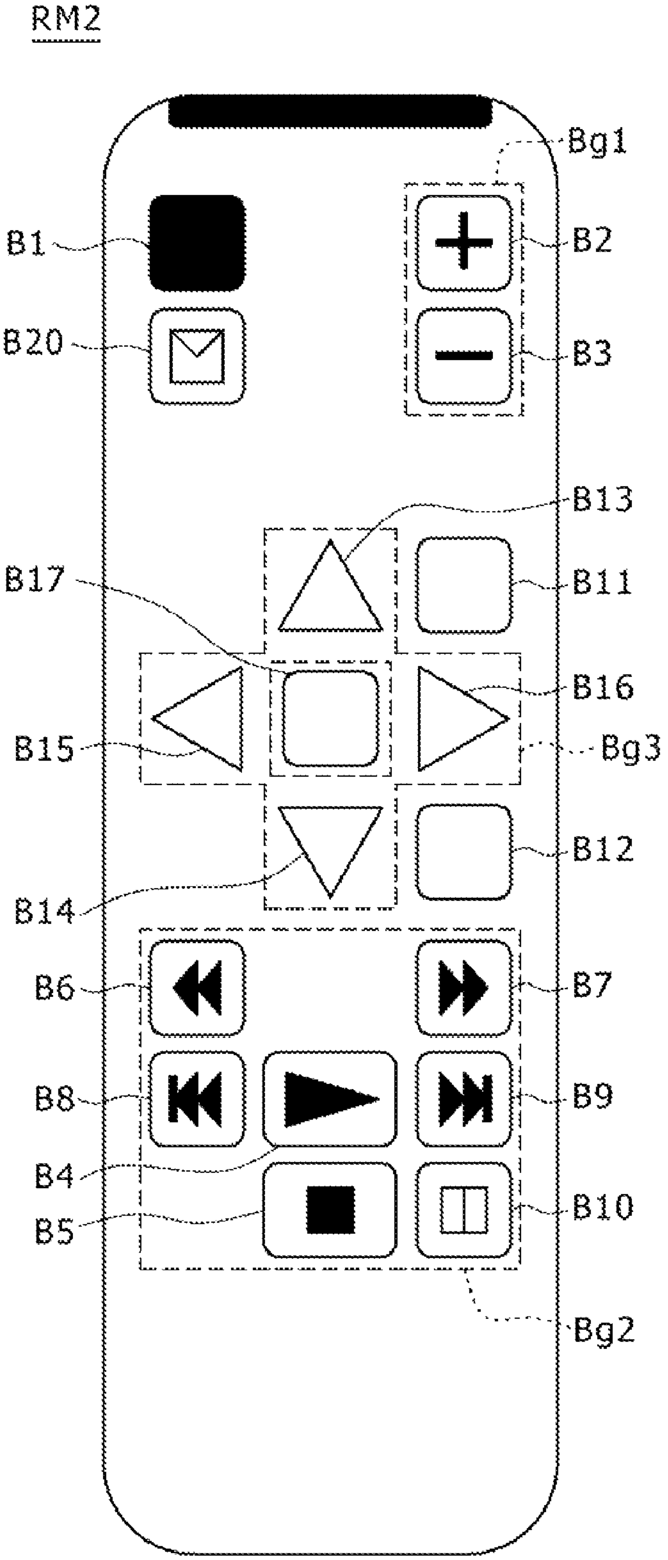
FIG. 28 is a top view of a remote controller practiced as the second embodiment of the invention.
Figure 29:
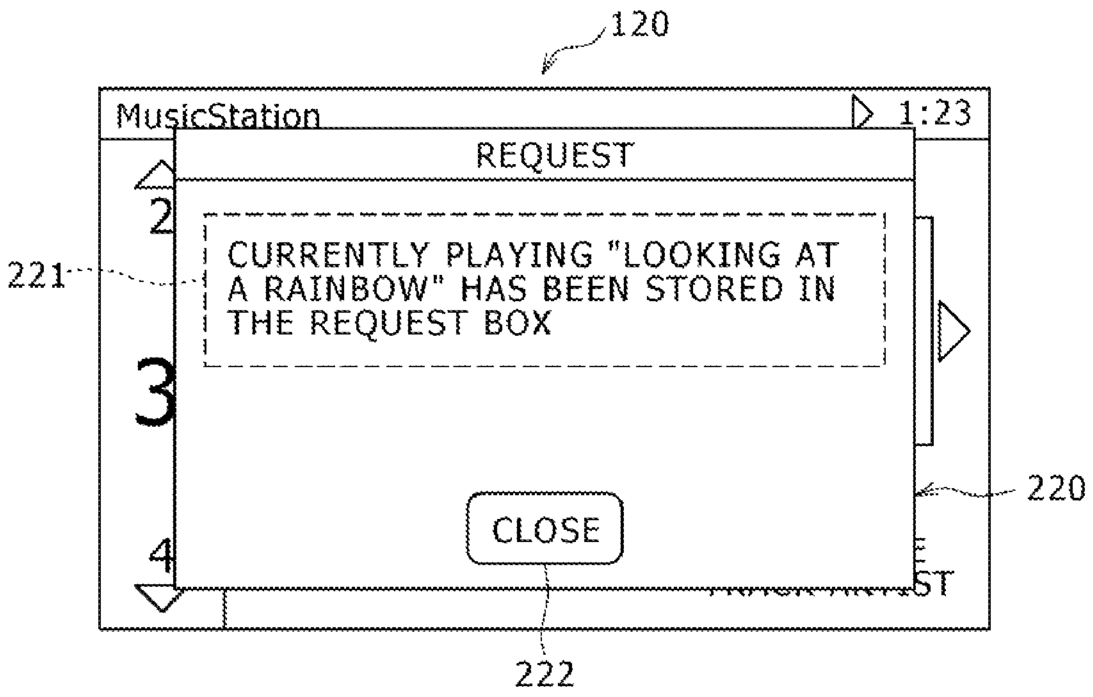
FIG. 29 is a diagram illustrating an exemplary configuration of a request acceptance dialog practiced as the second embodiment of the invention.
Figure 30:
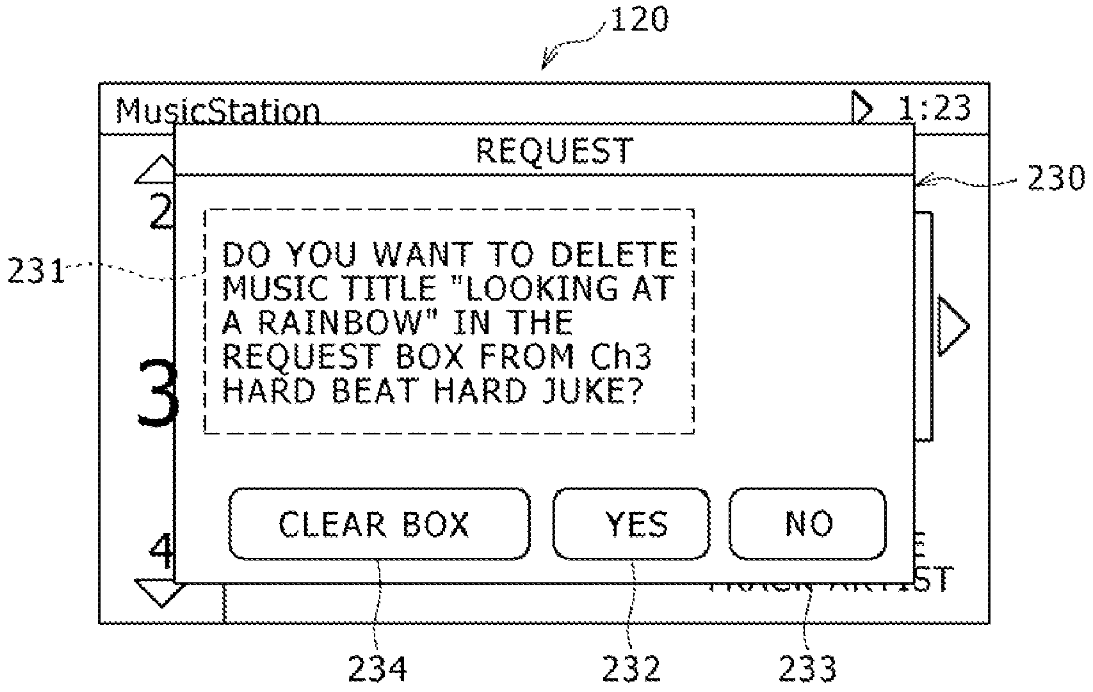
FIG. 30 is a diagram illustrating an exemplary configuration of a deletion check dialog practiced as the second embodiment of the invention.
Figure 31:
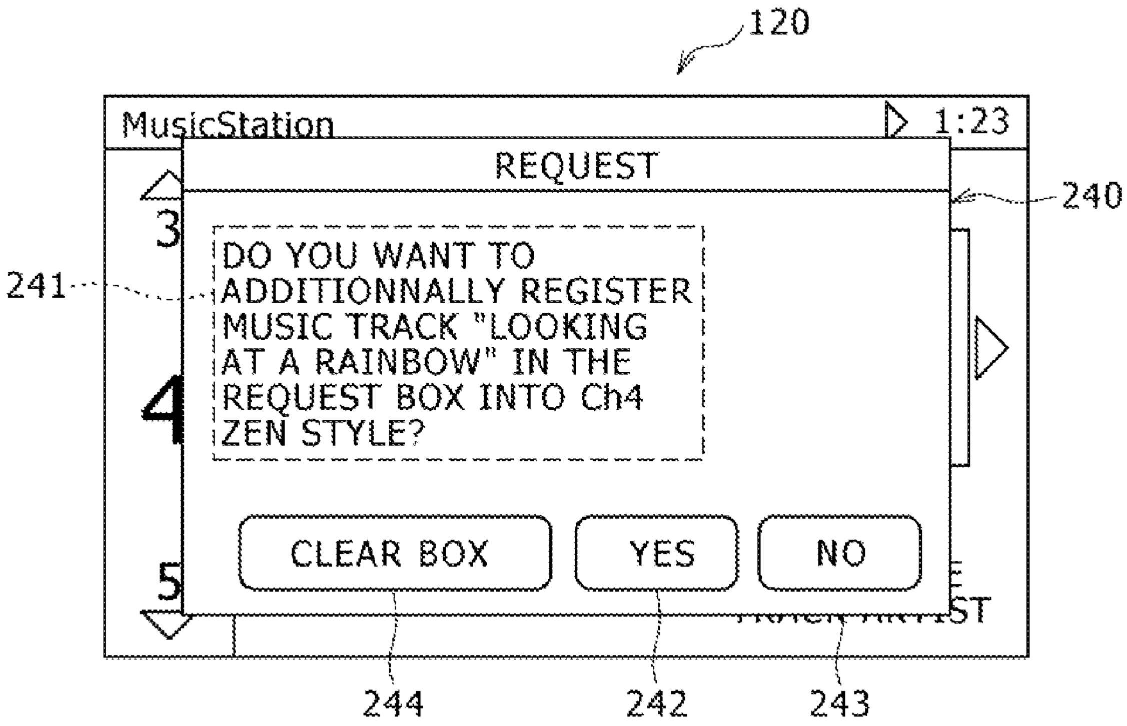
FIG. 31 is a diagram illustrating an exemplary configuration of a add check dialog practiced as the second embodiment of the invention.

As shown in FIG. 28 in which the same portions are denoted by the same reference numerals as those shown in FIG. 14, a remote controller RM2 of the music reproducing apparatus 210 has a request button B20 instead of the preset button B18 of the remote controller RM1 of the music reproducing apparatus 110 of the first embodiment.

It should be noted that the request button B20 arranged on the remote controller RM2 corresponds to the input block 204 of the above-mentioned content reproducing apparatus 200 (FIG. 26) and the control block 112, the content storage block 115, the reproducing block 116, the list storage block 117, and the temporary storage block 211 of the music reproducing apparatus 210 correspond to the control block 206, the content storage block 201, the reproducing block 203, the list storage block 202, and the temporary storage block 205 of the content reproducing apparatus 200, respectively.

As with the music reproducing apparatus 110 of the first embodiment, the music reproducing apparatus 210 has a download function, a CD recording function, a normal reproducing function, a CD reproducing function, and a MusicStation function. The control block 112 executes the processing according to these functions as instructed by the user through the remote controller RM2.

The following describes the MusicStation function provided by the music reproducing apparatus 210. First, a method of managing music data Ad in the MusicStation function provided by the music reproducing apparatus 210. This managing method is substantially the same as that of the music reproducing apparatus 110 of the first embodiment. Therefore, details of this management method can be understood by referencing the description of the management method of the first embodiment.

Namely, as shown in FIG. 2, the music reproducing apparatus 210 of the second embodiment is configured to manage a plurality of channel play lists PL by a channel list CL and manage the sequence of reproduction of music data Ad by these channel play lists PL.

As with the above-mentioned first embodiment, this MusicStation function has, beforehand, channel play lists PL for categories considered to be required by the user, such as newly added music, infrequently reproduced music, rhythmical music, cheerful music, classical music, and heavy metal music, for example. In accordance with the storage or reproduction of music data Ad, the control block 112 of the music reproducing apparatus 210 automatically update channel play lists PL by registering the music data Ad stored in the content storage block 115 into corresponding channel play lists PL of the prepared channel play lists PL on the basis of the reproduction count, music impression value, and genre of the music data Ad.

Then, the music reproducing apparatus 210 allows the user to select, through the remote controller RM2 and on a GUI screen, desired channel play lists PL classified as newly added music, infrequently reproduced music, rhythmical music, cheerful music, classical music, and heavy metal music, for example, as channels, thereby allowing the user to easily find desired music in a feeling in which the user switches between radio channels.

Further, the GUI screen in the MusicStation function is substantially the same in configuration as the GUI screen of the music reproducing apparatus 110 of the first embodiment. Therefore, details of this GUI screen can be understood by referencing the description of the GUI screen of the first embodiment.

To be more specific, while letting the user visually recognize the contents of channel and music track through the selection screen 120 shown in FIG. 15, the music reproducing apparatus 210 of the second embodiment switches between channels and selects a specified channel in response to a user operation done through the up button B13 or the down button B14 of the remote controller RM2 and switches between music tracks and selects a specified music track in response to a user operation done through the left button B15 or the right button B16 of the remote controller RM2.

The music reproducing apparatus 210 is also configured to switch the selection screen 120 to the reproducing screen 130 under a predetermined condition (pressing of the enter button B17 or passing of a predetermined period of time without operation by the user) and let the user visually check the contents of the selected channel and music through the reproducing screen 130.

Further, the reproduction of music data Ad accompanying the switching of GUI screens is controlled in substantially the same manner as the reproduction control by the music reproducing apparatus 110 of the first embodiment. Therefore details of the reproduction control of the second embodiment can be understood with reference to the description of the first embodiment.

Namely, the music reproducing apparatus 210 according to the second embodiment gets in the partial reproducing mode in which the selected music data Ad is reproduced from a feature position thereof when the selection screen 120 is displayed and gets in the normal reproducing mode in which the selected music data is normally reproduced when the reproducing screen 130 is displayed. In each mode, music data Ad is reproduced without discontinuation while the MusicStation function is being executed.

Consequently, during the execution of the MusicStation function, as with the music reproducing apparatus 110 of the first embodiment, the music reproducing apparatus 210 of the second embodiment can switch between channel play lists PL on a channel basis as if switching between radio preset stations in accordance with an operation done through the up button B13 or the down button B14 of the remote controller RM2 and switch between music tracks within a channel in accordance with an operation done through the left button B15 and the right button B16, thereby letting the user hear desired music more easily as if hearing the music broadcast from radio stations.

In addition, a MusicStation function startup procedure, a channel switching procedure, and a music track switching procedure are substantially the same as those executed by the music reproducing apparatus 110 of the first embodiment. Therefore, details of these procedures can be understood with reference to the description of the first embodiment.

Further, the channel display setting method in the MusicStation function is substantially the same as the display setting method executed by the music reproducing apparatus 110 of the first embodiment. Therefore, details of the channel display setting method can be understood with reference to the description of the first embodiment.

Namely, the music reproducing apparatus 210 according to the second embodiment is configured to change the channel display setting to "display" or "no-display" on a channel basis through the channel display setting screen 140 shown in FIG. 22.

As described so far, as with the first embodiment, the music reproducing apparatus 210 of the second embodiment has the MusicStation function corresponding to the operation of the remote controller RM2 and can easily execute the startup of the MusicStation function, channel switching, music track switching, and channel display setting through the remote controller RM2.

It should be noted that, with the MusicStation function according to the second embodiment, channel play lists PL are prepared for categories considered to be required by the user and the control block 112 of the music reproducing apparatus 210 automatically register the music data Ad stored in the content storage block 115 into corresponding channel play lists PL on the basis of the reproduction count, music impression value, and genre of that music data Ad.

Thus, by automatically registering music data Ad into a channel play list PL corresponding to that category, the music reproducing apparatus 210 can mitigate the user load. However, the automatic registration of music data Ad into a channel play list PL does not always result in the registration of music data Ad intended by the user.

Therefore, after automatically registering music data Ad into a channel play list PL, the music reproducing apparatus 210 according to the second embodiment can delete the music data Ad being reproduced from the channel play list PL or add this music data Ad to another channel play list PL by request from the user.

The following describes a method of deleting music data Ad being reproduced from a channel play list PL in which this music data Ad is registered or additionally registering this music data to another channel play list PL (hereafter referred to also as a list editing method).

When the request button B20 of the remote controller RM2 is operated during the execution of the MusicStation function, the control block 112 of the music reproducing apparatus 210 recognizes that the music data Ad being reproduced is specified by the user to specify the subject of request (the deletion from the channel play list PL in which this music data Ad is registered or the additional registration of this music data Ad into another channel play list PL), stores the music data information Ai of the music data Ad being reproduced and the list information Li of the channel play list PL allocated to the channel in selection (namely, the channel play list PL in which the music data Ad being reproduced is currently registered) into the temporary storage block 211 to specify the music data Ad being reproduced as the subject of request, and displays a request acceptance dialog 220 for notifying the user of the specification of this music data Ad as the subject of request in a superimposed manner on the selection screen 120 or the reproducing screen 130 being displayed at this moment.

The request acceptance dialog 220 shows text information 221 indicative of the specification of the music data Ad being reproduced as the subject of a request (for example, "Currently playing 'Looking at a rainbow' has been stored in the request box") and has a close button 222 for closing this request acceptance dialog 220.

Then, the control block 112 of the music reproducing apparatus 210 closes the request acceptance dialog 220 when the close button 222 is operated by the user through the remote controller RM2.

Next, when the request button B20 is operated again, the control block 112 of the music reproducing apparatus 210 determines from the list information Li stored in the temporary storage block 211 whether or not the channel play list PL of the channel in selection is the same as the channel play list PL of the channel selected when the request button B20 was operated last.

If these channel play lists are found the same, the control block 112 recognizes that the deletion of the music data Ad specified as the subject of request when the request button B20 was operated last from the channel play list PL of the channel in selection (namely, the channel play list PL in which the music data Ad subject to request is currently registered) because the request button B20 has been operated again with the same channel selected as that when the request button B20 was operated last. At the same time, the control block 112 displays a deletion confirmation dialog 230 for confirming whether the music data Ad subject of request can be deleted from the channel play list PL of the channel in selection in a superimposed manner on the selection screen 120 or the reproducing screen 130 being displayed at this moment.

The deletion confirmation dialog 230 shows text information 231 indicative of a confirmation whether the music data Ad subject to request from the channel play list PL of the channel in selection (for example, "Do you want to delete music title "Looking at a rainbow" in the request box from Ch3 Head Beat Hard Juke?" and has a deletion enter button 232 for triggering deletion processing, a deletion stop button 233 for stopping deletion processing, and a request cancel button 234 for canceling the request by removing the music data Ad subject to request.

Then, the control block 112 of the music reproducing apparatus 210 executes deletion processing upon an operation by the user of the deletion enter button 232 through the remote controller RM2.

To be more specific, the control block 112 of the music reproducing apparatus 210 changes the music data reproduction setting Adi of the music data information Ai matching the music data information Ai, in the channel play list PL in selection, stored in the temporary storage block 211, from "reproduction permitted" to "reproduction prohibited". In the MusicStation function, if music data reproduction setting Adi is "reproduction permitted", then the displaying, on the GUI screen, of the attribute information Ti (cover photo, track title, and artist name) of the music data Ad corresponding to this music data reproduction setting Adi is permitted, while, if the music data reproduction setting Adi is "reproduction prohibited", the displaying, on the GUI screen, of the attribute information Ti of the corresponding music data Ad is prohibited.

Namely, setting the music data reproduction setting Adi of the music data subject to request to "reproduction prohibited" prevents this music data Ad from being reproduced from the channel play list PL in which this music data Ad is registered and the attribute information Ti thereof from being displayed on the GUI screen; as a result, the music data Ad subject to request is deleted from the channel play list PL in which the music data Ad is registered.

Therefore, when the deletion enter button 232 is operated, the control block 112 of the music reproducing apparatus 210 changes the music data reproduction setting Adi of the music data Ad subject to request to "reproduction prohibited" and closes the deletion confirmation dialog 230 by regarding that this music data Ad has been deleted from the channel play list PL in selection. Also, after the deletion processing, the control block 112 of the music reproducing apparatus 210 deletes the music data information Ai and the list information Li from the temporary storage block 211 to cancel the specification of the subject of request.

If the deletion stop button 233 is operated, the control block 112 of the music reproducing apparatus 210 closes this deletion confirmation dialog 230 without executing the deletion processing. In this case, the control block 112 of the music reproducing apparatus 210 has not yet executed any processing in accordance with the request, so that the music data information Ai and the list information Li stored in the temporary storage block 211 are kept stored therein.

Further, if the request cancel button 234 is operated, the control block 112 of the music reproducing apparatus 210 deletes the music data information Ai and the list information Li from the temporary storage block 211 to cancel the specification subject to request, thereby closing this deletion confirmation dialog 230.

Thus, if the deletion of the music data Ad subject to request from the channel play list PL in which this music data Ad is registered is requested, the control block 112 of the music reproducing apparatus 210 reconfirms the user of the deletion to execute or stop the deletion processing or cancel the request as instructed by the user.

On the other hand, if the channel play list PL of the channel selected at the operation of the request button B20 again does not match the channel play list PL of the channel selected when the request button B20 was operated last, then the control block 112 of the music reproducing apparatus 210 recognizes that the user has requested to additionally register the music data Ad specified as the subject of request when the request button B20 was operated last into the channel play list PL of the channel in selection because the request button B20 has been operated again with a channel selected different from that when the list display section 20*b* was operated last. At the same time, the control block 112 displays an add confirmation dialog 240 for confirming the additional registration of the music data Ad subject to request into the channel play list PL of the channel in selection in a superimposed manner on the selection screen 120 or the reproducing screen 130 being displayed at this moment.

The add confirmation dialog 240 shows text information 241 for confirming whether the music data Ad subject to request may be additionally registered in the channel play list PL of the channel in selection (for example, "Do you want to additionally register music track "Looking at a rainbow" in the request box into Ch4 Zen Style?" and has an additional registration enter button 242 for executing additional registration processing, an additional registration stop button 243 for stopping additional registration processing, and a request cancel button 244 for canceling request.

When the additional registration enter button 242 is operated by the user through the remote controller RM2, the control block 112 of the music reproducing apparatus 210 additionally registers the music data information Ai stored in the temporary storage block 211 to the end of the channel play list PL in selection to additionally register the music data Ad subject to request into the channel play list PL in selection, thereby closing the add confirmation dialog 240. After the additional registration processing, the control block 112 of the music reproducing apparatus 210 deletes the music data information Ai and the list information Li from the temporary storage block 211 to cancel the specification subject to request.

If the additional registration stop button 243 is operated, the control block 112 closes the add confirmation dialog 240 without executing additional registration processing. In this case, the control block 112 has not yet executed any processing in accordance with the request, so that the music data information Ai and the list information Li stored in the temporary storage block 211 are kept stored therein.

Further, if the request cancel button 244 is operated, the control block 112 deletes the music data information Ai and the list information Li from the temporary storage block 211 to cancel the specification subject to request, thereby closing this add confirmation dialog 240.

As described above, if the additional registration of the music data Ad subject to request into another channel play list PL, the control block 112 of the music reproducing apparatus 210 confirms the user whether or not to execute additional registration through the add confirmation dialog 240 and executes or stops additional registration processing or cancels the request as instructed by the user.

As described so far, the music reproducing apparatus 210 specifies the music data Ad being reproduced when the request button B20 is operated as the subject of request and, if the channel selected when the request button B20 is operated again matches the channel selected when the list display section 20*b* was operated last, deletes the music data Ad subject to request from the channel play list PL in selection and, if a mismatch is found between these channels, additionally registers the music data Ad subject to request into the channel play list PL of the channel in selection.

Consequently, the music reproducing apparatus 210 can let the user hear a music track based on music data Ad to recognize the contents thereof and operate the request button B20 twice, thereby editing each channel play list LP, such as deleting music data Ad from a channel play list LP in which this music data Ad is registered or additionally registering music data to another channel play list PL, for example.

Figure 32:
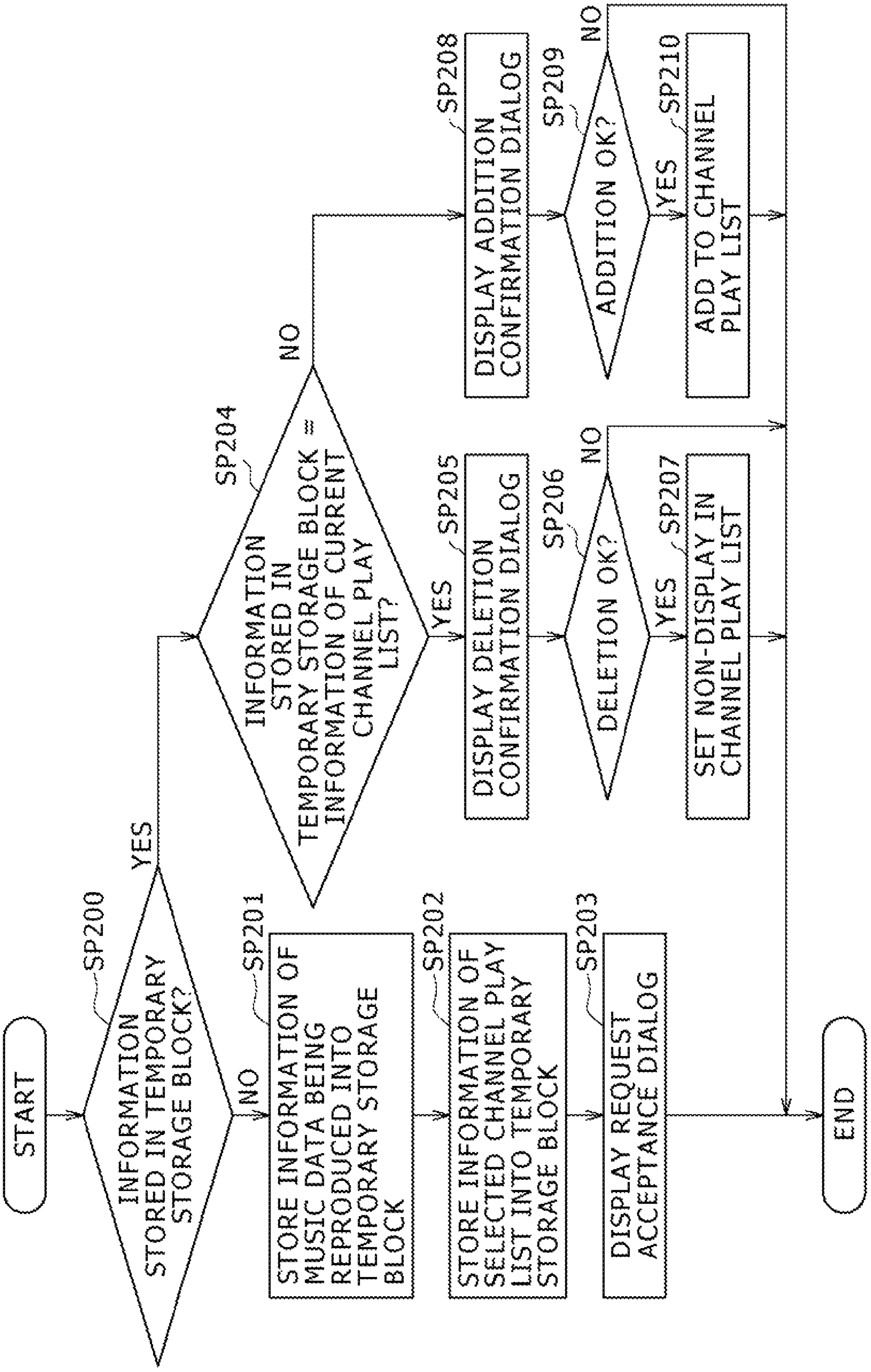
FIG. 32 is a flowchart indicative of a list editing procedure practiced as the second embodiment of the invention.

The following describes a procedure of the above-mentioned list edit processing. Recognizing that the request button B20 of the remote controller RM2 has been operated during the execution of the MusicStation function, the control block 112 of the music reproducing apparatus 210 starts a list editing procedure RT20, upon which the procedure goes to step SP200 as shown in FIG. 32.

In step SP200, the control block 112 determines whether music data information Ai and list information Li have already been stored in the temporary storage block 211. If the determination is in the negative in step SP200, it indicates that the music data Ad has not been specified as the subject of request, upon which the procedure goes to step SP201.

In step SP201, the control block 112 stores the music data information Ai of the music data Ad being reproduced into the temporary storage block 211, upon which the procedure goes to step SP202. In step SP202, the control block 112 stores the list information Li of the channel play list PL allocated to the currently selected channel into the temporary storage block 211, on which the procedure goes to step SP203. In step SP203, the control block 112 displays the request acceptance dialog 220, thereby ending this list editing procedure RT20.

On the other hand, if the determination is in the affirmative in step SP200, it indicates that the music data Ad subject to request is specified, upon which the procedure goes to step SP204.

In step SP204, the control block 112 determines whether the channel play list PL identified by the list information Li stored in the temporary storage block 211 matches the channel play list PL currently selected. If the determination is in the affirmative, it indicates that the request button B20 has been operated again with the same channel as it was when the request button B20 was operated last, namely, the deletion of the music data subject to request from the channel play list PL of the currently selected channel is requested, upon which the procedure goes to step SP205.

In step SP205, the control block 112 displays the deletion confirmation dialog 230, upon which the procedure goes to step SP206. In step SP206, the control block 112 determines whether the deletion enter button 232 has been operated. If the determination is in the affirmative in step SP206, then the procedure goes to step SP207. In step SP207, the control block 112 changes the music data reproduction setting Adi of the music data Ad subject to request to "reproduction prohibited" (namely, changes the display setting of attribute information Ti to "no-display"), thereby deleting this music data Ad from the channel play list PL in selection and closing the deletion confirmation dialog 230 and then deleting the music data information Ai and the list information Li from the temporary storage block 211 to cancel the specification of the subject of request, upon which this list editing procedure RT20 ends.

On the other hand, if the determination is in the negative in step SP206, then the control block 112 closes the deletion confirmation dialog 230 without executing deletion processing, upon which this list editing procedure RT20 ends.

If the determination is in the negative in step SP204, it indicates that the request button B20 has been operated again with a channel different from the channel with which the request button B20 was operated last, namely, the additional registration of the music data subject to request into the channel play list PL in selection has been requested, upon which the procedure goes to step SP208.

In step SP208, the control block 112 displays the add confirmation dialog 240, upon which the procedure goes to step SP209. In step SP209, the control block 112 determines whether the additional registration enter button 242 of the add confirmation dialog 240 has been operated. If the determination is in the affirmative in step SP209, then the procedure goes to step SP210. In step SP210, the control block 112 additionally registers the music data information Ai of the music data Ad subject to request into the channel play list PL in selection, closes the add confirmation dialog 240, deletes the music data information Ai and the list information Li from the temporary storage block 211 to cancel the specification of the subject of request, and ends this list editing procedure RT20.

On the other hand, if the determination is in the negative in step SP209, then the control block 112 closes the add confirmation dialog 240 without executing the additional registration processing, upon which this list editing procedure RT20 ends.

By this list editing procedure RT20, the music reproducing apparatus 210 executes list edit processing.

As described so far, this MusicStation function provides the playing of the music based on the music data Ad stored in the content storage block 115, as if the user heard the music broadcast from a radio station. Therefore, obviously, music cannot be provided unless at least one track of music is stored in the content storage block 115. In other words, this MusicStation function can provides more various channels as the number of music data Ad stored in the content storage block 115 increases.

Figure 33:
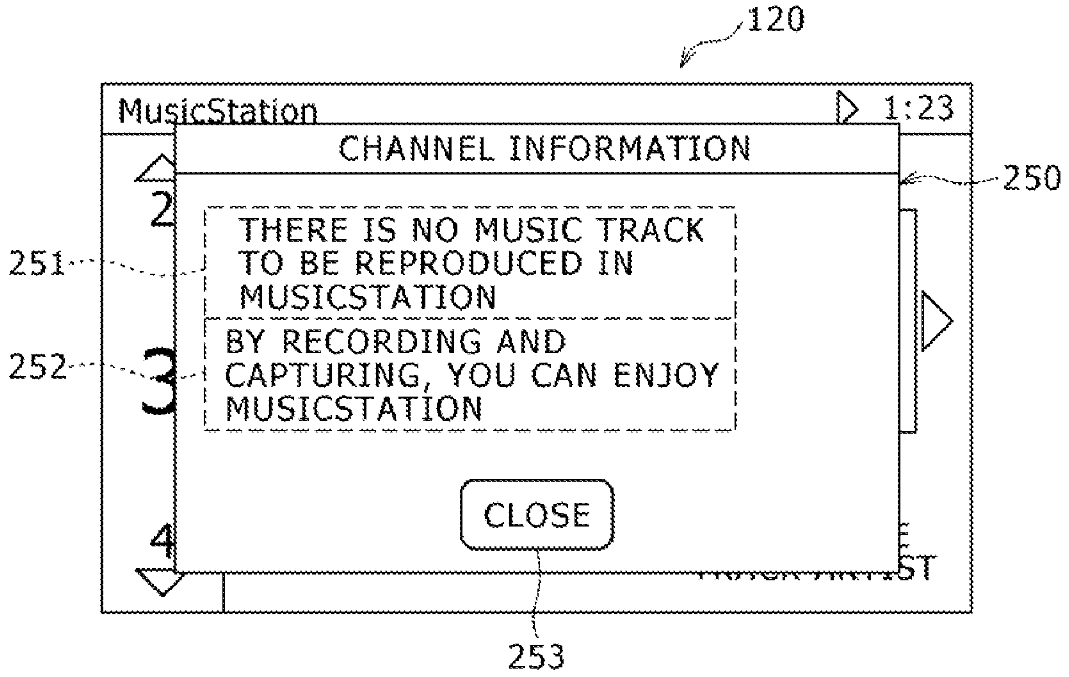
FIG. 33 is a diagram illustrating an exemplary configuration of a no-data notification dialog practiced as the second embodiment of the invention.

Therefore, if no music data Ad is stored in the startup-time channel display box 151, for example, the control block 112 of the music reproducing apparatus 210 displays, on the display block 113, a no-data notification dialog 250 for notifying the user of the fact that there is no music data Ad stored in the content storage block 115, as shown in FIG. 33, at the startup of the MusicStation function.

This no-data notification dialog 250 shows text information 251 indicative that there is no music data Ad stored in the content storage block 115 (for example, "There is no music track to be reproduced in MusicStation"), and text information 252 which prompts the user to add the music data Ad (for example, "By recording and capturing, you can enjoy MusicStation"), and has a close button 253 for closing this no-data notification dialog 250.

When the close button 253 is operated through the remote controller RM2, the control block 112 of the music reproducing apparatus 210 closes this no-data notification dialog 250, upon which the MusicStation function ends.

Thus, if there is no music data Ad stored in the content storage block 115, the control block 112 of the music reproducing apparatus 210 can notify the user thereof through the no-data notification dialog 250 and let the user recognize that the user can enjoy to use the MusicStation function by adding of music data Ad, thereby prompting the user to add music data Ad.

In addition, if list reproduction setting Ldi specifies a channel play list PL of "reproduction permitted" (namely, a channel play list PL that is displayed on GUI screen as a channel), this MusicStation function is configured not to reproduce the music data Ad registered in that channel play list PL if the number of registered music data Ad is less than a predetermined number (three for example).

Figure 34:
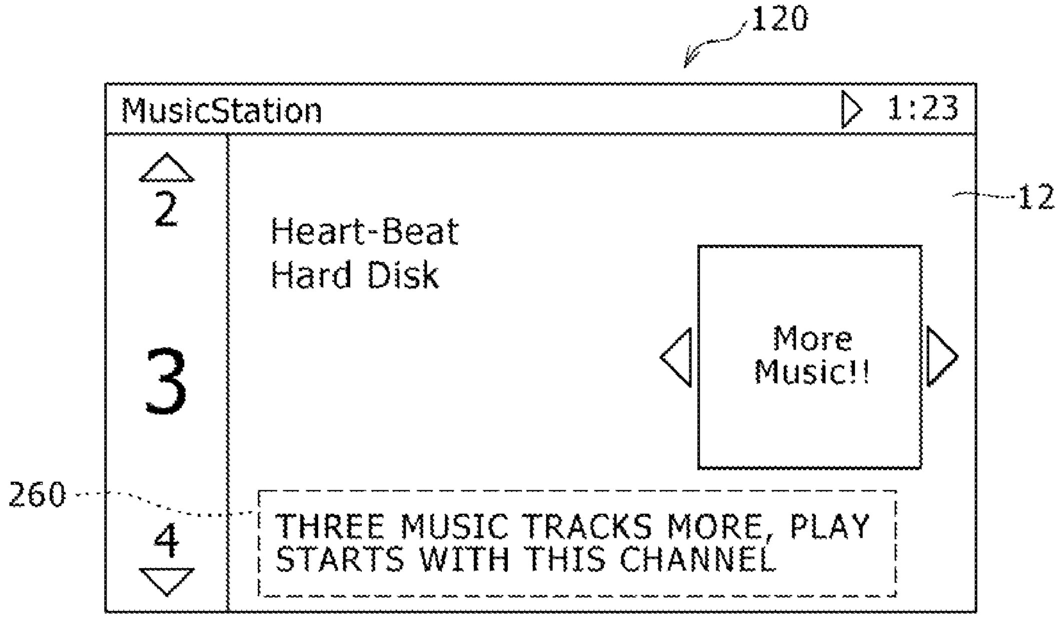
FIG. 34 is a diagram illustrating a display example (1) of a selection screen practiced as the second embodiment of the invention.
Figure 35:
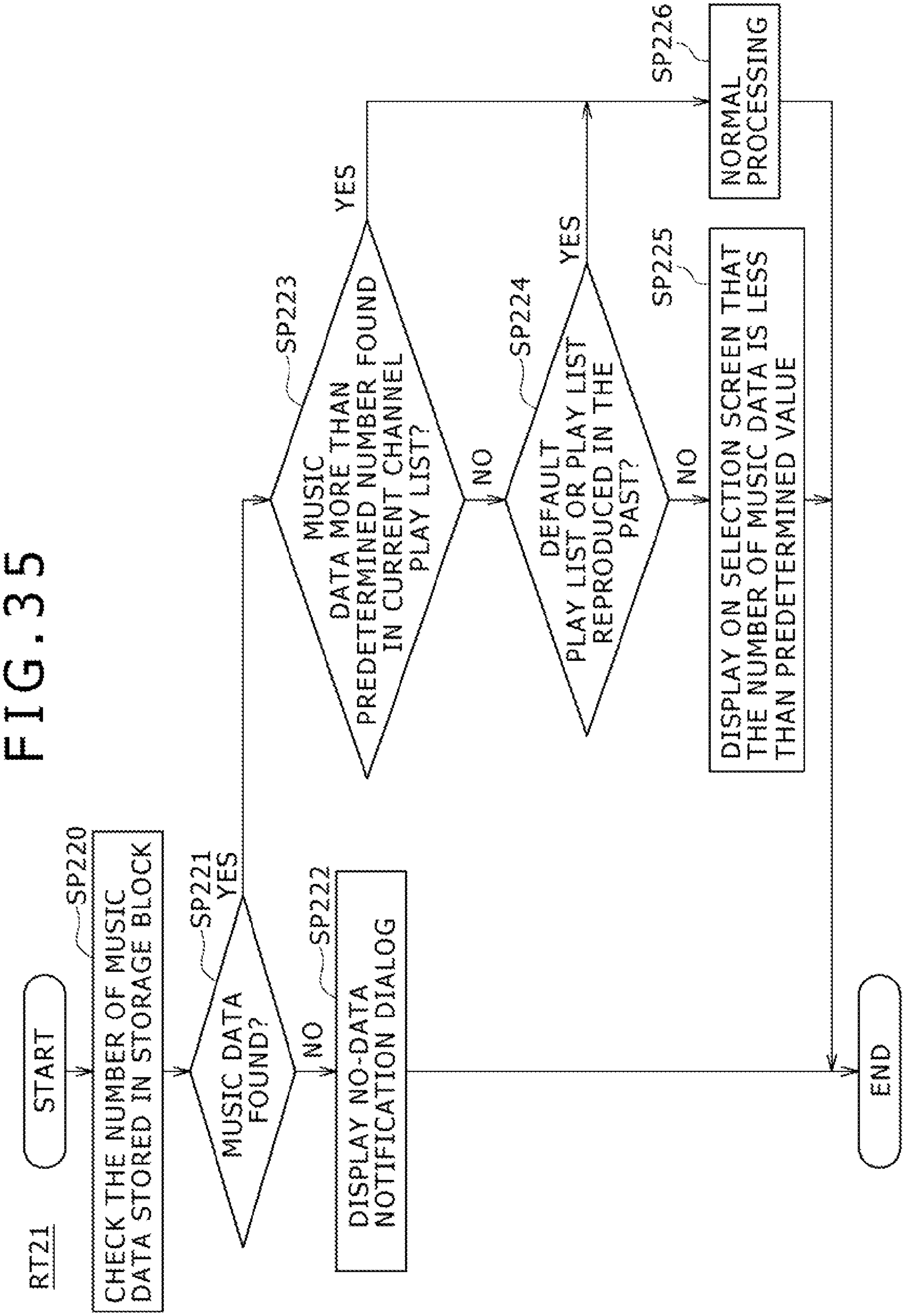
FIG. 35 is a flowchart indicative of an add prompting procedure practiced as the second embodiment of the invention.

Actually, if the control block 112 of the music reproducing apparatus 210 selects a channel to which a channel play list PL having no music data Ad although the list reproduction setting Ldi is "reproduction permitted" during the execution of the MusicStation function and in accordance with a channel switching operation, for example, the control block 112 stops the reproduction of the currently reproduced music data Ad and, if the number of music data Ad to be registered in the channel play list PL of the currently selected channel has reached a predetermined number, displays text information 260, in the music selection area 12 of the selection screen 120, indicative of the starting of the reproduction of music data Ad on this channel (for example, "Three music tracks more, play starts with this channel"), as shown in FIG. 34.

Thus, the music reproducing apparatus 210 can let the user recognize that addition of music data allows the use of new channels, thereby further prompting the user to add music data Ad.

Consequently, the music reproducing apparatus 210 can tell the user that the merits of the MusicStation function are enhanced as the number of music data Ad stored in the content storage block 115 increases, thereby further prompting the user to add music data Ad.

It should be noted that, if the control block 112 of the music reproducing apparatus 210 exceptionally selects a default channel or a channel that has reproduced music data before, the control block 112 reproduces music data Ad without displaying the text information 260 if at least one music data is registered in the channel play list PL allocated to any of these channels even if the number of music data Ad registered therein is less than a predetermined number.

Consequently, a situation can be circumvented in which there is no reproducible channel play list PL although music data Ad is stored in the content storage block 115.

The following describes a procedure of prompting the user to add music data Ad (hereafter referred to also as an add prompt processing). Starting up the MusicStation function, the control block 112 of the music reproducing apparatus 210 starts the addition prompting procedure RT21, upon which the procedure goes to step SP220.

In the step SP220, the control block 112 checks the number of music data Ad stored in the content storage block 115, upon which the procedure goes to step SP221. In step SP221, the control block 112 determines whether there is music data Ad stored in the content storage block 115 on the basis of a result of the check executed in step SP220.

If the determination is in the negative in step SP221, it indicates that no music data is stored in the content storage block 115, upon which the procedure goes to step SP222. In step SP222, the control block 112 displays the no-data notification dialog 250 on the basis of the result of check, thereby ending this addition prompting procedure RT21.

On the other hand, if the determination is in the affirmative in step SP221, it indicates that there is at least one music data Ad stored in the content storage block 115, upon which the procedure goes to step SP223. In step SP223, the control block 112 determines whether more than a predetermined number of music data Ad is registered in the channel play list PL of the currently selected channel.

If the determination is in the negative in step SP223, it indicates that the number of music data Ad registered in the channel play list PL of the channel in selection is less than a predetermined number, upon which the procedure goes to step SP224.

In step SP224, the control block 112 determines whether the channel play list PL in selection is a default play list DPL or a channel play list PL that has reproduced music data Ad even just one time before. The information indicative that a particular channel play list PL has reproduced music data Ad before is stored in the content storage block 115 or the list storage block 117 and updated every time music data Ad is first reproduced in accordance with that channel play list PL.

If the determination is negative in step SP224, it indicates that the channel play list PL in selection is not a default play list DPL but a channel play list PL that has not reproduced music data Ad before, upon which the procedure goes to step SP225.

In step SP225, the control block 112 stops the reproduction of the music data Ad being reproduced and, if the number of music data Ad registered in the channel play list PL of the channel in selection has reached a predetermined number, displays, in the music selection area 12 of the selection screen 120, text information 260 indicative of the starting of the reproduction of music data Ad with this channel, upon which this addition prompting procedure RT21 ends.

On the other hand, if the determination is in the affirmative in step SP223, it indicates that the number of music data Ad registered in the channel play list PL of the channel in selection has reached a predetermined number, upon which the procedure goes to step SP226. If the determination in SP224 is in the affirmative, the procedure also goes to step SP226.

In step SP226, the control block 112 executes normal processing at the time of channel selection (namely, the processing of steps SP106 through SP108 of the MusicStation function startup procedure RT10 shown in FIG. 19 or the processing of steps SP115 through SP118 of the channel switching procedure RT11 shown in FIG. 20) and then ends this addition prompting procedure RT21.

By this addition prompting procedure RT21, the music reproducing apparatus 210 prompts the user to add music data Ad in accordance with the number of music data Ad stored in the content storage block 115.

It should be noted that, for the convenience of description, the addition prompting procedure RT21 has been described separately in the MusicStation function startup procedure RT10 (FIG. 19) and the channel switching procedure RT11 (FIG. 20); actually, however, the addition prompting procedure RT21 is executed within the MusicStation function startup procedure RT10 and the channel switching procedure RT11.

For example, the steps SP220 and SP221 of the addition prompting procedure RT21 are executed before step SP100 of the MusicStation function startup procedure RT10; step SP222 of the addition prompting procedure RT21 is executed instead of steps SP100 through SP108 of the MusicStation function startup procedure RT10; steps SP223 and SP224 of the addition prompting procedure RT21 are executed before step SP106 of the MusicStation function startup procedure RT10 and before SP115 of the channel switching procedure RT11; step SP225 of the addition prompting procedure RT21 is executed instead of steps SP106 through SP108 of the MusicStation function startup procedure RT11 and steps SP115 through SP118 of the channel switching procedure RT11; and step SP226 of the addition prompting procedure RT21 corresponds to steps SP106 through SP108 of MusicStation function startup procedure RT10 and steps SP115 through SP118 of the channel switching procedure RT11.

While prompting the user to add music data Ad, the music reproducing apparatus 210, if music data Ad is added (namely, music data Ad has been newly stored in the content storage block 115), notifies the user of the updating of the corresponding channel play list PL by this addition.

Actually, if music data Ad has newly been stored in the content storage block 115, the control block 112 of the music reproducing apparatus 210 additionally registers this music data Ad into the corresponding channel play list PL on the basis of the impression value and genre of that music track and updates this channel play list PL.

Figure 36:
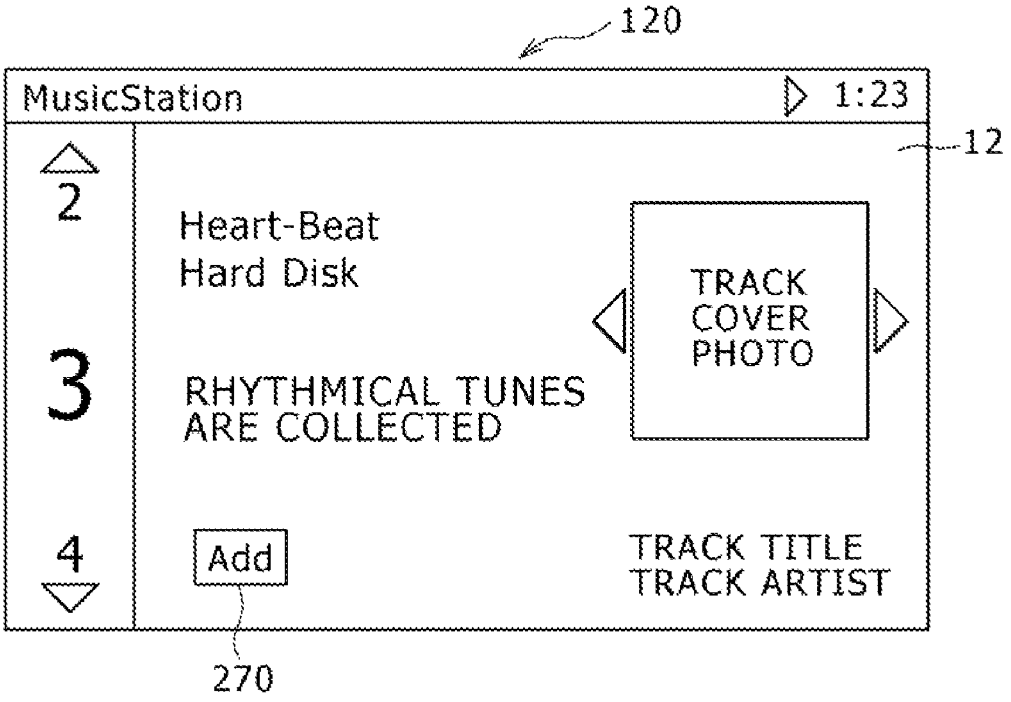
FIG. 36 is a diagram illustrating a display example (2) of the selection screen practiced as the second embodiment of the invention.
Figure 37:
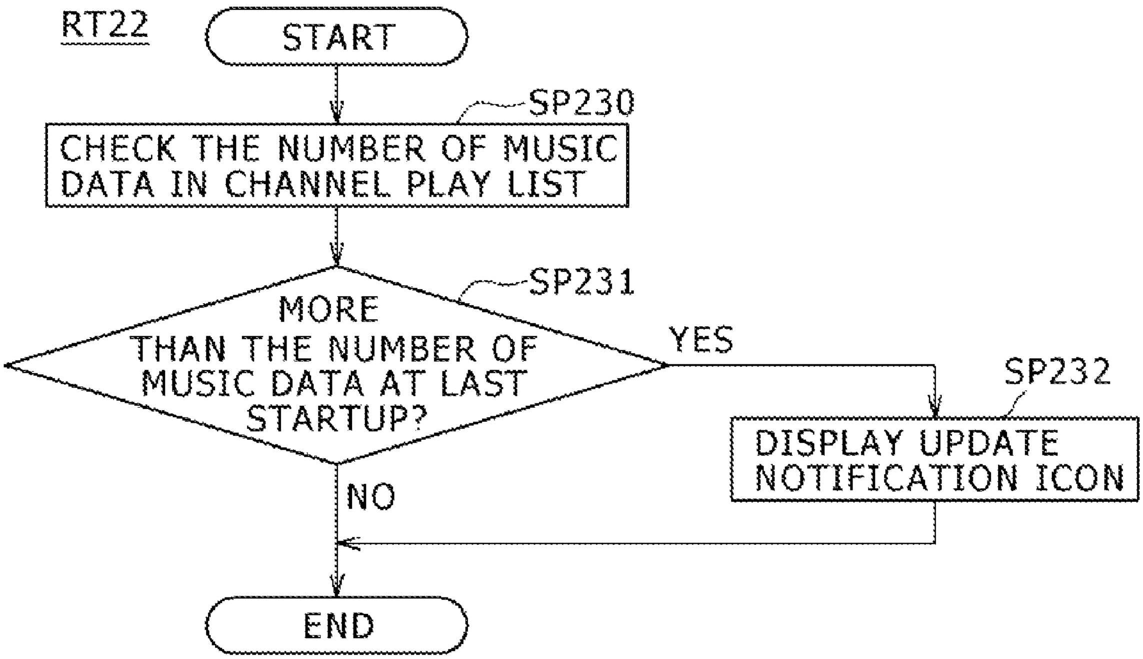
FIG. 37 is a flowchart indicative of an update notification procedure practiced as the second embodiment of the invention.

Then, when the channel allocated with the updated channel play list PL is selected in accordance with a channel switching operation, for example, during the execution of the MusicStation function, the control block 112 of the music reproducing apparatus 210 displays, in the music selection area 12 of the selection screen 120, an update notification icon 270 indicative that the channel play list PL of this channel has been updated, as shown in FIG. 36. It should be noted that, although not shown, this update notification icon 270 is displayed also in the selected music display area 22 of the reproducing screen 130.

Thus, the music reproducing apparatus 210 lets the user recognize that the channel play list PL of the channel in selection has been updated.

The following describes a procedure of notifying the user of the above-mentioned updating of a channel play list PL (hereafter referred to also as update notification processing). Selecting one channel play list PL in accordance with a channel switching operation, for example, during the execution of the MusicStation function, the control block 112 of the music reproducing apparatus 210 starts an update notification procedure RT22, upon which the procedure goes to step SP230.

In step SP230, the control block 112 determines the number of music data Ad currently registered in the channel play list PL in selection, upon which the procedure goes to step SP231. By determining the number of music data information Ai in the channel play list PL, the control block 112 recognizes the number of music data Ad currently registered.

In step SP231, the control block 112 determines whether the number of currently registered music data Ad is higher than the number of music data Ad registered in this channel play list PL at the last startup of the MusicStation function. It should be noted that the control block 112 recognizes the number of music data Ad registered in a channel play list at the last startup by determining the number of registered data Tn in this channel play list to be updated at the end of the MusicStation function.

If the determination is in the negative in step SP231, it indicates that the number of music data Ad currently registered in the channel play list PL in selection is less than the number of music data Ad registered at the time of the last startup, namely, this channel play list PL has not been updated until the current moment since the end of the last MusicStation function sequence, upon which the modulator 122 ends the update notification procedure RT22.

On the other hand, if the determination is in the affirmative in step SP231, it indicates that the number of music data Ad currently registered in the channel play list PL in selection is higher than the number of the music data Ad registered at the time of the last startup, namely, this channel play list PL has been updated until this moment since the end of the last MusicStation function sequence, upon which the procedure goes to step SP232.

In step SP232, the control block 112 displays the update notification icon 270 for notifying the user of the updating of the channel play list PL, thereby ending this update notification procedure RT22.

By this update notification procedure RT22, the music reproducing apparatus 210 notifies the user that a channel play list has been updated.

It should be noted that, for the convenience of description, this update notification procedure RT22 has been described separately in the MusicStation function startup procedure RT10 and the channel switching procedure RT11; actually, however, the update notification procedure is executed within the MusicStation function startup procedure RT10 and the channel switching procedure RT11. Namely, this update notification procedure RT22 is executed in step SP108 of the MusicStation function startup procedure R10 and step SP118 of the channel switching procedure R11, for example.

Figure 38:
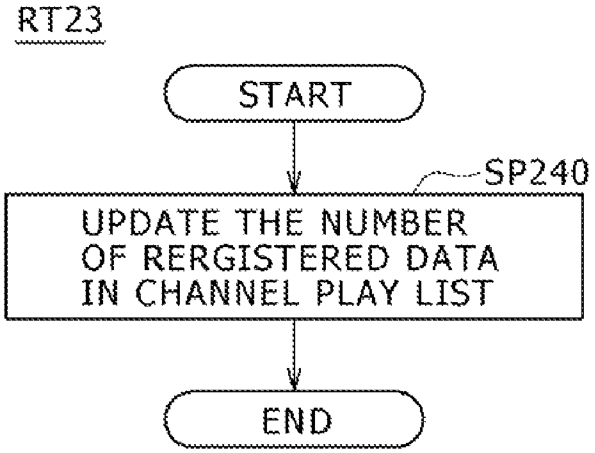
FIG. 38 is a flowchart indicative of a registered data count updating procedure practiced as the second embodiment of the invention.

Further, the following describes a procedure of updating the above-mentioned registered data count Tn of channel play list PL (hereafter referred to also as registered data count update processing). Recognizing that a MusicStation function ending operation has been completed, the control block 112 of the music reproducing apparatus 210 starts a registered data count updating procedure R23 a shown in FIG. 38, upon which the procedure goes to step SP240.

In step SP240, the control block 112 compares the number of music data Ad current registered in each channel play list PL with the registered data count Tn. If a mismatch is found, the control block 112 updates the registered data count Tn to the number of currently registered music data Ad and ends the registered data count updating procedure T23.

By this registered data count updating procedure T23, the music reproducing apparatus 210 updates the registered data count Tn in each channel play list PL.

(3-3) Operations and Effects of the Second Embodiment:

In the above-mentioned novel configuration according to the invention, the music reproducing apparatus 210 manages a plurality of music data Ad stored in the content storage block 115 by means of a plurality of channel play lists PL in which music data information Ai that is the content identification information of music data Ad stored in the list storage block 117 is listed.

Then, the control block 112 of the music reproducing apparatus 210 selects one of the plurality of channel play lists through the selection of a channel and, at the same time, if the request button B20 of the remote controller RM2 is operated during the reproduction of music data Ad in accordance with the channel play list PL selected at this time, stores the music data information Ai for identifying the music data Ad being reproduced and the list identification Li for identifying the channel play list in selection into a temporary storage block 211, thereby specifying the music data Ad being reproduced as a subject to request.

Next, when the request button B20 is operated again, the control block 112 of the music reproducing apparatus 210 determines whether or not the channel play list PL selected at this moment is the same as the channel play list selected when the request button B20 was operated at the last operation of the request button B20 by comparing the list information Li of the channel play list in selection with the list information Li stored in the temporary storage block 211.

If both the channel play lists PL are found the same, then the control block 112 of the music reproducing apparatus 210 deletes the music data Ad subject to request from the channel play list PL in selection (namely, the channel play list PL in which the music data Ad subject to request is currently registered). If both the channel play lists PL are found different from each other, then the control block 112 adds the music data Ad subject to request to the channel play list PL in selection (namely, a channel play list PL different from the channel play list PL in which the music data Ad subject to request is currently stored).

Thus, the music reproducing apparatus 210 lets the user preview a music track based on music data Ad and recognize the contents thereof, thereby deleting user-desired music data Ad from the current list or additionally registering user-desired music data Ad to another list by executing a simple operation of pressing the request button B20 twice by the user.

In addition, reproducing music data Ad from a feature position thereof, the music reproducing apparatus 210 can let the user hear the feature position of a music track based on this music data Ad, consequently letting the user easily recognize the contents of the music track.

According to the above-mentioned novel configuration, the music reproducing apparatus 210 of the second embodiment of the invention lets the user recognize the contents of music data Ad that is content and then adds the user-desired music data Ad to another list by making the user execute a simple operation of pressing the request button B20 twice, thereby significantly facilitating a user-intended editing operation as compared with related-art counterpart.

(3-4) Variation to the Second Embodiment:

It should be noted that in the above-described second embodiment of the invention, as with the above-described basic configuration and the first embodiment, in the reproduction control of music data Ad, the music data Ad in selection is reproduced in either of the partial reproducing mode and the normal reproducing mode. However, the present invention is not limited to this. It is also practicable to repeatedly reproduce only the music data Ad subject to request while this music data Ad subject to request is specified.

Figure 39:
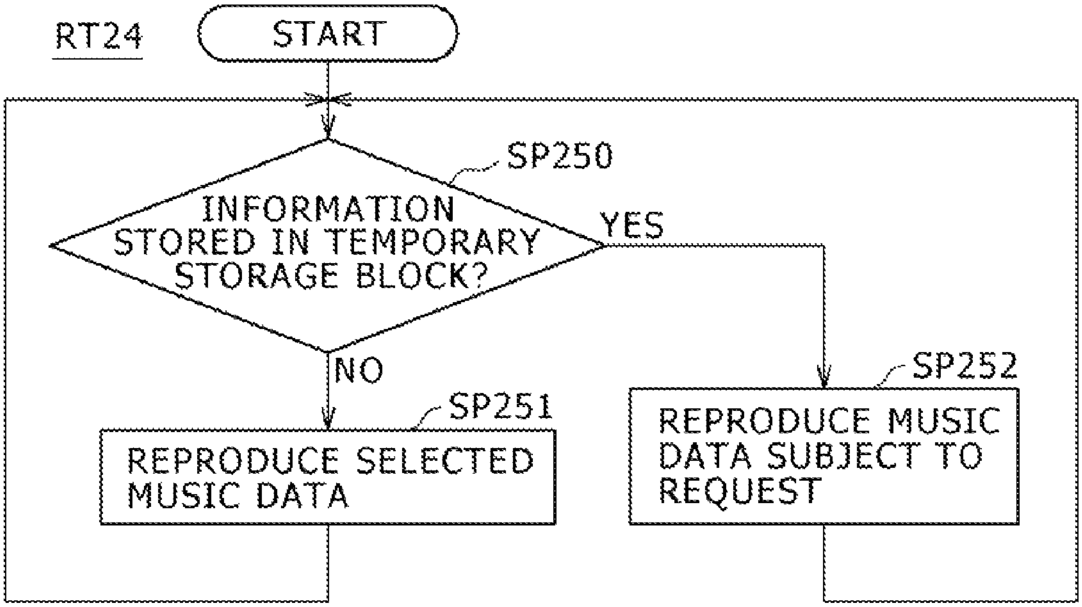
FIG. 39 is a flowchart indicative of a reproduction control procedure practiced as a variation to the second embodiment of the invention.

The following describes a reproduction control procedure. Starting up the MusicStation function, the control block 112 of the music reproducing apparatus 210 starts a reproduction control procedure RT24, upon which the procedure goes to step SP250 as shown in FIG. 39. In step SP250, the control block 112 determines whether music data information Ai and list information Li are stored in the temporary storage block 211.

In the determination is in the negative in step SP250, it indicates that music data information Ai and list information Li are not stored in the temporary storage block 211, namely, the music data Ad subject to request has not been specified, upon which the procedure goes to step SP251. In step SP251, the control block 112 reproduces the music data in selection, upon which the procedure returns to step SP250.

On the other hand, if the determination is in the affirmative in step SP250, it indicates that music data information Ai and list information Li are stored in the temporary storage block 211, namely, the music data Ad subject to request is specified, upon which the procedure goes to step SP252. In step SP252, the control block 112 reproduces the music data subject to request (the music data Ad corresponding to music data information Ai stored in the temporary storage block 211), upon which the procedure returns to step SP250. In this case, the control block 112 repeatedly reproduces the music data Ad subject to request until the request is canceled.

Consequently, while letting the user hear a music track based on the music data Ad subject to request, for example, the music reproducing apparatus 210 can let the user select a channel play list PL into which this music data Ad is additionally registered by switching between channels as instructed by the user, thereby further enhancing the ease of use at the time of list editing.

Figure 40:
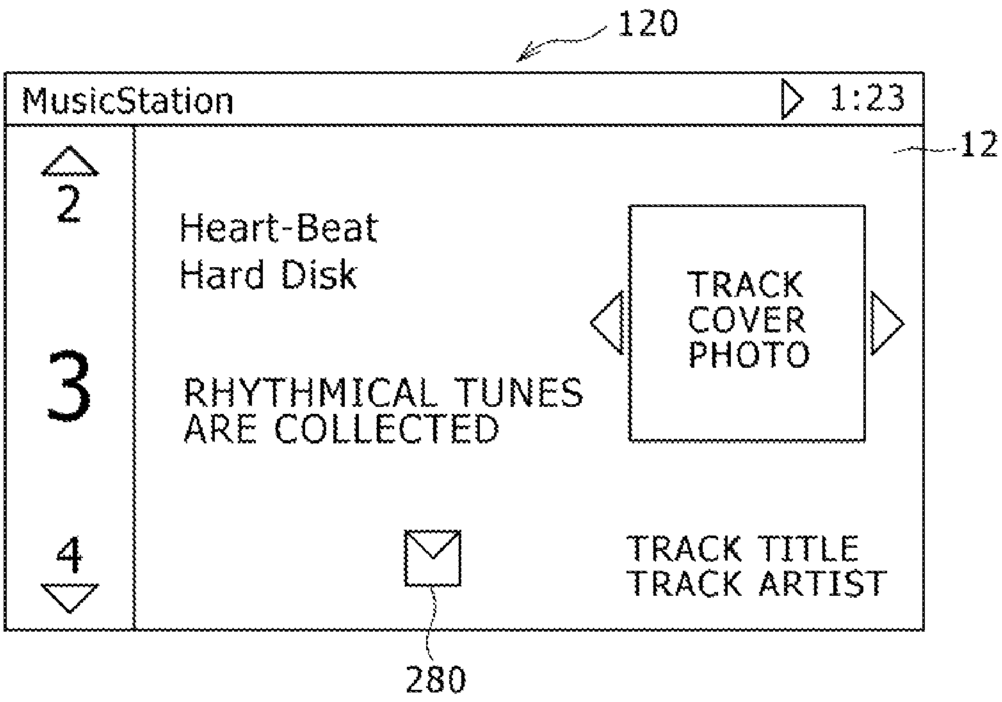
FIG. 40 is a diagram illustrating an exemplary display of a selection screen practiced as still another variation to the second embodiment of the invention.

It is also practicable, while the music data Ad subject to request is specified, to keep displaying, in the music selection area 12 of the selection screen 120, a request-subject in-specification icon 280 indicative that this specification is on as shown in FIG. 40. It should be noted that, although not shown, this request-subject in-specification icon 280 is also displayed in the selected music display area 22 of the reproducing screen 130.

Further, in the second embodiment, when the request button B20 is operated again with a channel selected different from one as it was when the request button B20 was operated last, the music data Ad subject to request is additionally registered (namely, copied) into a channel play list PL different from the currently registered channel play list PL. However, the present invention is not limited to this. It is also practicable to delete (or move) this music data Ad from the channel play list PL in which this music data Ad is originally registered.

In addition, in the second embodiment, when deleting the music data Ad subject to request from the currently registered channel play list PL by operating the request button B20, the music data reproduction setting Adi of the music data information Ai corresponding to this music data Ad is set to "reproduction prohibited" to delete from the channel play list PL in which the music data Ad subject to request is currently registered. However, it is also practicable to actually delete the music data information Ai corresponding to this music data Ad from the channel play list PL.

It should be noted that, in the second embodiment, by regarding that the music data Ad subject to request be deleted from the channel play list PL in which this music data Ad is registered by setting the music data reproduction setting Adi of the music data information Ai corresponding to the music data Ad to "reproduction prohibited", the music data reproduction setting Adi of this music data Ad may only be set to "reproduction permitted" when restoring the this deleted music data Ad, for example, thereby further enhancing the ease of use at the time of listing editing. Also, in restoring the deleted music data Ad, this processing may be executed for all channel play lists PL or a particular channel play list PL.

Further, in the second embodiment, as a message for the confirmation of deletion processing or additional registration processing, the deletion confirmation dialog 230 or the add confirmation dialog 240 is displayed as superimposed on the selection screen 120 or the reproducing screen 130. However, the present invention is not limited to this. It is also practicable to display text information indicative of deletion processing or additional registration processing directly onto the selection screen 120 or the reproducing screen 130. Any other kinds of information may be displayed as such a message as far as such information tells the user the confirmation of deletion processing or additional registration processing on the GUI screen.

Still further, in the second embodiment, the request acceptance dialog 220 and the no-data notification dialog 250 are closed when the close button 222 and the close button 253, respectively, are operated. However, the present invention is not limited to this. It is also practicable to automatically close the request acceptance dialog 220 and the no-data notification dialog 250 after passing of a predetermined period of time after displaying these dialogs.

Yet further, in the second embodiment, when the deletion stop button 233 and the additional registration stop button 243 are operated, music data information Ai and list information Li will not be deleted from the temporary storage block 211. However, the present invention is not limited to this. It is also practicable to delete music data information Ai and list information Li from the temporary storage block 211 when the deletion stop button 233 and the additional registration stop button 243 are operated.

In addition, in the second embodiment, if the default channel or a channel on which music data Ad has been reproduced before is selected and the number of music data Ad registered in the channel play lists PL of these channels is less than a predetermined number, music data Ad is reproduced as far as at least one track of music data Ad is registered. However, the present invention is not limited to this. It is also practicable, if a channel of which channel display setting is set to "display" on the channel display setting screen 140 as instructed by the user is selected, to reproduce music data Ad as far as at least one track of music data Ad is registered in the channel play list PL of this channel.

(4) Third Embodiment

(4-1) Outline of the Third Embodiment:

The following describes an outline of a third embodiment of the invention, followed by specific examples thereof.

Figure 41:
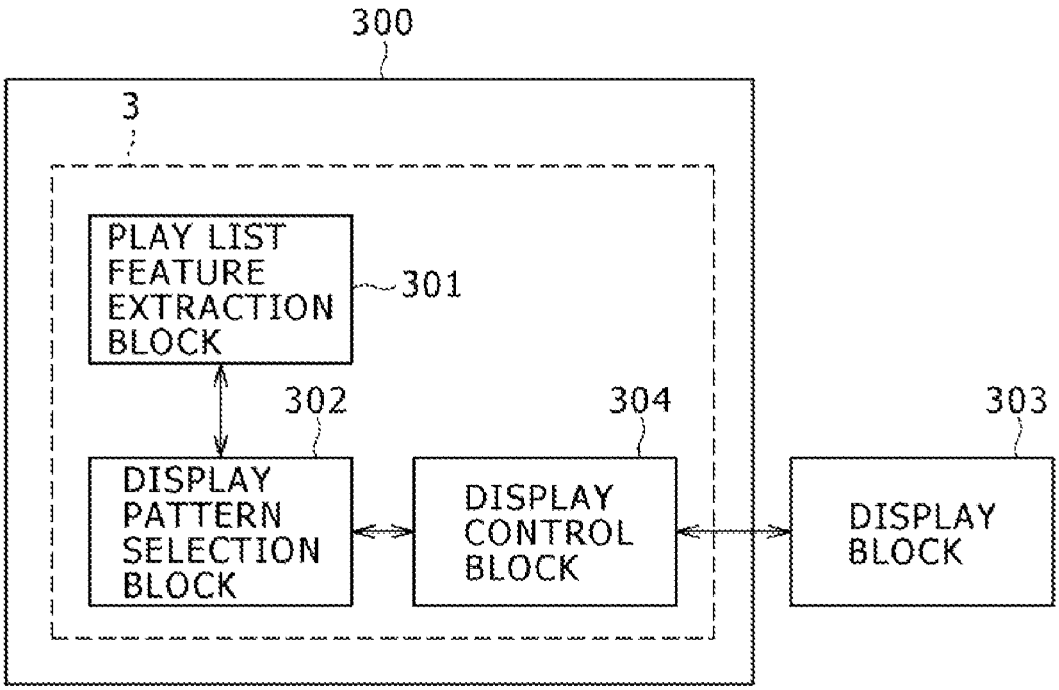
FIG. 41 is a block diagram illustrating an outline of the a display control apparatus practiced as a third embodiment of the invention.

A display control apparatus 300 shown in FIG. 41 is an apparatus configured to control the displaying of a play list specifying a sequence of the reproduction of a plurality of items of content and has a play list feature extraction block 301 for extracting a feature of the play list on the basis of a plurality of items of content registered in the play list, a display pattern selection block 302 for selecting a display pattern in which the play list is displayed on the basis of the extracted feature of the play list, a display block 303 for displaying a play list in accordance with the display pattern selected by the display pattern selection block 302, and a display control block 304 for controlling the displaying of the display pattern on the display block 303.

It should be noted that the play list feature extraction block 301, the display pattern selection block 302, and the display control block 304 correspond to the control block 3 of the content reproducing apparatus 1 (FIG. 1) that provides the above-described basic configuration.

Configured as such, the display control apparatus 300 according to the third embodiment of the invention can display play lists in display patterns suitable thereto, thereby providing a novel way of accessing content different from related-art counterpart.

Figure 42:
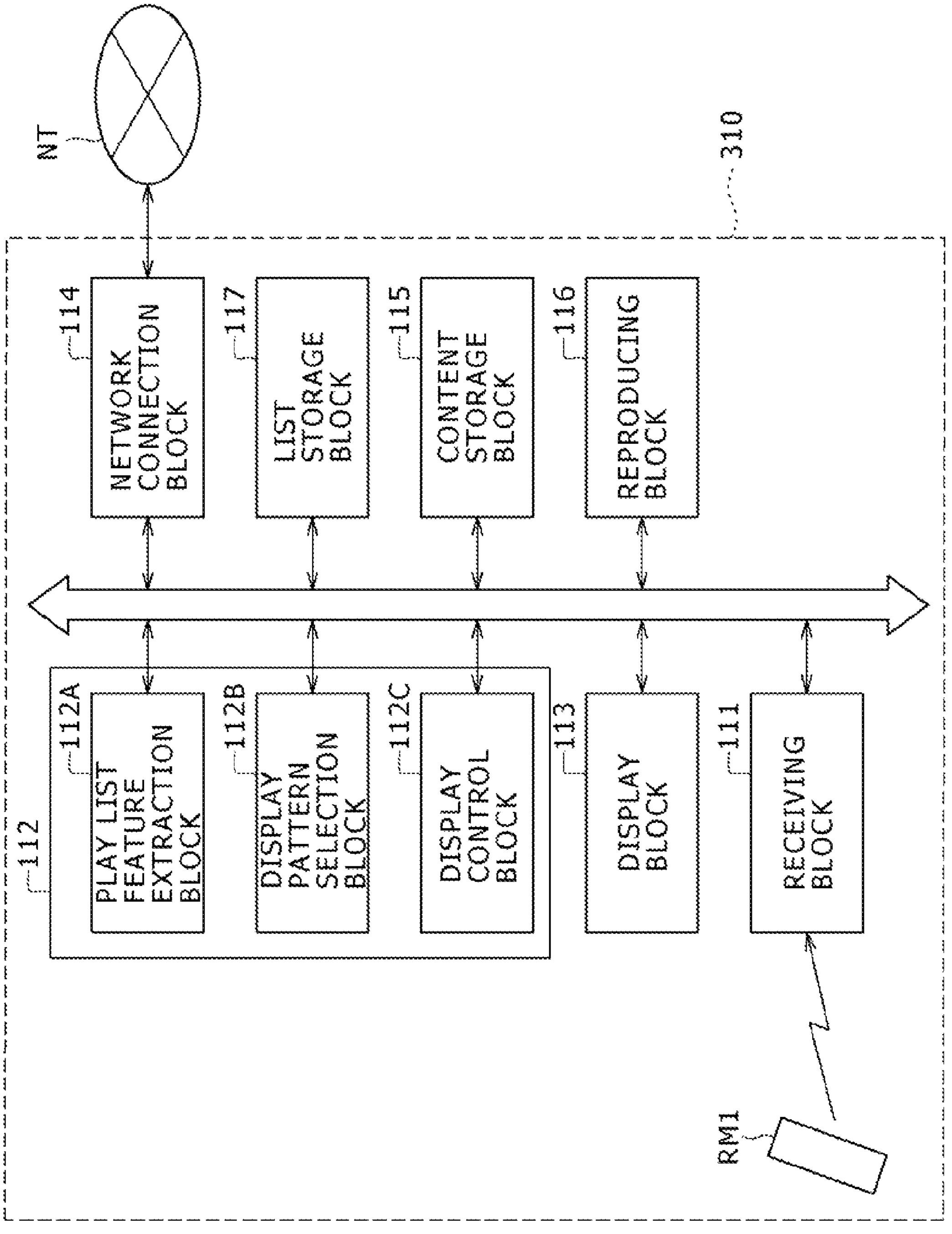
FIG. 42 is a block diagram illustrating an exemplary configuration of a music reproducing apparatus practiced as the third embodiment of the invention.

(4-2) Specific Examples of the Third Embodiment:

The following describes specific examples of the third embodiment. A music reproducing apparatus 310 shown in FIG. 42 is one of specific examples of the above-mentioned display control apparatus 300 and, as denoted by the same reference numerals to substantially the same components as those shown in FIG. 13, has a configuration that is different from the music reproducing apparatus 110 of the first embodiment in the lack of the clock block 118.

The music reproducing apparatus 310 has, in the control block 112, a play list feature extraction block 112A for extracting a feature of each channel play list PL, a display pattern selection block 112B for selecting a display pattern in which the channel list PL is displayed on the basis of the extracted feature of the channel play list PL, and a display control block 112C for controlling the display block 113 so as to display a GUI in accordance with the selected display pattern, which will be described later.

Further, this music reproducing apparatus 310 has a remote controller RM1 that is substantially the same as the remote controller RM1 of the first embodiment.

It should be noted that the play list feature extraction block 112A, the display pattern selection block 112B, and the display control block 112C of the music reproducing apparatus 310 correspond to the play list feature extraction block 301, the display pattern selection block 302, and the display control block 304, respectively, of the display control apparatus 300.

Like the above-described music reproducing apparatus 110 of the first embodiment, the music reproducing apparatus 310 provides a download function, a CD recording function, a normal reproducing function, a CD reproducing function, and the MusicStation function. The control block 112 executes the processing of these functions as instructed by the user through the remote controller RM1.

The following describes the MusicStation function provided by the music reproducing apparatus 310. First, a method of managing music data Ad in this MusicStation function will be described. This management method is substantially the same as that by the music reproducing apparatus 110 of the first embodiment, details thereof being understood with reference to the description of the first embodiment of the invention.

To be more specific, the music reproducing apparatus 310 of the third embodiment is configured to manage a plurality of channel play lists PL by a channel list CL and a sequence of reproducing music data Ad by each of these channel play lists PL as shown in FIG. 2.

As with the above-mentioned first embodiment, this MusicStation function has, beforehand, channel play lists PL for categories considered to be required by the user, such as newly added music, infrequently reproduced music, rhythmical music, cheerful music, classical music, and heavy metal music, for example. In accordance with the storage or reproduction of music data Ad, the control block 112 of the music reproducing apparatus 310 automatically update channel play lists PL by registering the music data Ad stored in the content storage block 115 into corresponding channel play lists PL of the prepared channel play lists PL on the basis of the reproduction count, music impression value, and genre of the music data Ad.

Then, the music reproducing apparatus 310 allows the user to select, through the remote controller RM1 and on a GUI screen, desired channel play lists PL classified as newly added music, infrequently reproduced music, rhythmical music, cheerful music, classical music, and heavy metal music, for example, as channels, thereby allowing the user to easily find desired music in a feeling in which the user switches between radio channels.

Further, the GUI screen in the MusicStation function is substantially the same in configuration as the GUI screen of the music reproducing apparatus 110 of the first embodiment. Therefore, details of this GUI screen can be understood by referencing the description of the GUI screen of the first embodiment.

To be more specific, while letting the user visually recognize the contents of channel and music track through the selection screen 120 shown in FIG. 15, the music reproducing apparatus 310 of the third embodiment switches between channels and selects a specified channel in response to a user operation done through the up button B13 or the down button B14 of the remote controller RM1 and switches between music tracks and selects a specified music track in response to a user operation done through the left button B15 or the right button B16 of the remote controller RM1.

The music reproducing apparatus 310 is also configured to switch the selection screen 120 to the reproducing screen 130 under a predetermined condition (pressing of the enter button B17 or passing of a predetermined period of time without operation by the user) and let the user visually check the contents of the selected channel and music through the reproducing screen 130.

Further, the reproduction of music data Ad accompanying the switching of GUI screens is controlled in substantially the same manner as the reproduction control by the music reproducing apparatus 110 of the first embodiment. Therefore details of the reproduction control of the third embodiment can be understood with reference to the description of the first embodiment.

Namely, the music reproducing apparatus 310 according to the third embodiment gets in the partial reproducing mode in which the selected music data Ad is reproduced from a feature position thereof when the selection screen 120 is displayed and gets in the normal reproducing mode in which the selected music data is normally reproduced when the reproducing screen 130 is displayed. In each mode, music data Ad is reproduced without discontinuation while the MusicStation function is being executed.

Consequently, during the execution of the MusicStation function, as with the music reproducing apparatus 110 of the first embodiment, the music reproducing apparatus 310 of the third embodiment can switch between channel play lists PL on a channel basis as if switching between radio preset stations in accordance with an operation done through the up button B13 or the down button B14 of the remote controller RM1 and switch between music tracks within a channel in accordance with an operation done through the left button B15 and the right button B16, thereby letting the user hear desired music more easily as if hearing the music broadcast from radio stations.

In addition, a MusicStation function startup procedure, a channel switching procedure, and a music track switching procedure are substantially the same as those executed by the music reproducing apparatus 110 of the first embodiment. Therefore, details of these procedures can be understood with reference to the description of the first embodiment.

Further, the channel display setting method in the MusicStation function is substantially the same as the display setting method executed by the music reproducing apparatus 110 of the first embodiment. Therefore, details of the channel display setting method can be understood with reference to the description of the first embodiment.

Namely, the music reproducing apparatus 310 according to the third embodiment is configured to change the channel display setting to "display" or "no-display" on a channel basis through the channel display setting screen 140 shown in FIG. 22.

As described so far, as with the first embodiment, the music reproducing apparatus 310 of the third embodiment has the MusicStation function corresponding to the operation of the remote controller RM1 and can easily execute the startup of the MusicStation function, channel switching, music track switching, and channel display setting through the remote controller RM1.

Meanwhile, with this MusicStation function, there are a default play list PL with list reproduction setting Ldi fixed to "reproduction permitted" and the other channel play list, that is, a channel play list in which list reproduction setting Ldi can be changed from "reproduction permitted" to "reproduction prohibited" and vice versa (hereafter referred to also as a setting changeable play list) as described above. Therefore, the music reproducing apparatus 310 can change the list reproduction setting Ldi of the setting changeable play list PL as the channel display setting of a channel to which the setting changeable play list PL is allocated as instructed by the user on the channel display setting screen 140.

As described above, as instructed by the user, while changing the list reproduction setting Ldi (namely, the channel display setting of each channel) of each setting changeable play list PL, the music reproducing apparatus 310 according to the third embodiment can automatically select the list reproduction setting Ldi (namely, the channel display setting of each channel) of each setting changeable play list PL in accordance with the feature (the number of registered music data Ad for example) of each setting changeable play list PL.

To be more specific, the music reproducing apparatus 310 gets the number of the music data Ad registered in each setting changeable play list by the play list feature extraction block 112A of the control block 112 and, in accordance with the obtained number, the display pattern selection block 112B of the control block 112 selects the list reproduction setting Ldi (or the channel display setting of each channel) of each setting changeable play list PL.

In this case, if the number of music data Ad registered in the setting changeable play list PL obtained by the play list feature extraction block 112A is zero, then the display pattern selection block 112B sets the list reproduction setting Ldi of this setting changeable play list PL to "reproduction prohibited" to set the channel display setting of the channel to which this setting changeable play list PL is allocated to "no-display"; if the number of the music data Ad registered in the setting changeable play list PL obtained by the play list feature extraction block 112A is one or more, then the display pattern selection block 112B sets the list reproduction setting Ldi to "reproduction permitted" to set the channel display setting to which this setting changeable play list PL is allocated to "display".

Then, in accordance with the channel display setting automatically selected by the display pattern selection block 112B, the display control block 112C of the control block 112 displays the selection screen 120 and the reproducing screen 130 onto the display block 113.

To be more specific, if no music data Ad has been registered in the setting changeable play list PL, as immediately after the purchase of the music reproducing apparatus 310, for example, the control block 112 of the music reproducing apparatus 310 sets the channel display setting of a channel to which this setting changeable play list PL is allocated to "no-display" (namely, the list information Li of the setting changeable play list PL is not displayed on the selection screen 120) so as to prevent the user from selecting this channel (namely, the setting changeable play list PL) on the selection screen 120; when one or more music data Ad are registered in the setting changeable play list PL as music data Ad is added, the control block 112 sets the channel display setting of the channel to which this setting changeable play list PL is allocated to "display" (namely, the list information Li of the setting changeable play list PL is displayed on the selection screen 120) as to allow the user to select this channel (namely, the setting changeable play list PL) onto the selection screen 120.

As a result, the MusicStation function allows only the selection of the default channel in the start phase of using the music reproducing apparatus 310 (namely, only the default play list DPL can be used), but, as music data Ad is added, the number of selectable channels increases (namely, the number of selectable setting changeable play lists PL increases).

Consequently, the music reproducing apparatus 310 can let the user recognize that the addition of music data Ad increases the number of channels available in the MusicStation function, thereby further prompting the user for the addition of music data Ad and, at the same time, providing ways of the enjoyment of increasing the number of available channels and searching for new channels, in addition to simply hearing music.

When selectable channels are newly added as described above, the music reproducing apparatus 310 notifies the user of the addition at the time of MusicStation function start-up or channel selection.

Figure 43:
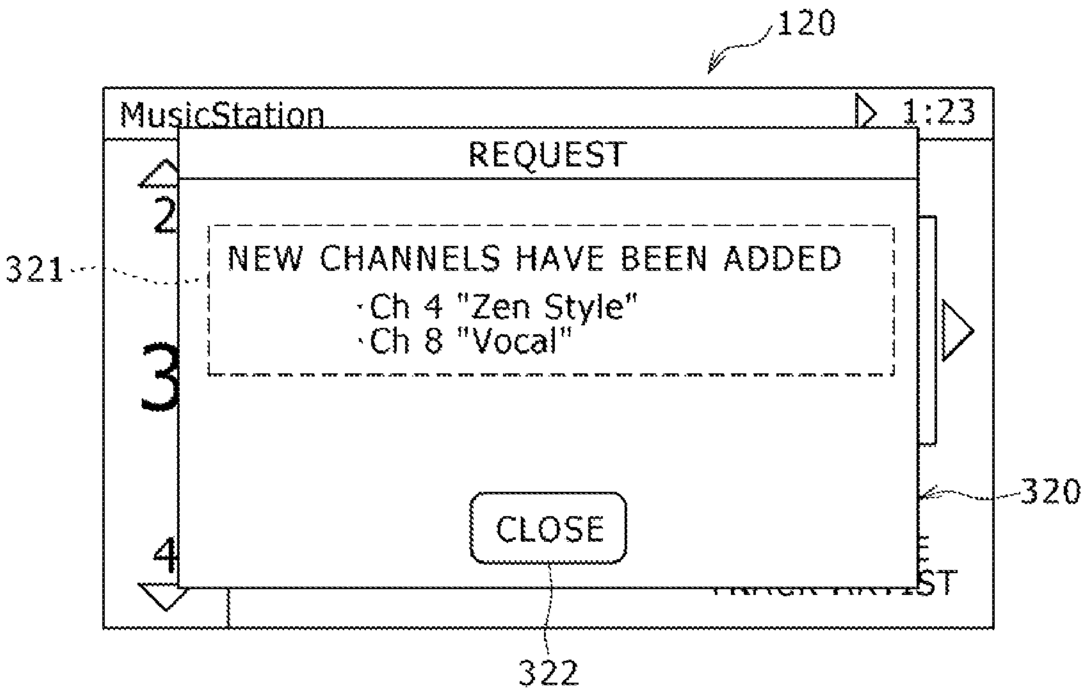
FIG. 43 is a diagram illustrating an exemplary configuration of a channel add notification dialog practiced as the third embodiment of the invention.

To be more specific, as described above, if a selectable channel has newly been added, the music reproducing apparatus 310 displays a channel addition notification dialog 320 for notifying the user of the addition of a selectable channel, as superimposed on the selection screen 120 as shown in FIG. 43.

This channel addition notification dialog 320 shows text information 321 indicative of the new addition of a selectable channel (for example, "New channel has been added. Ch4 'Zen Style' Ch8 'Vocal' ") and a close button 322 for closing this channel addition notification dialog 320.

Then, when the close button 322 is operated by the user through the remote controller RM1, the control block 112 of the music reproducing apparatus 310 closes the channel addition notification dialog 320.

Figure 44:
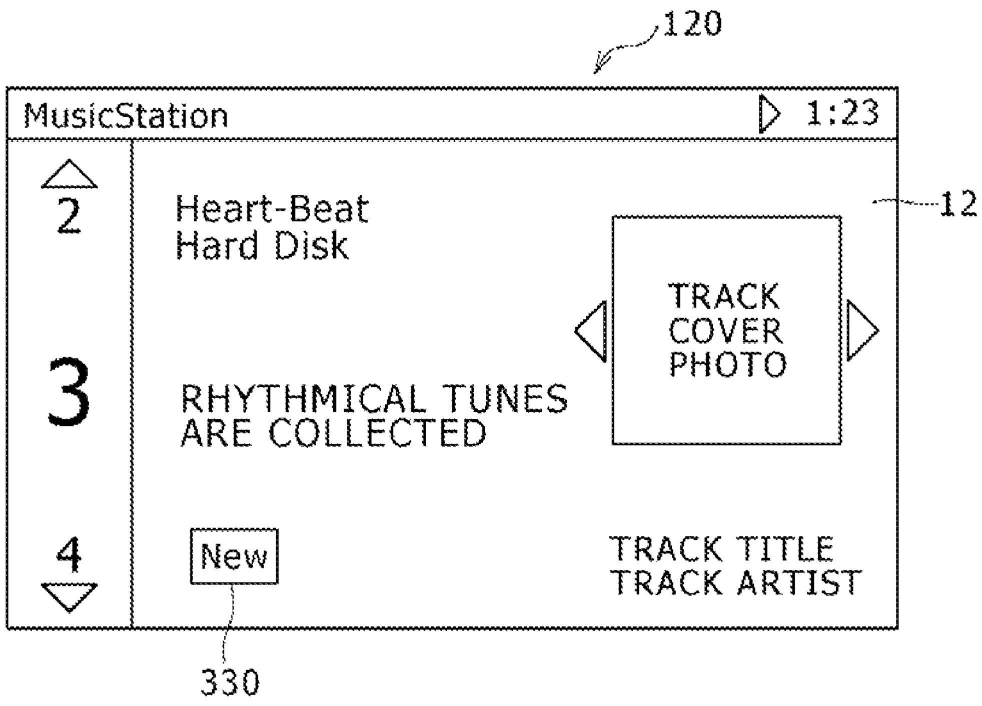
FIG. 44 is a diagram illustrating a display example (1) of a selection screen practiced as the third embodiment of the invention.
Figure 45:
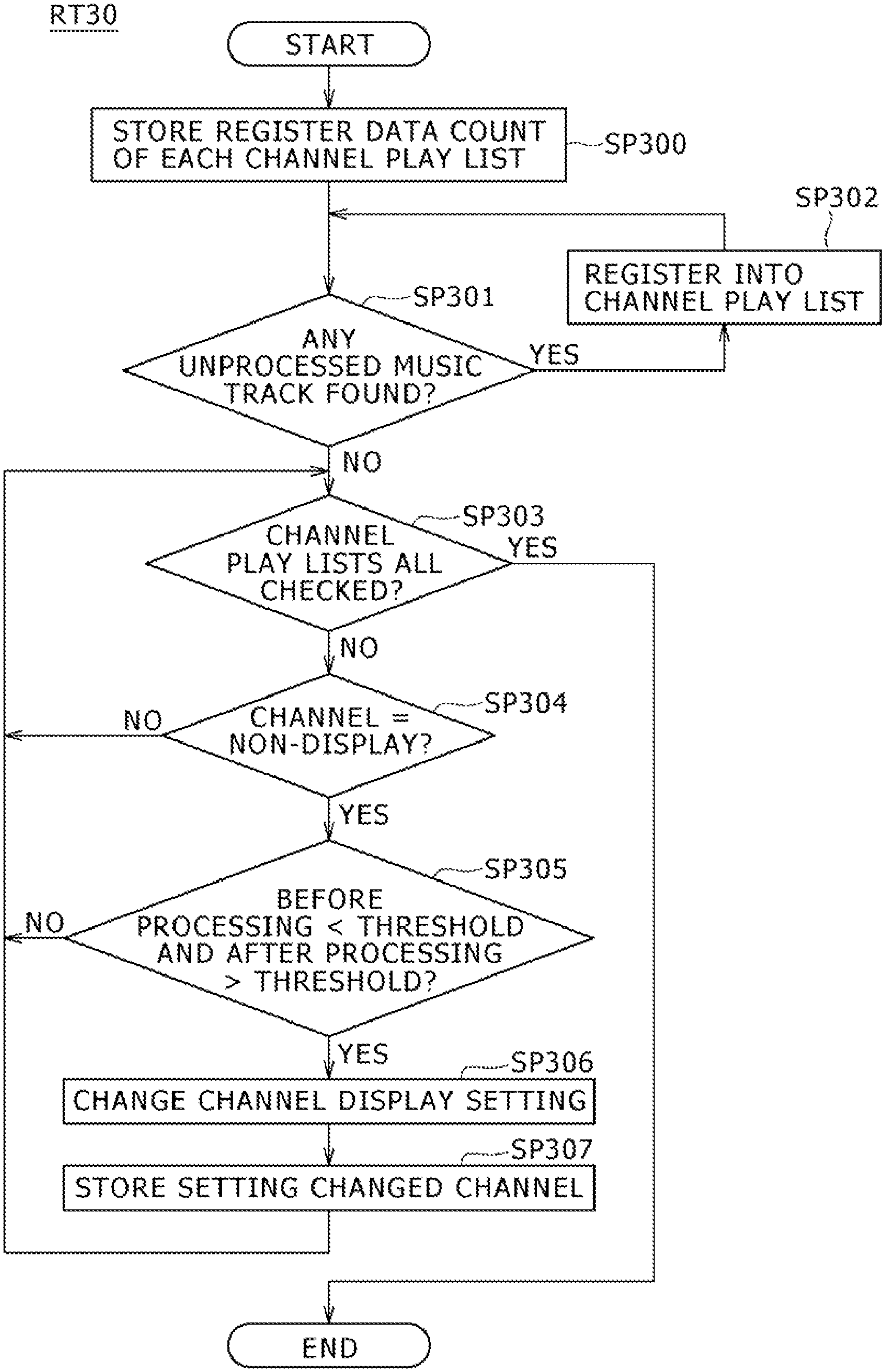
FIG. 45 is a flowchart indicative of a channel display setting change procedure practiced as the third embodiment of the invention.

If a selectable channel is newly added and this newly added selectable channel is selected in accordance with a channel switching operation, the music reproducing apparatus 310 displays an addition notification icon 330 indicative that this channel is a newly added channel into the music selection area 12 of the selection screen 120, as shown in FIG. 44.

Although not shown, this addition notification icon 330 is also displayed in the selected music display area 22 of the reproducing screen 130.

Thus, the music reproducing apparatus 310 lets the user recognize that a selectable channel has newly been added. It should be noted that the channel addition notification dialog 320 and the addition notification icon 330 are displayed by the display control block 112C onto the display block 113 as instructed by the display pattern selection block 112B.

The following describes a procedure of automatically changing list reproduction setting Ldi (namely, channel display setting) in accordance with the feature of the setting changeable play list PL (hereafter referred to also as a channel display setting change processing).

Having added (or stored) music data Ad newly downloaded by the download function as instructed by the user into the content storage block 115, the control block 112 of the music reproducing apparatus 310 starts a channel display setting changing procedure RT30, upon which the procedure goes to step SP300.

In step SP300, the control block 112 gets registered data count Tn from the list information Li of all channel play lists PL through the play list feature extraction block 112A and then temporarily stores the obtained registered data count Tn into the content storage block 115 or the list storage block 117, upon which the procedure goes to step S301. It should be noted that registered data count Tn is updated every time the MusicStation function ends, so that the registered data count Tn is indicative of the number of music data Ad registered in the channel play list PL at the last startup of the MusicStation function, namely, the number of music data Ad registered in the channel play list PL before the music data was newly added.

In step SP301, the control block 112 determines whether there is any unprocessed music data Ad (namely, the music data Ad registered in no channel play list PL) in the content storage block 115, on the basis of a database DB built in the content storage block 115 and the channel play list PL stored in the list storage block 117.

If the determination is in the affirmative in step SP301, it indicates that all the newly added music data Ad have not been registered in the channel play list PL, upon which the procedure goes to step SP302. In step SP302, the control block 112 registers the music data Ad not yet registered into the corresponding channel play list PL among the prepared channel play lists PL in accordance with the reproduction count, music impression value, and genre of the music data Ad, upon which the procedure returns to step SP301.

When all the newly added music data Ad have been registered in the channel play list PL as described above, the control block 112 gets affirmative determination in step SP301, upon which the procedure goes to step SP303.

In step SP303, before confirming the channel display setting for all channels (namely, the list reproduction setting Ldi of each channel play list PL), the control block 112 determines whether the channel display setting has been completed for all channels. Here, no channel has been confirmed, so that the determination is in the negative, upon which the procedure goes to step SP304.

In step SP304, the control block 112 confirms (namely, confirms the list reproduction setting Lid of the channel play list PL of the start channel) the channel display setting of a channel (hereafter referred to also as a start channel) corresponding to the start channel number CN for example of the channel list CL through the play list feature extraction block 112A and determines whether this channel display setting is "no-display" (namely, whether the list reproduction setting Ldi is "reproduction-prohibited"). If the determination is in the negative in step SP304, it indicates that the channel display setting of this start channel is "display", namely, this start channel is a (selectable) channel displayed by the MusicStation function, upon which the procedure goes to step SP303.

On the other hand, if the determination is in the affirmative in step SP304, it indicates that the channel display setting of the start channel is "no-display", namely, this start channel is not currently displayed (or selected) by the MusicStation function, upon which the procedure goes to step SP305.

In step SP305, the control block 112 reads the registered data count Tn of the channel play list PL of this start channel from the content storage block 115 or the list storage block 117 in which the registered data count Tn of each channel play list is temporarily stored and confirms the number of pieces music data information Ai in the channel play list PL of this start channel (namely, the number of currently registered music data Ad) through the play list feature extraction block 112A, thereby determining whether the registered data count Tn is less than a predetermined threshold (less than one, namely, zero, for example) and the number pieces of music data information Ai is more than a predetermined threshold (one or more, for example), namely, at least one music data Ad has been registered in the channel play list PL of the start channel.

If the determination is in the negative in step SP305, it indicates that there is no music data Ad registered in the channel play list PL of the start channel, upon which the procedure in the play list feature extraction block 112A returns to step SP303.

On the other hand, if the determination is in the affirmative in step SP305, it indicates that at least one music data Ad has been registered in the channel play list PL of the start channel, upon which the procedure in the play list feature extraction block 112A goes to step SP306. In step SP306, the control block 112 changes the channel display setting of the start channel from "no-display" to "display" through the display pattern selection block 112B, upon which the procedure goes to step SP307 with this start channel as a (selectable) channel to be newly displayed by the MusicStation function.

In step SP307, the control block 112 stores the information (hereafter referred to also as channel added information) indicative that this start channel is a newly added channel into the content storage block 115 or the list storage block 117, upon which the procedure returns to step SP303. It should be noted that this channel added information is used to identify each newly added channel at the start of the MusicStation function.

Then, back in step SP303, the control block 112 executes the processing of steps SP303 through SP307 on all channels subsequent to the start channel. When this processing has been completed (namely, the channel display setting of all channels has been confirmed), the determination in step SP303 is in the affirmative, upon which the channel display setting changing procedure RT30 comes to an end.

By this channel display setting change procedure, the control block 112 of the music reproducing apparatus 310 automatically changes the channel display setting of each channel.

Further, in this MusicStation function, in accordance with the feature of each channel play list PL (for example, the number of registered music data Ad), the color saturation (or vividness of color) of the selection screen 120 and the reproducing screen 130 when a channel allocated with that channel play list PL is selected is changed.

To be more specific, in accordance with the number of music data Ad registered in a channel play list obtained by the play list feature extraction block 112A of the control block 112, the music reproducing apparatus 310 causes the display pattern selection block 112B to select the color saturation of the selection screen 120 and the reproducing screen 130 (namely, the selection screen 120 and the reproducing screen 130 at the time when the list information Li of that channel play list PL is displayed) at selecting the channel allocated with that channel play list PL.

Figure 46A:
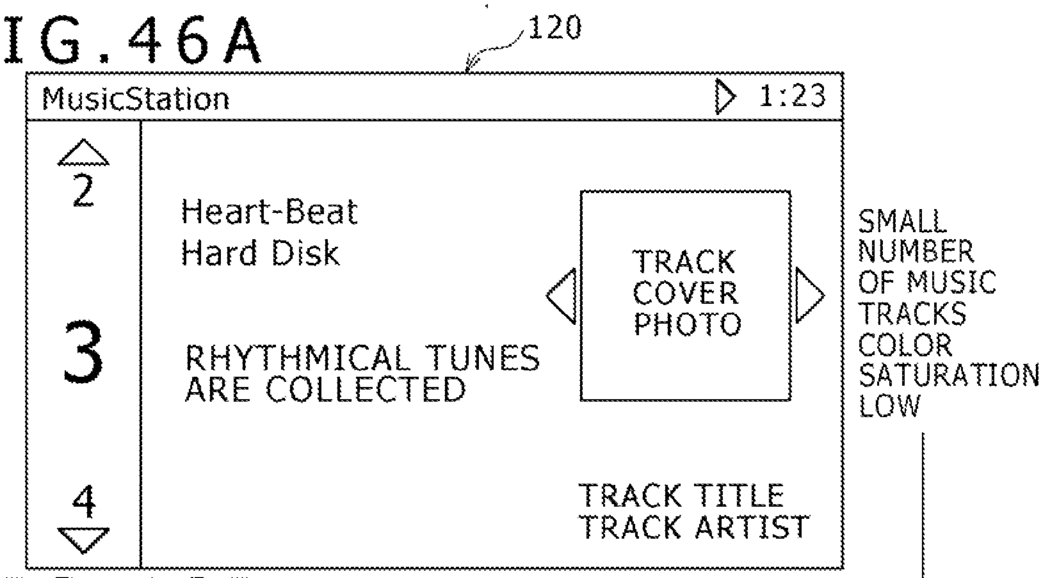
FIGS. 46A to 46C are diagrams illustrating a display pattern of the selection screen practiced as the third embodiment of the invention.
Figure 46B:
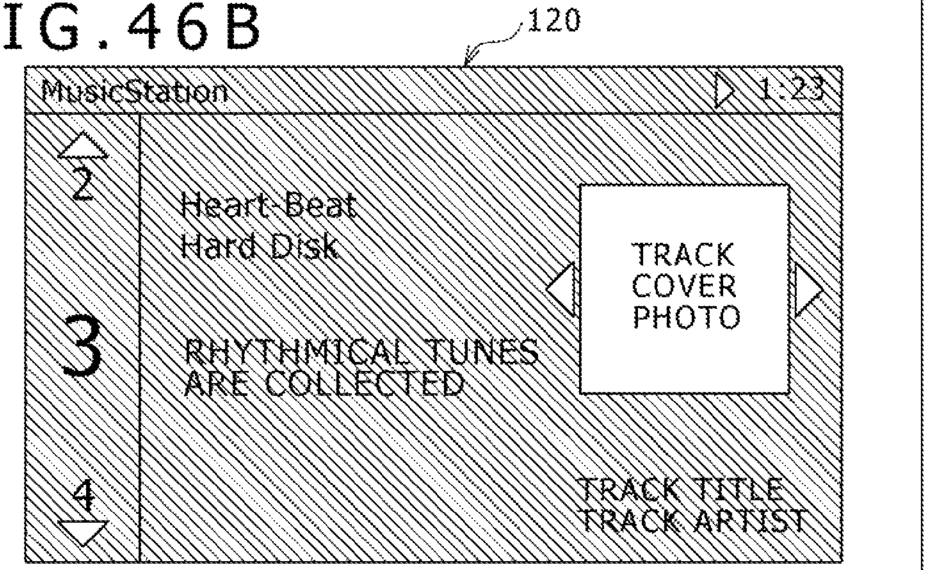
Figure 46C:
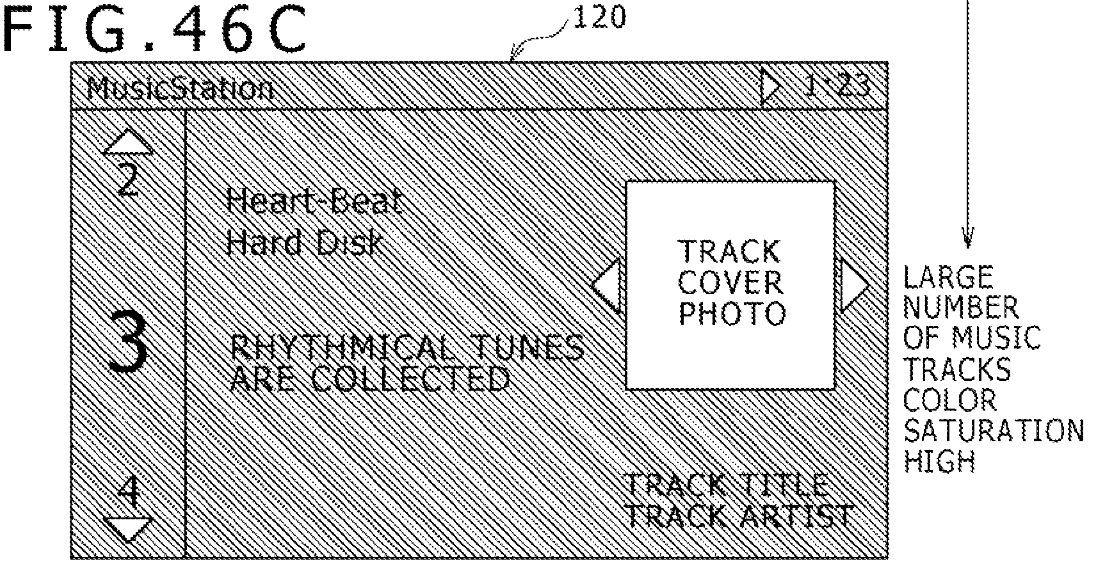

In this case, if the number of the music data Ad registered in the channel play list PL obtained by the play list feature extraction block 112A is equal to or less than 5, for example, the display pattern selection block 112B selects a first color saturation that is lowest as the color saturation of the selection screen 120 when the list information Li of that channel play list PL is displayed as shown in FIG. 46A; if the number of the music data Ad is equal to or more than 6 and no more than 10, the display pattern selection block 112B selects a second color saturation that is higher than the first color saturation as shown in FIG. 46B; and, if the number of the music data Ad is 11 or more, the display pattern selection block 112B selects a third color saturation that is higher than the second color saturation as shown in FIG. 46C. It should be noted that, although not shown, the color saturation of the reproducing screen 130 is set in the same manner.

Then, in accordance with the color saturation automatically selected by the display pattern selection block 112B, the display control block 112C of the control block 112 displays the selection screen 120 and the reproducing screen 130 onto the display block 113.

Consequently, in addition to adding music data Ad to let the user hear new music, the music reproducing apparatus 310 provides the joy of seeing a channel play list PL that is vividly shown with the addition of music data Ad. As a result, the user is prompted to further add more music data Ad.

Figure 47:
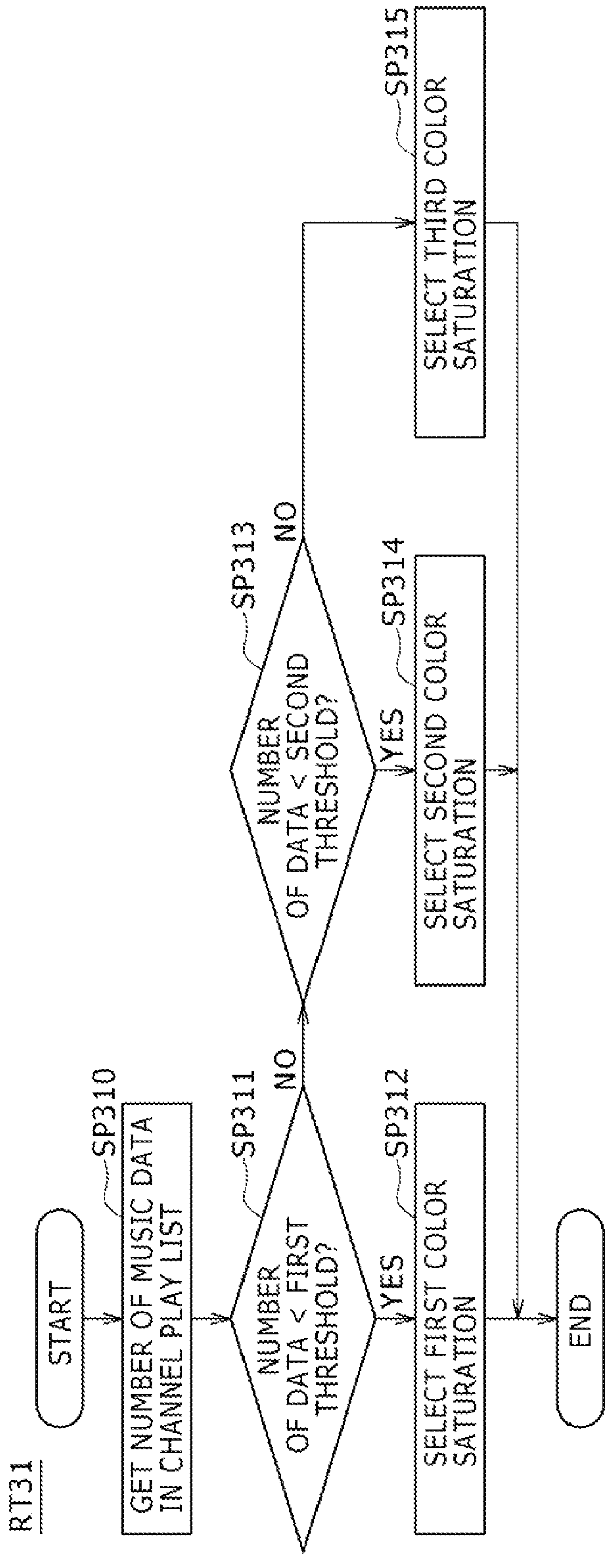
FIG. 47 is a flowchart indicative of a screen color saturation selecting procedure practiced as the third embodiment of the invention.

The following describes a procedure of selecting the color saturation of the selection screen 120 and the reproducing screen 130 (hereafter referred to also as screen color saturation selection processing). It should be noted that, for the convenience of description, the following describes the selection of the color saturation of the selection screen 120 for example. Selecting one of channel play lists PL through the selection of a channel at starting up of the MusicStation function or selecting one of channel play lists PL through the selection of a channel in accordance with a channel switching operation during the startup of the MusicStation function, the control block 112 of the music reproducing apparatus 310 starts a screen color saturation selecting procedure RT31, upon which the procedure goes to step SP310 as shown in FIG. 47.

In step SP310, the control block 112 gets the number of music data Ad currently registered in the channel play list PL in selection through the play list feature extraction block 112A, upon which the procedure goes to step SP311. Here, the play list feature extraction block 112A gets the music data information Ai in the channel play list PL to get the number of currently registered music data Ad.

In step SP311, the control block 112 determines whether the obtained number of music data Ad is equal to or less than a first threshold (5, for example). If the determination is in the affirmative in step S311, it indicates that the number of music data registered in the channel play list PL in selection is equal to or less than 5, upon which the procedure goes to step SP312.

In step SP312, the control block 112 selects, through the display pattern selection block 112B, the first color saturation that is lowest as shown in FIG. 46A as the color saturation of the selection screen 120 on which the list information Li of the channel play list PL in selection, thereby ending the screen color saturation selecting procedure RT31.

On the other hand, if the determination is in the negative in step SP311, it indicates that the number of music data Ad registered in the channel play list PL in selection is 6 or more, upon which the procedure goes to step SP313.

In step S313, the control block 112 determines whether the obtained number of music data Ad is equal to or less than a second threshold (10 for example). If the determination is in the affirmative in step SP313, it indicates that the number of the music data Ad registered in the channel play list in selection is 6 or more and no more than 10, upon which the procedure goes to step SP314.

In step SP314, the control block 112 selects the second color saturation that is higher than the first color saturation as the color saturation of the selection screen 120 on which the list information Li of the channel play list PL in selection is displayed as shown in FIG. 46B, thereby ending this screen color saturation selecting procedure RT31.

On the other hand, if the determination is in the negative in step SP313, it indicates that the number of the music data Ad registered in the channel play list PL in selection is 11 or more, upon which the procedure goes to step SP315.

In step SP315, the control block 112 selects the third color saturation that is higher than the second color saturation as the color saturation of the selection screen 120 on which the list information Li of the channel play list PL in selection is displayed as shown in FIG. 46C, thereby ending this screen color saturation selecting procedure RT31.

By this screen color saturation selecting procedure RT31, the control block 112 of the music reproducing apparatus 310 selects the color saturation of the selection screen 120 corresponding to the channel play list PL in selection.

It should be noted that, for the convenience of description, this screen color saturation selecting procedure RT31 has been described separately in the MusicStation function startup procedure RT10 and the channel switching procedure RT11; actually, however, screen color saturation selection is executed within the MusicStation function startup procedure RT10 and the channel switching procedure RT11. Namely, this screen color saturation selecting procedure RT31 is executed in step SP108 of the MusicStation function startup procedure R10 and step SP118 of the channel switching procedure R11, for example.

Consequently, the selection screen 120 displayed in step SP108 of the MusicStation function startup procedure RT10 and step SP118 of the channel switching procedure RT11 is displayed by the display control block 112C in the color saturation selected by the display pattern selection block 112B.

(4-3) Operations and Effects of the Third Embodiment:

In the above-described novel configuration, the music reproducing apparatus 310 manages a plurality of music data Ad stored in the content storage block 115 by a plurality of channel play lists PL in which music data information Ai is listed, this music data information Ai being the content identification information for music data Ad and stored in the list storage block 117.

As instructed by the user through the remote controller RM1, the control block 112 of the music reproducing apparatus 310 selects one of the plurality of channel play lists PL and then displays the list information Li (list name Lt and list description Lde) onto the selection screen 120.

The control block 112 of the music reproducing apparatus 310 extracts a feature (or the number of registered music data Ad) of each channel play list through the play list feature extraction block 112A and, in accordance with the extracted feature, selects, through the display pattern selection block 112B, a display pattern (display or no-display and color saturation) in which each channel play list PL is displayed on the selection screen 120.

To be more specific, if the number of music data Ad registered in a channel play list PL is zero, the display pattern selection block 112B sets this channel play list to "no-display"; if the number of music data Ad registered in a channel play list PL is one or more, the display pattern selection block 112B sets this channel play list PL to "display".

Namely, the music reproducing apparatus 310 lets the user know the existence of a channel play list PL in which at least one music data Ad is registered as a result of the addition of music data Ad by the user, thereby providing a new way of enjoying music, such as increasing the number of selectable channels by adding music data Ad and searching for new channel play lists PL by adding music data Ad, for example.

If the number of music data Ad registered in a channel play list PL is below the first threshold (5 for example), the display pattern selection block 112B selects the first color saturation as a color saturation in which this channel play list PL is displayed; if the number is equal to or higher than the first threshold and equal to or lower than the second threshold (10 for example), the display pattern selection block 112B selects the second color saturation; and, if the number is equal to or higher than the second threshold, the display pattern selection block 112B selects the third color saturation.

Namely, the music reproducing apparatus 310 displays channel play lists PL in different color saturations in accordance with the number of music data Ad registered in these channel play lists PL, thereby providing a new way of enjoying music, such as viewing channel play lists PL in different color saturations based on the number of registered music data Ad.

In addition, in accordance with the number of data Ad registered in each channel play list PL, a pattern in which each channel play list PL is displayed on the selection screen 120 is selected as described above, so that the reproducing screen 130 can let the user recognize the provision of new ways of enjoying music as music data Ad is added, thereby eventually prompting the user to add more music data Ad.

According to the above-mentioned novel configuration, the music reproducing apparatus 310 can display each channel play lists PL in a pattern suitable for the feature of the channel play list PL, thereby providing a new way of enjoying music with respect to music data Ad registered in each channel play list PL.

(4-4) Variations to the Third Embodiment

In the above-described third embodiment, the color saturations of the selection screen 120 and the reproducing screen 130 are selected as display patterns in accordance with the feature of each channel play list PL. However, it is also practicable to select the brightness (namely, the brightness of the back light of the display block 113) to provide different display patterns.

Figure 48:
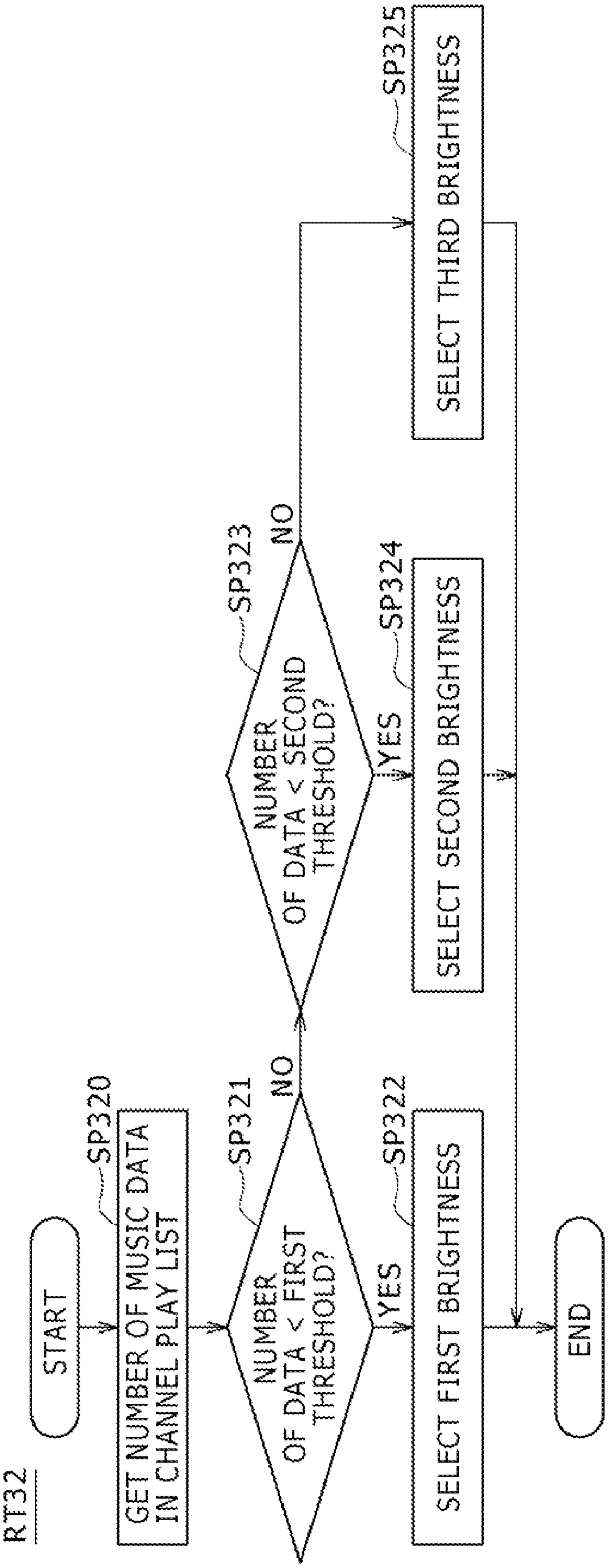
FIG. 48 is a flowchart indicative of a screen brightness selecting procedure practiced as a variation to the third embodiment of the invention.

The following describes a procedure of screen brightness selection (thereafter referred to also as screen brightness selection processing). It should be noted that, for the convenience of description, the following uses an example in which the brightness of the selection screen 120 is selected. Now, selecting a channel play list PL through the selection of a channel at the starting of the MusicStation function or in accordance with a channel switching operation done by the user at the starting of the MusicStation function, the control block 112 of the music reproducing apparatus 310 starts a screen brightness selecting procedure RT32, upon which the procedure goes to step SP320, as shown in FIG. 48.

In step SP320, the control block 112 gets the number of music data Ad currently registered in the channel play list PL in selection through the play list feature extraction block 112A, upon which the procedure goes to step SP321. The play list feature extraction block 112A obtains the number of the currently registered music data Ad by getting the number of pieces of music data information Ai in the channel play list PL.

In step SP321, the control block 112 determines whether the obtained number of music data Ad is below the first threshold (5 for example). If the determination is in the affirmative in step SP321, then the procedure goes to step SP322.

In step SP322, the control block 112 selects, through the display pattern selection block 112B, a first brightness that is lowest as the brightness of the selection screen 120 on which the list information Li of the channel play list PL in selection is displayed, upon which the screen brightness selecting procedure RT32 ends.

On the other hand, if the determination is in the negative in step sP321, then the procedure goes to step SP323. In step SP323, the control block 112 determines whether the obtained number of music data Ad is equal to or below the second threshold (10 for example). If the determination is in the affirmative in step SP323, then the procedure in the play list feature extraction block 112A goes to step SP324.

In step SP324, the control block 112 selects, through the display pattern selection block 112B, the second brightness that is brighter than the first brightness as the brightness of the selection screen 120 on which the list information Li of the channel play list PL in selection is displayed, upon which the screen brightness selecting procedure RT32 ends.

On the other hand, if the determination is in the negative in step SP323, then the procedure goes to step SP325. In step SP325, the control block 112 selects, through the display pattern selection block 112B, the third brightness that is brighter than the second brightness as the brightness of the selection screen 120 on which the list information Li of the channel play list PL in selection is displayed, upon which the screen brightness selecting procedure RT32 ends.

Then, the display control block 112C of the control block 112 displays the selection screen 120 and the reproducing screen 130 onto the display block 113 in accordance with the brightness selected by the display pattern selection block 112B.

Thus, the music reproducing apparatus 310 provides a new way of enjoying music, such as viewing channel play lists PL in different levels brightness in accordance with the number of registered music data Ad. It is also practicable to uses different colors, color shades, or transparencies in addition to color saturations and different levels of brightness.

Also, in addition to the selection of a display pattern for the entire selection screen 120 or the reproducing screen 130, it is practicable to select a display pattern for only a part of these screens. For example, a display pattern may be selected for the music selection area 12 of the selection screen 120 or the selected music display area 22 of the reproducing screen 130 or a display pattern (font, font size, or font color) for the text information to be written to the selection screen 120 or the reproducing screen 130.

Figure 49A:
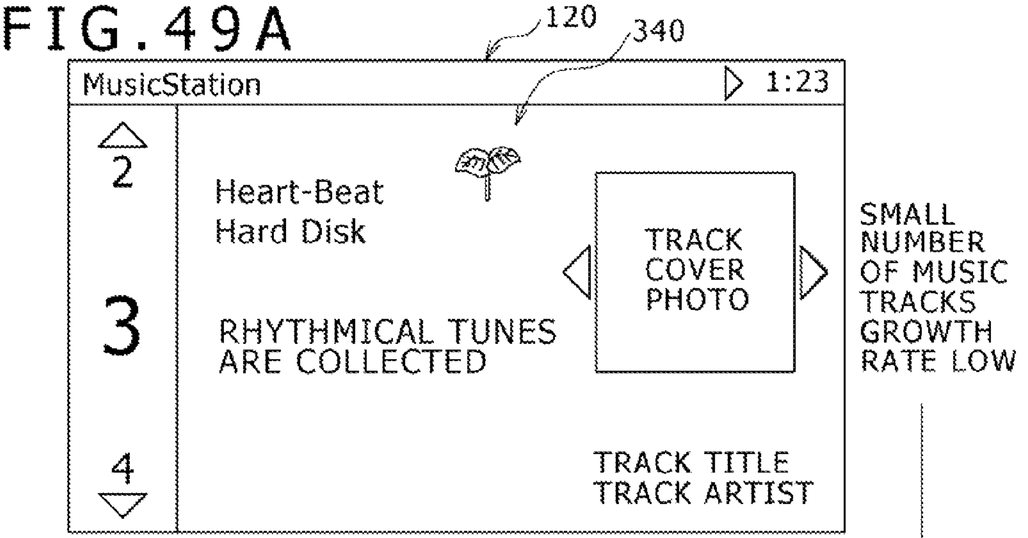
FIGS. 49A to 49C are diagrams illustrating a display pattern of the selection screen practiced as other variations to the third embodiment of the invention.
Figure 49B:
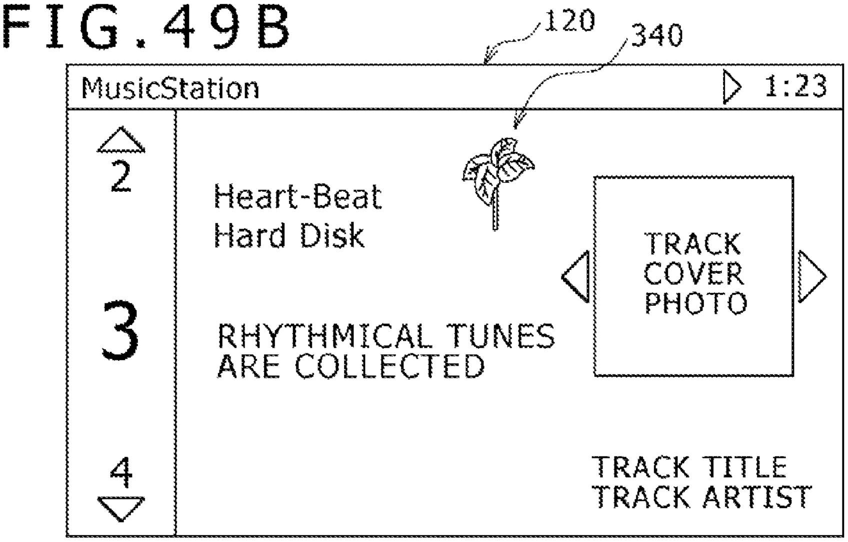
Figure 49C:
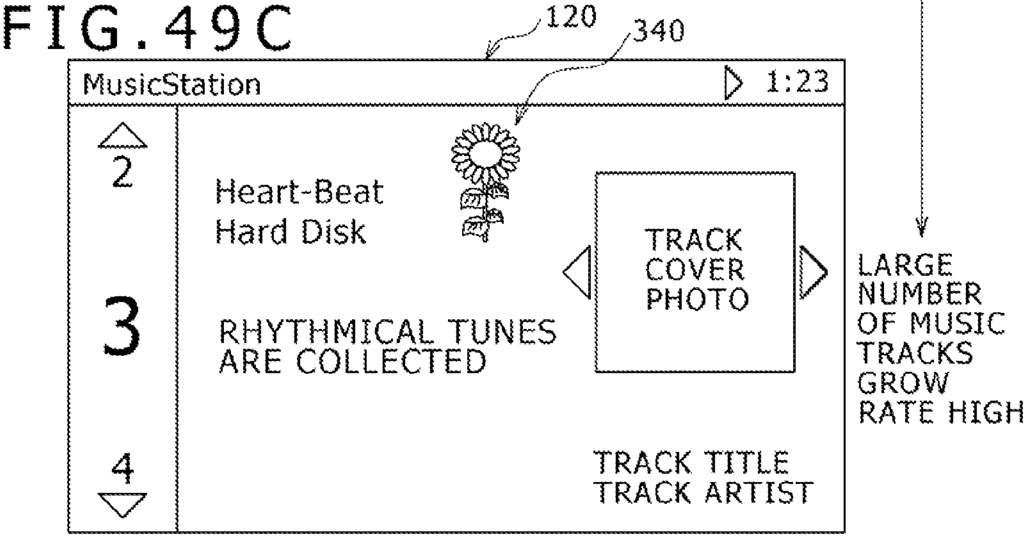

Further, as shown in FIGS. 49A, 49B, and 49C, a character icon 340 that is unique to each channel play list PL may be displayed on the selection screen 120 to select a display pattern of this character icon 340. In this case, the music reproducing apparatus 310 may display the character icon 340 that acts like a creature, for example, and change display patterns of this character icon 340 such that the icon grows up as the number of music data Ad registered in the channel play list increases. Consequently, the music reproducing apparatus 310 provides a new way of enjoying music, such as letting, as it were, each channel play list PL grow up by the addition of music data Ad.

Still further, in the third embodiment, the number of pieces of music data information Ai in each channel play list PL is confirmed not by the registered data count Tn of each channel play list PL but by the music data information Ai in each channel play list PL. However, the present invention is not limited to this. It is also practicable to update the registered data count Tn not at the end of the MusicStation function but at the registration of music data Ad into each channel play list PL, thereby getting this registered data count Tn as the number of music data Ad registered in each channel play list PL.

Yet further, in the third embodiment, a display pattern is selected by extracting a feature of each channel play list PL on the basis of the number of registered music data Ad that is a statistical value of music data Ad registered in the channel play list PL. However, the present invention is not limited to this. It is also practicable to select a display pattern by extracting a feature of each channel play list PL on the basis of one of a date on which first music data Ad was registered in channel play list PL, a date on which last music data Ad was registered, reproduction frequency of music data Ad registered in channel play list PL, and the importance of music data Ad registered in channel play list PL, for example.

To be more specific, the music reproducing apparatus 310 adds the date on which the first music data Ad was registered in a channel play list PL, for example to the list information Li for each channel play list, thereby selecting a display pattern by this date. This configuration allows the music reproducing apparatus 310 to let the user recognize in display pattern how a particular channel play is new by highlighting newer channel play lists in more striking colors.

In addition, additionally writes the date on which music data Ad was last registered in each channel play list PL to list information Li for each channel play list PL, for example, thereby selecting a display pattern by this date. This configuration allows the music reproducing apparatus 310 to let the user recognize in display pattern the oldness of channel play lists PL by displaying older channel play lists PL in darker tones.

Further, the music reproducing apparatus 310 additionally writes a statistical value (for example, a total or average value of reproduction count) of the reproduction frequency of music data Ad registered in each channel play list PL to the list information Li for each channel play list, for example, thereby selecting a display pattern by this reproduction frequency. This allows the music reproducing apparatus 310 to let the user recognize in display pattern the preference of channel play lists PL by displaying channel play lists heard more often in brighter tones. In this case, the statistical value of reproduction count is written to the list information Li; however, it is also practicable to get the reproduction count of each music data Ad from attribute information Ti to compute this statistical value every time the reproduction count is obtained.

Still further, the music reproducing apparatus 310 additionally writes a statistical value (for example, a total or average of values indicative of the importance) of the importance of music data Ad registered in each channel play list PL, for example, to list information Li for each channel play list PL, thereby selecting a display pattern by this importance. This allows the music reproducing apparatus 310 to let the user recognize in display pattern the importance of each channel play list PL by displaying channel play lists PL of higher importance in more striking colors, for example. In this case, the statistical value of importance is written to list information Li; however, it is also practicable to get the importance of each music data Ad from attribute information Ti to compute this statistical value every time the importance is obtained. Alternatively, this importance may be preset to music data Ad or preset by the user.

It is also practicable to select a display pattern by extracting a feature of each channel play list on the basis of a genre or s music track impression value included in attribute information Ti that is additional information of the music data Ad registered in each channel play list PL.

To be more specific, the music reproducing apparatus 310 displays, in lighter colors, those channel play lists PL composed by music data Ad of more cheerful genre (for example, popular music), for example. This allows the music reproducing apparatus 310 to let the user recognize in display pattern, the genre of music data Ad registered in each channel play list PL.

In addition, the music reproducing apparatus 310 computes a statistical value (a total value or an average value) of impression values of music tracks of music data Ad registered in each channel play list, for example, thereby displaying, in lighter colors, those channel play lists PL in which values indicative of the cheerfulness of the statistical value are higher. This allows the music reproducing apparatus 310 to let the user recognize in display pattern the impression of music data Ad registered in each channel play list PL.

Further, it is practicable to select a display pattern on the basis of the degree of adaptation between a keyword (for example, cheerful) indicative of the feature of each channel play list PL that is the attribute information thereof and the feature of music data Ad actually registered in that channel play list PL (for example, a music track impression value).

Actually, music reproducing apparatus 310 registers the music data Ad with a value indicative of the cheerfulness of music track impression value being no less than a predetermined level into a channel play list (cheerful music list) PL written with "cheerful" as keyword. However, it is not limited to this. It is also practicable to register, in this cheerful music list PL, the music data Ad with the value indicative of the cheerfulness of music track impression value ranked in a top 10 chart, among the music data Ad stored in the content storage block 115, for example.

If the number of music data Ad stored in the content storage block 115 is small, the above-mentioned configuration does not always register the music data Ad of cheerful music into a cheerful music list PL. Therefore, an average of values indicative of cheerfulness of the impression values of music tracks of the music data Ad registered in the cheerful music list PL is computed. As the average value goes high, the cheerful music list PL is shown in lighter colors. Thus, the music reproducing apparatus 310 can let the user recognize in display pattern the degree of adaptation between the feature of a channel play list PL and the feature of the music data Ad actually registered in this channel play list.

Further, in the third embodiment, the screen color saturation selecting procedure RT31 uses one of the three display patterns, the first color saturation, the second color saturation, and the third color saturation, in accordance with the number of music data Ad registered in each channel play list PL. However, the present invention is not limited to this. It is also practicable to use two or four patterns as required; for example, the color saturation may be varied in a linear manner in accordance with the number of registered music data Ad by relating the number of music data Ad registered in each channel play list PL with color saturation values.

Still further, in the third embodiment, the channel addition notification dialog 320 is closed by operating the close button 322. However, the present invention is not limited to this. It is also practicable to automatically close the channel addition notification dialog 320 a predetermined period of time after the displaying of the channel addition notification dialog 320, for example.

(5) Fourth Embodiment (5-1) Outline of the Fourth Embodiment:

The following describes an outline of the fourth embodiment of the invention, followed by specific examples thereof.

Figure 50:
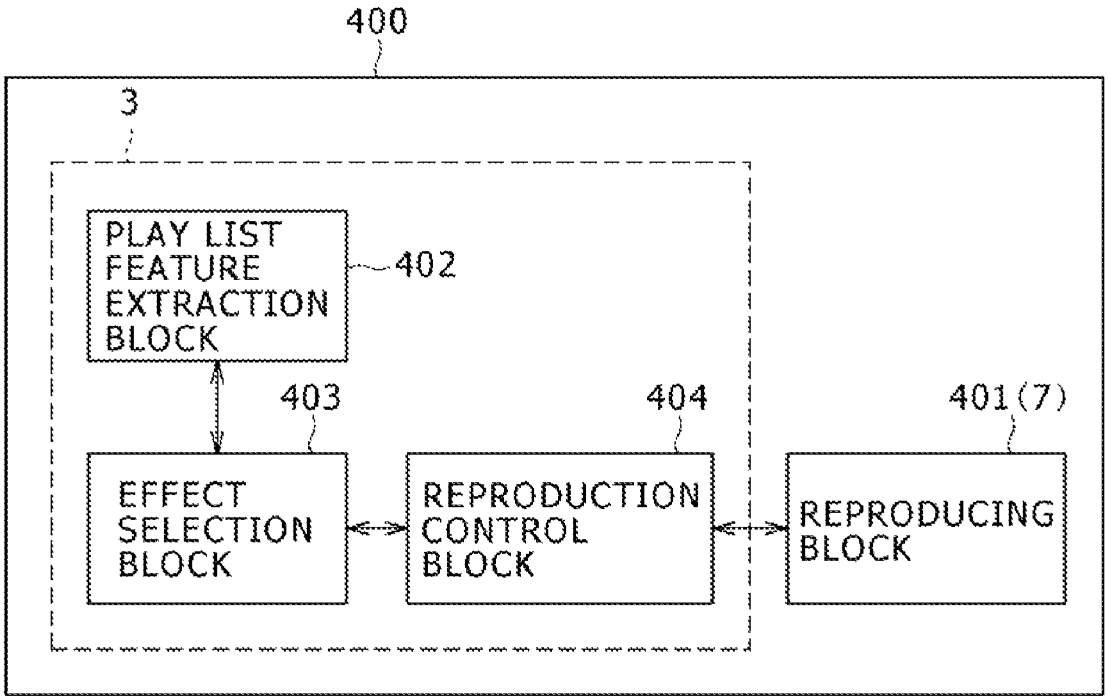
FIG. 50 is a block diagram illustrating an outline of a content reproducing apparatus practiced as a fourth embodiment of the invention.

A content reproducing apparatus 400 shown in FIG. 50 reproduces content on the basis of a play list specifying a sequence of reproducing a plurality of pieces of content. The content reproducing apparatus 400 has a reproducing block 401 for reproducing content, a play list feature extraction block 402 for extracting a feature of each play list on the basis of a plurality pieces of content belonging to that play list, an effect selection block 403 for selecting an effect associated with the reproduction of the content belonging to a play list extracted by the play list feature extracting block 402 in accordance with a feature thereof, and a reproduction control block 404 for controlling the reproducing block 401 such that the content belonging to the play list in accordance with an effect selected by the effect selecting block 403.

It should be noted that the reproducing block 401 corresponds to the content reproducing apparatus 1 (FIG. 1) providing the basic configuration described before and the play list feature extraction block 402, the effect selection block 403 and the reproduction control block 404 correspond to the control block 3.

Configured as described above, the content reproducing apparatus 400 according to the fourth embodiment can reproduce the content belonging to each play list with an effect suitable for the feature of each play list, thereby providing new ways of enjoying content.

Figure 51:
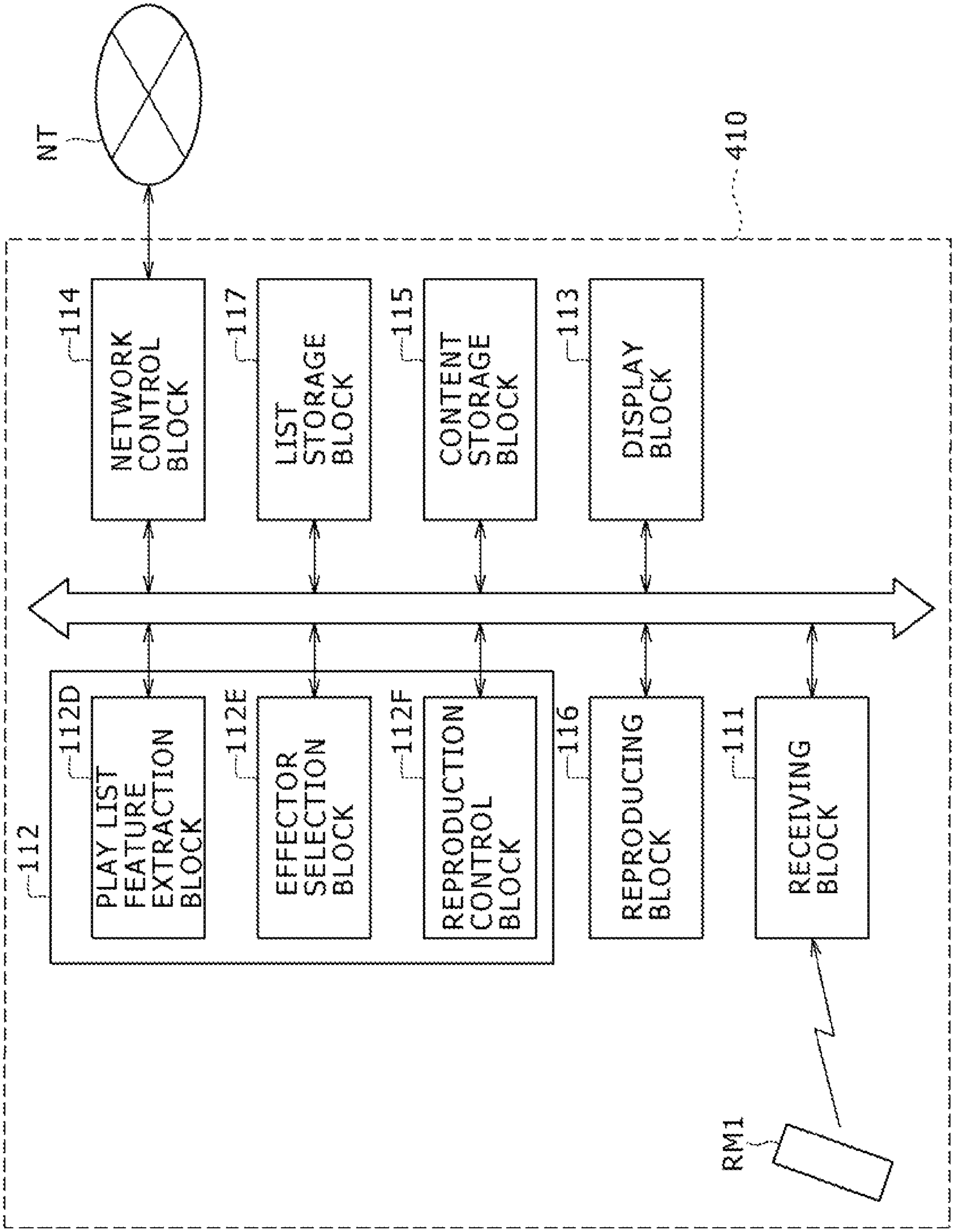
FIG. 51 is a block diagram illustrating a music reproducing apparatus practiced as the fourth embodiment of the invention.

(5-2) Specific Examples of the Fourth Embodiment:

The following describes specific examples of the fourth embodiments. A music reproducing apparatus 410 shown in FIG. 51 is a specific example of the content reproducing apparatus 400 described above and, as denoted by the same reference numerals to substantially the same components as those shown in FIG. 13, has a configuration that is different from the music reproducing apparatus 110 of the first embodiment in the lack of the clock block 118.

The music reproducing apparatus 410 has, inside the control block 112, a play list feature extraction block 112D for extracting the feature of each channel play list PL, an effect selection block 112E for selecting an effect with which the music data Ad registered in each channel play list PL is reproduced on the basis of the feature of the extracted channel play list PL, and a reproduction control block 112F for controlling the reproducing block 116 such that music data Ad is reproduced in accordance with the selected effect.

In addition, the music reproducing apparatus 410 has a remote controller RM1 substantially similar to that of the first embodiment.

It should be noted that the play list feature extraction block 112D, the effect selection block 112E, and the reproduction control block 112F of the music reproducing apparatus 410 correspond to the play list feature extraction block 402, the effect selection block 403, and the reproduction control block 404, respectively, of the content reproducing apparatus 400 described above.

Like the music reproducing apparatus 110 of the first embodiment described above, the music reproducing apparatus 410 provides a download function, a CD recording function, a normal reproducing function, a CD reproducing function, and the MusicStation function. The control block 112 executes the processing of these functions as instructed by the user through the remote controller RM1.

The following describes the MusicStation function provided by the music reproducing apparatus 410. First, a method of managing music data in this MusicStation function will be described. This management method is substantially the same as that by the music reproducing apparatus 110 of the first embodiment, details thereof being understood with reference to the description of the first embodiment of the invention.

To be more specific, the music reproducing apparatus 410 of the fourth embodiment is configured to manage a plurality of channel play lists PL by a channel list CL and a sequence of reproducing music data Ad by each of these channel play lists PL as shown in FIG. 2.

As with the above-mentioned first embodiment, this MusicStation function has, beforehand, channel play lists PL for categories considered to be required by the user, such as newly added music, infrequently reproduced music, rhythmical music, cheerful music, classical music, and heavy metal music, for example. In accordance with the storage or reproduction of music data Ad, the control block 112 of the music reproducing apparatus 410 automatically update channel play lists PL by registering the music data Ad stored in the content storage block 115 into corresponding channel play lists PL of the prepared channel play lists PL on the basis of the reproduction count, music impression value, and genre of the music data Ad.

Then, the music reproducing apparatus 410 allows the user to select, through the remote controller RM1 and on a GUI screen, desired channel play lists PL classified as newly added music, infrequently reproduced music, rhythmical music, cheerful music, classical music, and heavy metal music, for example, as channels, thereby allowing the user to easily find desired music in a feeling in which the user switches between radio channels.

Further, the GUI screen in the MusicStation function is substantially the same in configuration as the GUI screen of the music reproducing apparatus 110 of the first embodiment. Therefore, details of this GUI screen can be understood by referencing the description of the GUI screen of the first embodiment.

To be more specific, while letting the user visually recognize the contents of channel and music track through the selection screen 120 shown in FIG. 15, the music reproducing apparatus 410 of the fourth embodiment switches between channels and selects a specified channel in response to a user operation done through the up button B13 or the down button B14 of the remote controller RM1 and switches between music tracks and selects a specified music track in response to a user operation done through the left button B15 or the right button B16 of the remote controller RM1.

The music reproducing apparatus 410 is also configured to switch the selection screen 120 to the reproducing screen 130 under a predetermined condition (pressing of the enter button B17 or passing of a predetermined period of time without operation by the user) and let the user visually check the contents of the selected channel and music.

Further, the reproduction of music data Ad accompanying the switching of GUI screens is controlled in substantially the same manner as the reproduction control by the music reproducing apparatus 110 of the first embodiment. Therefore details of the reproduction control of the third embodiment can be understood with reference to the description of the first embodiment.

Namely, the music reproducing apparatus 410 according to the fourth embodiment gets in the partial reproducing mode in which the selected music data Ad is reproduced from a feature position thereof when the selection screen 120 is displayed and gets in the normal reproducing mode in which the selected music data is normally reproduced when the reproducing screen 130 is displayed. In each mode, music data Ad is reproduced without discontinuation while the MusicStation function is being executed.

Consequently, during the execution of the MusicStation function, as with the music reproducing apparatus 110 of the first embodiment, the music reproducing apparatus 410 of the fourth embodiment can switch between channel play lists PL on a channel basis as if switching between radio preset stations in accordance with an operation done through the up button B13 or the down button B14 of the remote controller RM1 and switch between music tracks within a channel in accordance with an operation done through the left button B15 and the right button B16, thereby letting the user hear desired music more easily as if hearing the music broadcast from radio stations.

In addition, a MusicStation function startup procedure, a channel switching procedure, and a music track switching procedure are substantially the same as those executed by the music reproducing apparatus 110 of the first embodiment. Therefore, details of these procedures can be understood with reference to the description of the first embodiment.

Further, the channel display setting method in the MusicStation function is substantially the same as the display setting method executed by the music reproducing apparatus 110 of the first embodiment. Therefore, details of the channel display setting method can be understood with reference to the description of the first embodiment.

Namely, the music reproducing apparatus 410 according to the fourth embodiment is configured to change the channel display setting to "display" or "no-display" on a channel basis through the channel display setting screen 140 shown in FIG. 22.

As described so far, as with the first embodiment, the music reproducing apparatus 410 of the fourth embodiment has the MusicStation function corresponding to the operation of the remote controller RM1 and can easily execute the startup of the MusicStation function, channel switching, music track switching, and channel display setting through the remote controller RM1.

It should be noted that, in the MusicStation function according to the fourth embodiment, in accordance with the feature (for example, the number of registered music data Ad) of a channel play list PL, the equalizing setting at the time of the selection of a channel allocated with that channel play list PL is changed in the reproducing block 116.

To be more specific, in accordance with the number of the music data Ad registered in a channel play list PL obtained by the play list feature extraction block 112D of the control block 112, the music reproducing apparatus 410 changes, through the effect selection block 112E, the equalizing setting in the reproducing block 116 at the time when the channel allocated with that channel play list PL is selected (namely, the music data Ad registered in that channel play list PL is reproduced).

Figure 52A:
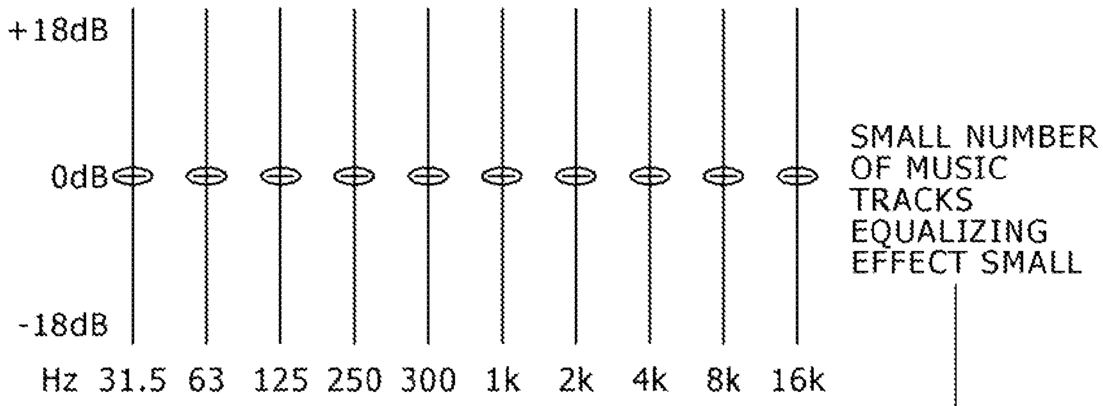
FIGS. 52A to 52C are diagrams illustrating equalizing setting examples practiced as the fourth embodiment of the invention.
Figure 52B:
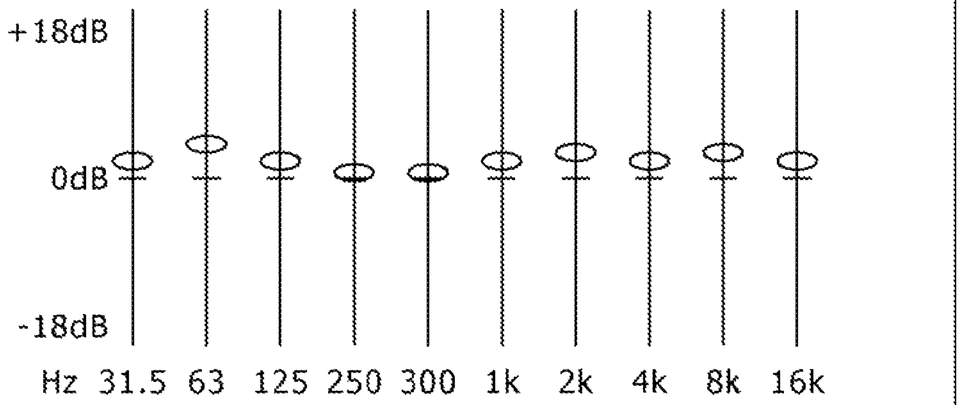

In this case, if the number of music data Ad registered in a channel play list PL obtained by the play list feature extraction block 112D is no more than 5, for example, the effect selection block 112E selects a first equalizing setting as an equalizing setting for reproducing the music data Ad registered in that channel play list PL, by use of a signal level in each frequency band (for example, 31 Hz, 62 Hz, 125 Hz, 250 Hz, 300 Hz, 1 KHz, 2 KHz, 4 KHz, 8 KHz, 16 KHz) as a reference level (0 dB) as shown in FIG. 52A; if the number is equal to 6 or higher and equal to or lower than 10, the effect selection block 112E selects a second equalizing setting raised in low and high frequency signal level over the first equalizing setting as shown in FIG. 52B; and if the number is equal to or higher than 11, the play list feature extraction block 112D selects a third equalizing setting raised in low and high frequency signal level over the second equalizing setting.

Namely, the effect selection block 112E changes equalizing setting such that, as the number of music data Ad registered in each channel play list increases, a higher equalizing effect is provided at the time when the music data Ad registered in that channel play list PL is reproduced.

Then, the reproduction control block 112F of the control block 112 makes the reproducing block 116 reproduce the music data Ad with the equalizing setting automatically selected by the effect selection block 112E.

Thus, in addition to the provision of the new way of hearing added music data, the music reproducing apparatus 410 can provide the user a still new way of enjoying hearing music by reproducing added music data with different equalizing settings, thereby eventually prompting the user to add more music data Ad.

Figure 53:
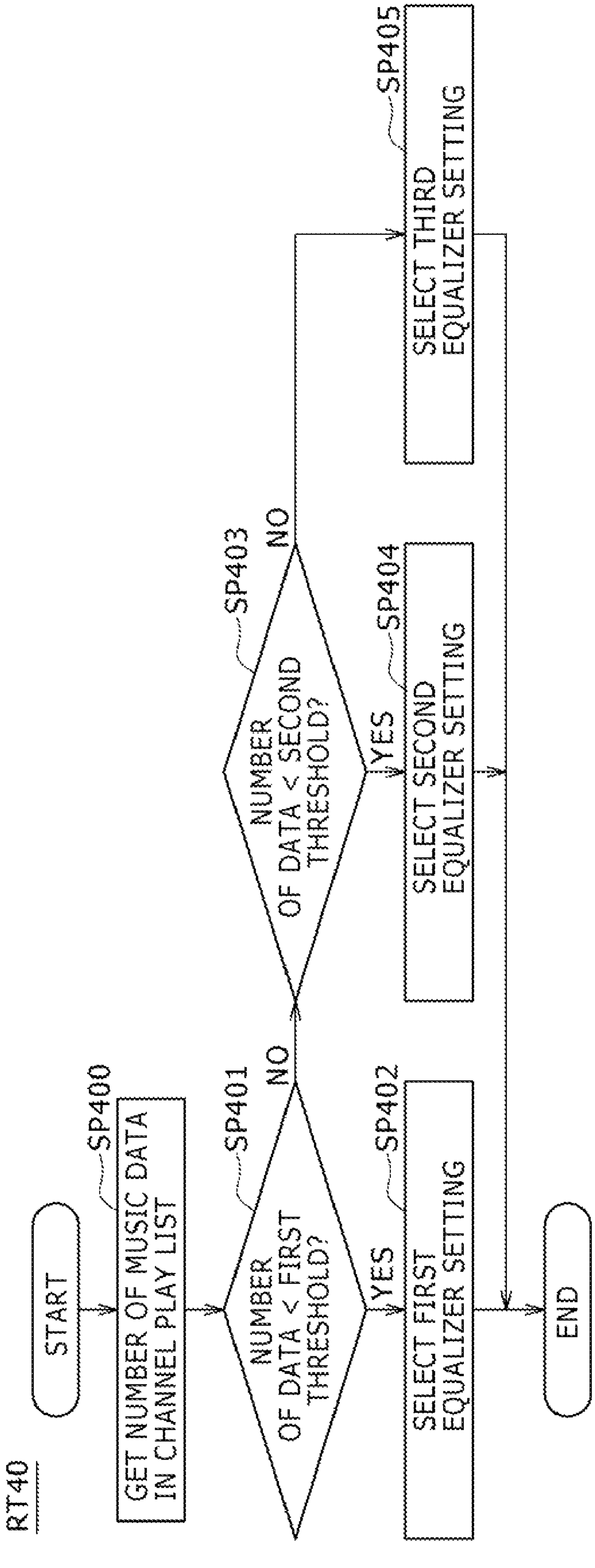
FIG. 53 is a flowchart indicative of an equalizing setting change procedure practiced as the fourth embodiment of the invention.

The following describes a procedure of changing the above-mentioned equalizing setting (hereafter referred to also as equalizing setting change processing). Selecting a channel play list PL through the selection of a channel at the start of the MusicStation function or a channel play list PL through the selection of a channel in accordance with a channel switching operation during the start of the MusicStation function, the control block 112 of the music reproducing apparatus 410 starts an equalizing setting change procedure RT40 as shown in FIG. 53, upon which the procedure goes to step SP400.

In step SP400, the control block 112 obtains, through the play list feature extraction block 112D, the number of music data Ad currently registered in the channel play list PL in selection, upon which the procedure goes to step SP401. The play list feature extraction block 112D obtains the number of currently registered music data Ad by obtaining the music data information Ai in the channel play list PL.

In step SP401, the control block 112 determines whether the obtained number of music data Ad is equal to or lower than a first threshold (for example, 5). If the determination is in the affirmative in step SP401, it indicates that the number of music data Ad registered in the channel play list PL in selection is equal to or lower than 5, upon which the procedure goes to step SP402.

In step SP402, the control block 112 selects, through the effect selection block 112E, a first equalizing setting that is lowest in equalizing effect as shown in FIG. 52A as an equalizing setting in the reproducing block 116, thereby ending this equalizing setting change procedure RT40.

On the other hand, if the determination is in the negative in step SP401, it indicates that the number of music data Ad registered in the channel play list PL in selection is equal to or higher than 6, upon which the procedure goes to step SP403.

In step SP403, the control block 112 determines whether the obtained number of music data Ad is equal to or lower than a second threshold (for example, 10). If the determination is in the affirmative in step SP403, it indicates that the number of music data Ad registered in the channel play list PL in selection is equal to or higher than 6 and lower than 10, upon which the procedure goes to step SP404.

In step SP404, the control block 112 sets, through the effect selection block 112E, a second equalizing setting that is higher in equalizing effect than the first equalizing setting as shown in FIG. 52B as an equalizing setting in the reproducing block 116, upon which the equalizing setting change procedure RT40 ends.

On the other hand, if the determination in step SP403 is in the negative, it indicates that the number of music data Ad registered in the channel play list PL in selection is equal to or higher than 11, upon which the procedure goes to step P405.

Figure 52C:
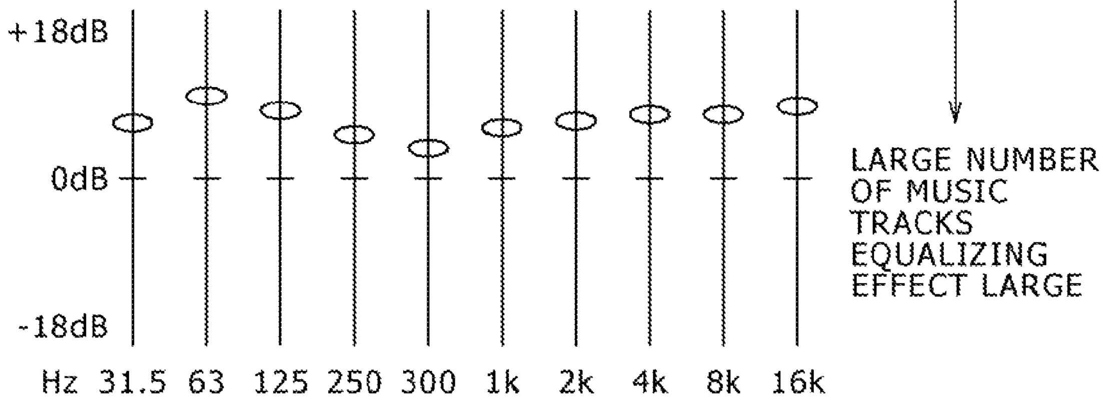

In step SP405, the control block 112 selects, through the effect selection block 112E, a third equalizing setting that is higher in equalizing effect than the second equalizing setting as shown in FIG. 52C as the equalizing setting in the reproducing block 116, upon which the equalizing setting change procedure RT40 ends.

By this equalizing setting change procedure RT40, the control block 112 of the music reproducing apparatus 410 changes equalizing settings for the reproduction of the music data Ad registered in the channel play list PL in selection.

It should be noted that, for the convenience of description, this equalizing setting change procedure RT40 has been described separately in the MusicStation function startup procedure RT10 and the channel switching procedure RT11; actually, however, the equalizing setting is executed within the MusicStation function startup procedure RT10 and the channel switching procedure RT11. Namely, this equalizing setting change procedure RT40 is executed in step SP108 of the MusicStation function startup procedure R10 and step SP118 of the channel switching procedure R11, for example.

Consequently, the music data Ad to be reproduced in step SP108 of the MusicStation function startup procedure RT10 and step SP118 of the channel switching procedure RT11 is reproduced, through the reproduction control block 112F, with the equalizing setting changed by the effect selection block 112E.

(5-3) Operations and Effects of the Fourth Embodiment:

In the above-described novel configuration, the music reproducing apparatus 410 manages a plurality of music data Ad stored in the content storage block 115 by a plurality of channel play lists PL in which music data information Ai is listed, this music data information Ai being the content identification information for music data Ad and stored in the list storage block 117.

As instructed by the user through the remote controller RM1, the control block 112 of the music reproducing apparatus 410 selects one of the plurality of channel play lists PL and then reproduces, through the reproducing block 116, the music data Ad registered in the selected channel play list PL.

The control block 112 of the music reproducing apparatus 410 extracts, through the play list feature extraction block 112D, a feature (or the number of registered music data Ad) of each channel play list and, in accordance with the extracted feature, selects, through the effect selection block 112E, an effect (namely, an effect for changing equalizing setting) in the reproducing block 116.

To be more specific, if the number of music data Ad registered in a channel play list PL is equal to or lower than the first threshold (for example, 5), the effect selection block 112E selects the first equalizing setting as an equalizing setting for reproducing the music data Ad registered in this channel play list PL; if the number is higher than the first threshold value and equal to or lower than the second threshold value (for example, 10), the effect selection block 112E selects the second equalizing setting; and, if the number is higher than the second threshold value, the effect selection block 112E selects the third equalizing setting.

Namely, the music reproducing apparatus 410 reproduces music data Ad with equalizing settings that differ with number of music data Ad registered in each channel play list PL, thereby providing the user a novel way of enjoying hearing music to be reproduced with different equalizing settings depending on the number of registered music data Ad.

In addition, an effect with which to reproduce music data registered in each channel play list PL is selected in accordance with the number of music data registered in each channel play list PL, the music reproducing apparatus 410 can let the user recognize the provision of a new way of enjoying hearing music by adding music data Ad, thereby eventually prompting the user to add more music data.

The above-mentioned configuration allows the music reproducing apparatus 410 to reproduce music data Ad belonging to each channel play list PL with an effect suitable for that channel play list PL, thereby providing a new way of hearing music associated with music data Ad.

(5-4) Variations to the Fourth Embodiment:

In the above-mentioned fourth embodiment, equalizing settings are changed as an effect to be selected in accordance with the feature of a selected channel play list PL; however, the present invention is not limited to this. It is also practicable to change music track sequence setting Ls in each channel play list PL.

Figure 54:
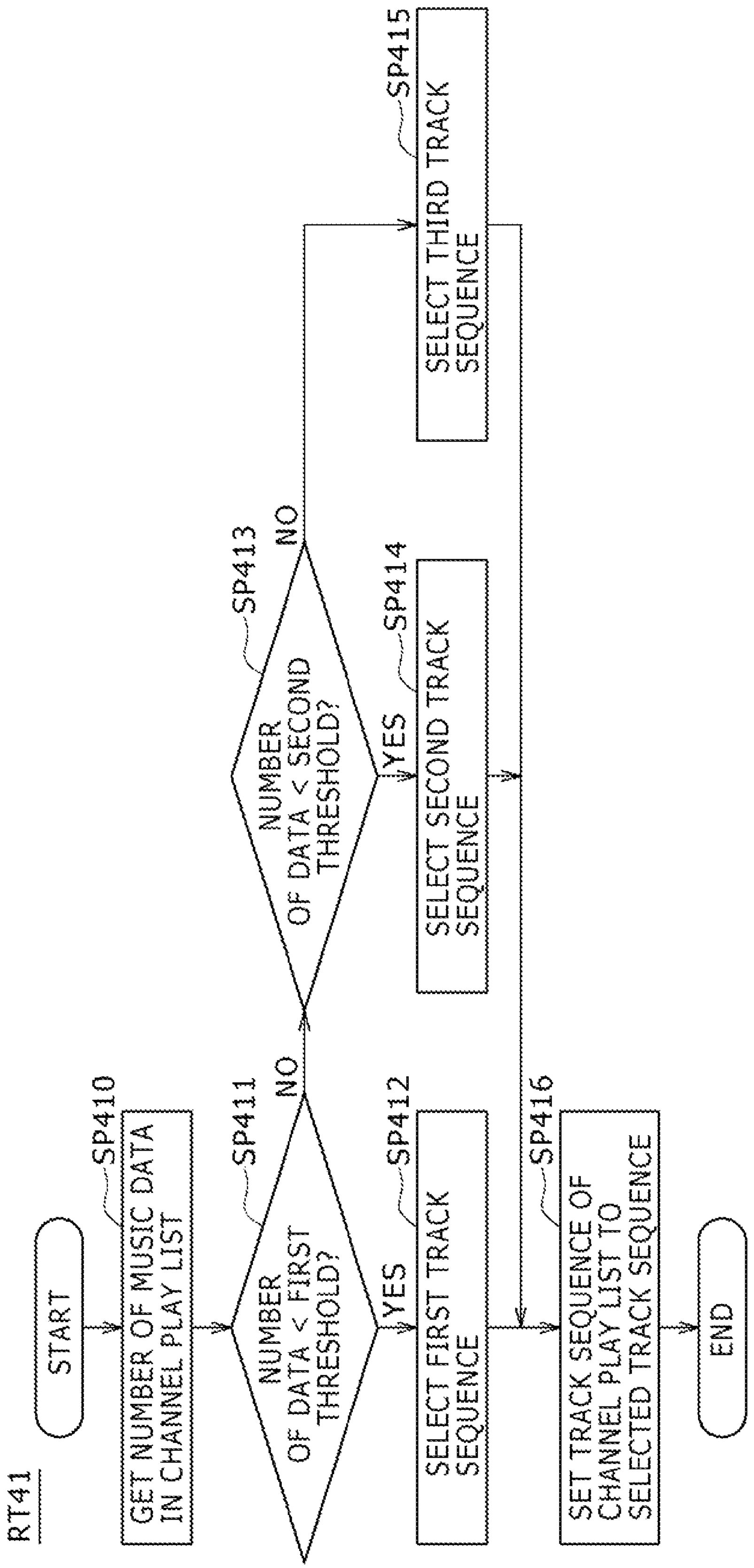
FIG. 54 is a flowchart indicative of a music track change procedure practiced as a variation to the fourth embodiment of the invention.

The following describes a procedure of the processing of changing music track sequence (hereafter referred to also as music track sequence change processing). Selecting a channel play list PL through the selection of a channel at the time of starting the MusicStation function or selecting a channel play list PL through the selection of a channel in accordance with a channel switching operation during the start of the MusicStation function, the control block 112 of the music reproducing apparatus 410 starts a music track sequence changing procedure RT41, upon which the procedure goes to step SP410 as shown in FIG. 54.

In step SP410, the control block 112 obtains, through the play list feature extraction block 112D, the number of music data Ad currently registered in the channel play list PL in selection, upon which the procedure goes to step SP411. The play list feature extraction block 112D gets the number of currently registered music data Ad by getting number of pieces of music data information Ai in the channel play list PL.

In step SP 411, the control block 112 determines whether the obtained number of music data Ad is equal to or lower than the first threshold (for example, 5). If the determination is in the affirmative in step SP411, the procedure goes to step SP412.

In step SP412, the control block 112 selects, through the effect selection block 112E, a first music track sequence setting Ls that is a random sequence for example as a music track sequence setting Ls in the channel play list PL in selection, upon which the procedure goes to step SP416.

On the other hand, if the determination is in the negative in step SP411, then the procedure goes to step SP 413. In step SP413, the control block 112 determines whether the obtained number of music data Ad is equal to or lower than the second threshold (for example, 10). If the determination is in the affirmative in step SP413, then the procedure goes to step SP414. In step SP414, the control block 112 selects, through the effect selection block 112E, a second music track sequence setting Ls in which values indicative of cheerfulness of music impression value are in the ascending order, as a music track sequence setting Ls in the channel play list PL in selection, upon which the procedure goes to step SP416.

On the other hand, if the determination is in the negative in step SP413, then the procedure goes to step SP415. In step SP415, the control block 112 selects, through the effect selection block 112E, a third music track sequence setting Ls in which values indicative of tempo of music impression value are in the ascending order, as a music track sequence setting Ls in the channel play list PL in selection, upon which the procedure goes to step SP416.

In step SP416, the control block 112 reflects the music track sequence setting Ls selected by the effect selection block 112E onto the music track sequence setting Ls of the channel play list PL in selection, upon which the music track sequence changing procedure RT41 ends.

As a result, the reproduction control block 112F of the control block 112 reproduces the music data Ad in accordance with the music track sequence setting Ls of the channel play list PL in selection.

Thus, the music reproducing apparatus 410 can provide a novel way of enjoying hearing music by changing the sequence of reproducing music tracks in accordance with the number of music data Ad registered in each channel play list PL. Consequently, even if the same channel play list PL is selected, the music reproducing apparatus 410 can let the user hear music tracks based on music data Ad always in a fresh feeling.

Figure 55A:
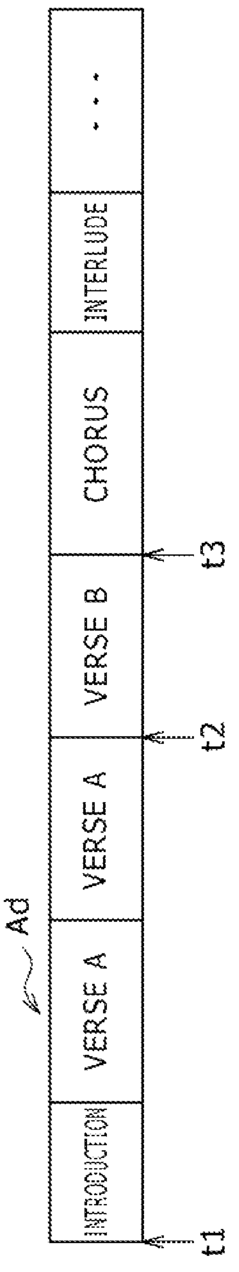
FIGS. 55A and 55B are a diagram and a flowchart, respectively, for indicating a reproduction start position changing procedure practiced as another variation to the fourth embodiment of the invention.

In addition, it is practicable to change the reproduction start position (namely, the reproduction pattern) of music data Ad as an effect. The following describes a procedure of changing the reproduction start position of music data Ad (hereafter referred to also as reproduction start position change processing). In this case, it is assumed that music data Ad be configured as an introduction, verse A, verse A, verse B, a chorus, an interlude, . . . as shown in FIG. 55A, for example.

Figure 55B:
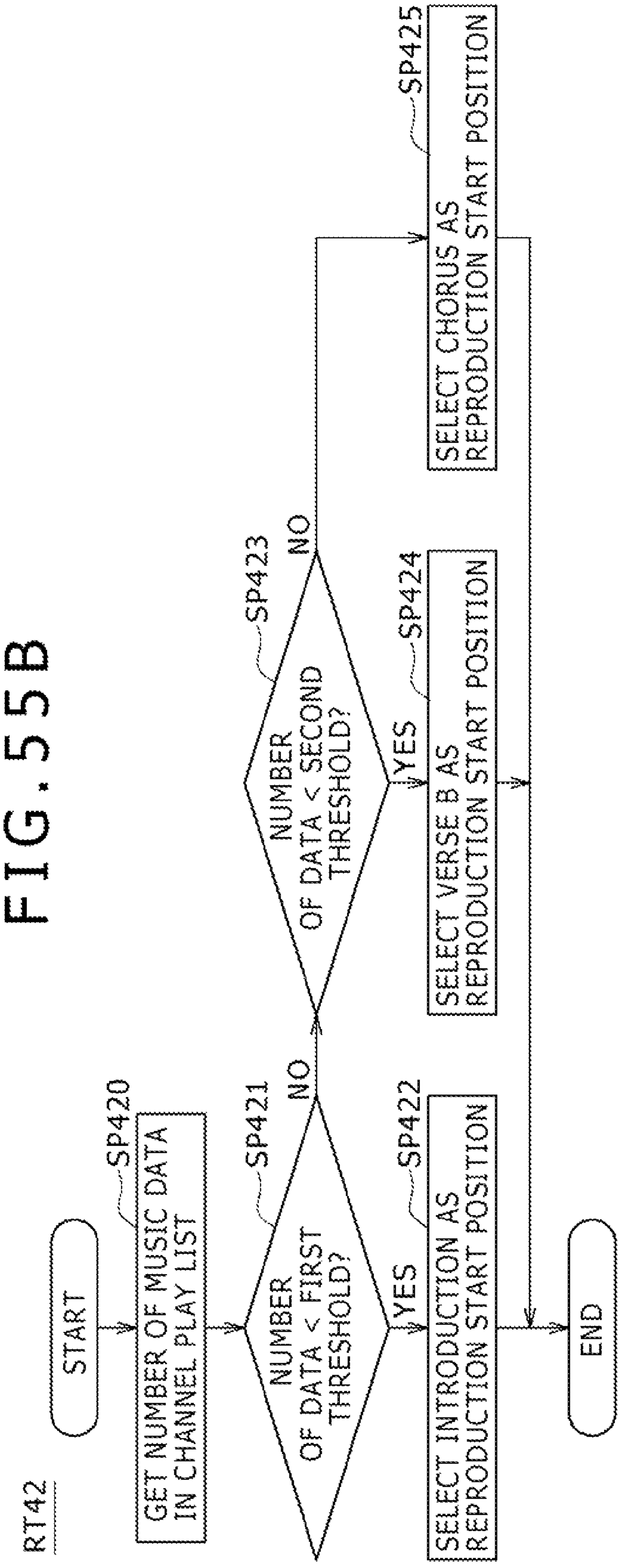

Selecting a channel play list PL through the selection of a channel at the time of starting the MusicStation function or selects a channel play list PL through the selection of a channel in accordance with a channel switching operation during the start of the MusicStation function, the control block 112 of the music reproducing apparatus 410 starts a reproduction start position changing procedure RT42 as shown in FIG. 55B, upon which the procedure goes to step SP420.

In step SP420, the control block 112 obtains, through the play list feature extraction block 112D, the number of music data Ad currently registered in the channel play list PL in selection, upon which the procedure goes to step SP421. The play list feature extraction block 112D obtains the number of currently registered music data Ad by obtaining the number of pieces of music data information Ai in the channel play list PL.

In step SP421, the control block 112 determines whether the obtained number of music data Ad is equal to or lower than a first threshold (for example, 5). If the determination is in the affirmative in step SP 421, then the procedure goes to step SP422.

In step SP422, the control block 112 selects, through the effect selection block 112E, a prelude start position (namely, the head of the music track) t1, for example, as a reproduction start position of the music data Ad registered in the channel play list PL in selection, upon which the reproduction start position changing procedure RT42 ends.

On the other hand, if the determination is in the negative in step SP421, then the procedure goes to step SP423. In step SP423, the control block 112 determines whether the obtained number of music data Ad is equal to or lower than a second threshold (for example, 10). If the determination is in the affirmative in step SP423, then the procedure goes to step SP424. In step SP424, the control block 112 selects, through the effect selection block 112E, a verse B start position t2, for example, as a reproduction start position of the music data Ad registered in the channel play list Ad, upon which the reproduction start position changing procedure RT42 ends.

On the other hand, if the determination is in the negative in step SP423, the procedure goes to step SP425. In step SP425, the control block 112 selects, through the effect selection block 112E, a chorus start position t3, for example, as a reproduction start position of the music data Ad registered in the channel play list PL in selection, upon which the reproduction start position changing procedure RT42 ends.

As a result, the reproduction control block 112F of the control block 112 reproduces the music data Ad from the reproduction start position selected by the effect selection block 112E.

Thus, the music reproducing apparatus 410 provides a novel way of enjoying hearing the music reproduced from reproduction start positions changed in accordance with the number of registered music data Ad. In the above-mentioned configuration, as the number of registered music data Ad increases, reproduction start positions are changed, from start position t1 of introduction to start position t2 of verse B to start position t3 of chorus, namely, to a position that it is easier for the user to recognize, thereby allowing the user to recognize that it becomes easier for the user to search for desired music as more music data Ad is added, which, in turn, prompts the user to add more music data.

It should be noted that start position t1 of introduction, start position t2 of verse B, start position t3 of chorus to be used as reproduction start positions are assumed to be stored in the content storage block 115 as feature positional information Ct1, Ct2, and Ct3 (FIG. 2) included in data management information Am of music data Ad. It is also practicable to use the start position of verse A and the start position of interlude, for example, in addition to above-mentioned start position t1 of introduction, start position t2 of verse, and start position t3 of chorus.

In addition to changing reproduction start positions as the reproduction pattern of music data Ad, it is practicable to prepare bridge reproduction, introduction reproduction, normal reproduction, and accompaniment reproduction, for example, to be randomly selected for a reproduction pattern.

For an effect, volume change, tone quality (bit rate or compression rate, for example) change, noise addition change, or tempo change may be selected in addition to the above-mentioned equalizing setting change, music track sequence setting change, and reproduction pattern change.

To be more specific, in the case of the change of bit rates, for example, bit rate change is executed such that, as the number of music data Ad registered in each channel play list PL increases, effect selection block 112E raises the tone quality in which the music data Ad is reproduced from FM radio quality to cassette tape quality to MD quality to CD quality, for example. This allows the music reproducing apparatus 410 to provides a new way of enjoying hearing the music this reproduced with different bit rates as music data Ad is added. In this case, as the number of music data Ad registered in each channel play list PL increases, the tone quality with which the music data Ad registered in each channel play list PL is reproduced is raised, the user is prompted to add more music data Ad, which at the same time provides a new way of enjoyment, such as developing user's own channel play lists PL.

Likewise, in the case of changing noise additional quantities, the effect selection block 112E may execute noise additional quantity change such that, as the number of music data Ad registered in each channel play list PL, the noise at the time of reproducing the music data Ad registered in each channel play list PL is reduced (in other words, the tone quality is raised).

Further, in the fourth embodiment, the number of music data Ad in each channel play list PL is obtained by checking not the registered data count Tn of channel play list PL but the number of pieces of music data information Ai in channel play list PL; however, the present invention is not limited to this. It is also practicable to get this registered data count Tn as the number of music data Ad registered in channel play list PL by updating the registered data count Tn at the time of not the end of the MusicStation function but the registration of music data Ad into channel play list PL.

Still further, in the fourth embodiment, an effect is selected by extracting a feature of each channel play list PL on the basis of the number of registered music data Ad that is a statistical value of music data Ad registered in each channel play list PL; however, the present invention is not limited to this. It is also practicable to select an effect by extracting a feature of each channel play list PL on the basis of one of a date on which the first music data Ad was registered in channel play list, a date on which music data Ad was registered last, a reproduction frequency of music data registered in channel play list PL, and the importance of music data Ad registered in channel play list PL, for example.

To be more specific, the music reproducing apparatus 410 may additionally write a date on which the first music data Ad was registered in channel play list PL, for example, to the list information Li for each channel play list, thereby selecting an effect in accordance with this date. This allows the music reproducing apparatus 410 to let the user recognize in effect how new a particular channel play list is by raising tone quality for channel play lists PL having more recent dates, for example.

Further, the music reproducing apparatus 410 additionally writes a date on which music data Ad was registered last into each channel play list PL, for example, to list information Li for each channel play list PL, thereby selecting an effect on the basis of this date. This configuration allows the music reproducing apparatus 410 to let the user recognize in effect how old channel play lists PL are by increasing noise for those channel play lists PL which have older dates.

Still further, the music reproducing apparatus 410 additionally writes the statistical value (a total or average of reproduction count, for example) of the reproduction frequency of the music data Ad registered in each channel play list PL, for example, to the list information Li for each channel play list PL, thereby selecting an effect on the basis of this reproduction frequency. This configuration allows the music reproducing apparatus 410 to let the user recognize in effect the preference of channel play lists PL by increasing an equalizing effect for those channel play lists PL which are heard more often. In this case, a statistical value of reproduction count is written to the list information Li; however, it is also practicable to obtain reproduction count for each music data Ad from the attribute information Ti to compute this statistical value.

Yet further, the music reproducing apparatus 410 additionally writes a statistical value (a total or average of values indicative of importance, for example) of the importance of the music data Ad registered in each channel play list PL to the list information Li for each channel play list PL, for example, thereby selecting an effect in accordance with this importance. This configuration allows the music reproducing apparatus 410 to let the user recognize in effect the importance of each channel play list PL by raising the sound volume for those channel play lists PL which have higher importance. In this case, the statistical value of importance is written to the list information Li; however, it is also practicable to get the importance for each music data Ad from the attribute information Ti to compute this statistical value. Also, this importance may be set to music data Ad in advance or may be set by the user.

In addition, it is also practicable to select an effect by extracting a feature of each channel play list PL on the basis of the impression value of genre and music included in attribute information Ti that is additional information of the music data Ad registered in each channel play list PL, for example.

To be more specific, when reproducing the music data Ad of each channel play list PL made up of the music data Ad of which genre is rock music, for example, the music reproducing apparatus 410 selects the equalizing setting suitable for rock music. This configuration allows the music reproducing apparatus 410 to let the user hear music tracks with an effect suitable for the genre of the music data Ad registered in each channel play list PL.

Further, the music reproducing apparatus 410 computes a statistical value (a total or average value) of impression values of the music data Ad registered in each channel play list PL to select the equalizing setting suitable for this statistical value. This configuration allows the music reproducing apparatus 410 to let the user recognize in effect the impression of the music data Ad registered in each channel play list PL.

Still further, it is also practicable to select an effect on the basis of the degree of adaptation between a keyword (cheerful, for example) indicative of a feature of each channel play list PL that is attribute information thereof and a feature (impression value of music, for example) of the music data Ad actually registered in that channel play list PL.

Actually, music reproducing apparatus 410 registers the music data Ad with a value indicative of the cheerfulness of music track impression value being higher than a predetermined level into a channel play list (cheerful music list) PL written with “cheerful” as keyword. However, it is also practicable to register, in this cheerful music list PL, the music data Ad with the value indicative of the cheerfulness of music track impression value ranked in a top 10 chart, among the music data Ad stored in the content storage block 115, for example.

If the number of music data Ad stored in the content storage block 115 is small, the above-mentioned configuration does not always register the music data Ad of cheerful music into a cheerful music list PL. Therefore, an average of values indicative of cheerfulness of the impression values of music tracks of the music data Ad registered in the cheerful music list PL is computed. As the average value goes high, the tone quality for reproducing the music data Ad of the cheerful music list PL is raised. Thus, the music reproducing apparatus 410 can let the user recognize in effect the degree of adaptation between the feature of a channel play list PL and the feature of the music data Ad actually registered in this channel play list.

Further, in the fourth embodiment, the equalizing setting change procedure RT40 uses three setting patterns, namely, the first, second, and third equalizing settings in accordance with the number of music data Ad registered in each channel play list PL. However, the present invention is not limited to this. It is also practicable to use two or four patterns as required.

(6) Fifth Embodiment

Figure 56:
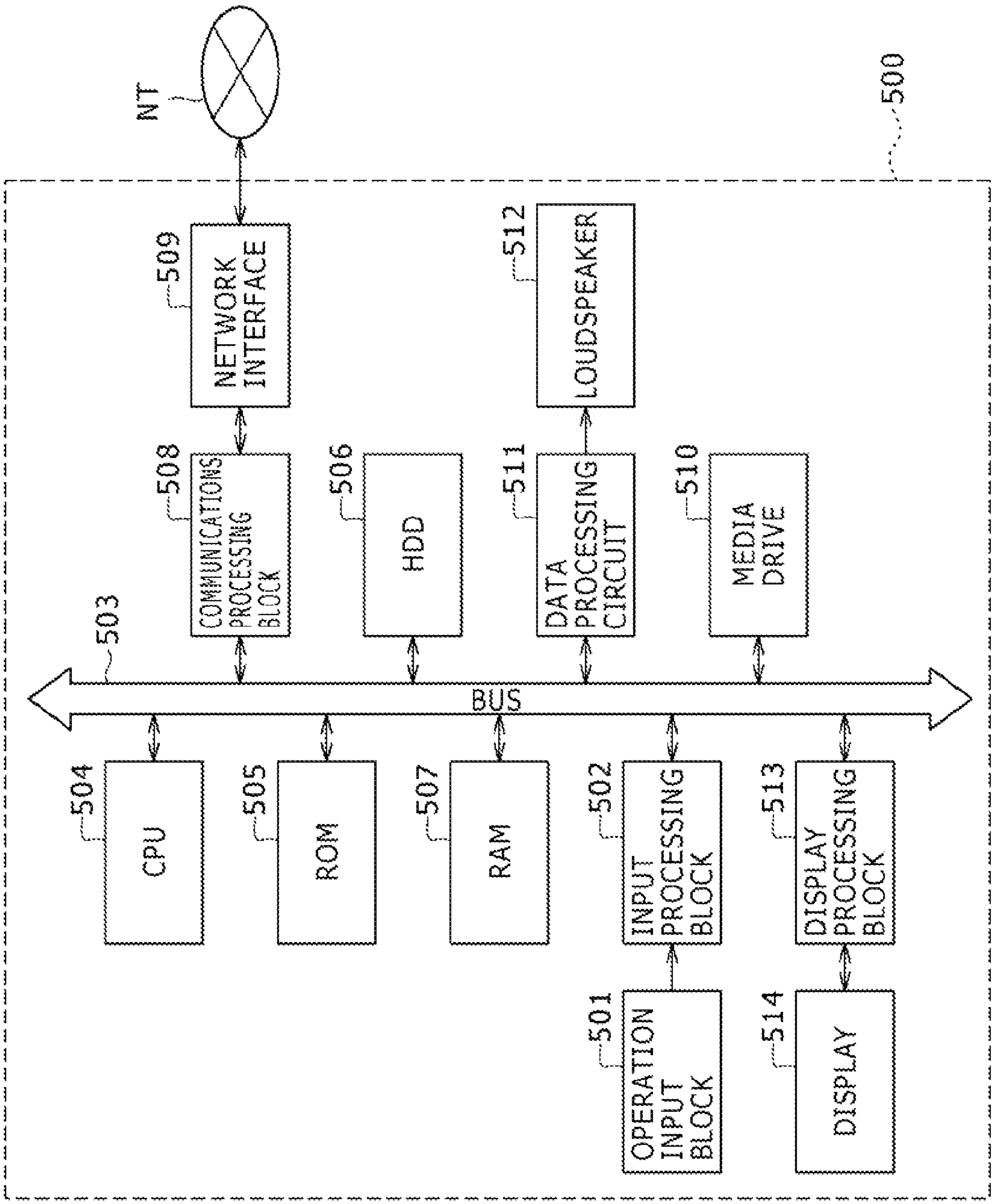
FIG. 56 is a block diagram illustrating an exemplary hardware configuration of a content reproducing apparatus practiced as a fifth embodiment of the invention.

The following describes a fifth embodiment of the invention. A content reproducing apparatus 500 shown in FIG. 56 is one example in which the content reproducing apparatus 1 having a functional block configuration of the above-mentioned basic configuration is realized in a hardware configuration. When an operation input block 501 made up of various operation buttons arranged on the housing of the content reproducing apparatus 500 and a remote controller, not shown, is operated by the user, the operation is recognized by the operation input block 501, which transmits a corresponding operation input signal to an input processing block 502. The input processing block 502 executes predetermined processing on the supplied operation input signal to convert this signal into an operation command, transmitting this command to a CPU (Central Processing Unit) 504 via a bus 503.

The CPU 504 reads programs, such as an operating system program and application programs from a ROM (Read Only Memory) 505 and a hard disk drive 506, for example, into a RAM (Random Access Memory) 507 via the bus 503. Then, the CPU 504 controls the entire content reproducing apparatus 500 as instructed by these programs developed in the RAM 507 and, at the same time, executes predetermined computational processing and various other processing operations in accordance with commands given through the input processing block 502.

For example, the CPU 504 accesses a music providing server, not shown, on a network NT through a communications processing block 508 and a network interface 509 in this order.

Then, when an operation input signal for requesting the downloading of music data desired by the user is entered by the user through the operation input block 501, the CPU 504 accordingly requests the music providing server for the downloading of the user-requested music data. Consequently, the CPU 504 downloads the requested music data from the music providing server through the network interface 509 and the communications processing block 508 in this order. Then, the CPU 504 stores the downloaded music data into the hard disk drive 506.

When an operation input signal for recording music data recorded to a recording media, such as a CD, is entered by the user through the operation input block 501, the CPU 504 reads the specified music data from the recording media through a media drive 510 and transmits the read music data to a data processing block 511. The data processing block 511 data-compresses the music data supplied from the media drive 510 and stores the compressed music data into the hard disk drive 506.

Further, when music data stored in the hard disk drive 506 is specified by the user through the operation input block 501 and an operation input signal for requesting reproduction is entered, the CPU 504 reads the specified music data from the hard disk drive 506 and transmits the read music data to the data processing block 511. The data processing block 511 decompresses the music data and executes equalizing, digital-to-analog conversion, and amplification on the decompressed music data, transmitting the resultant music data to a loudspeaker 512. Consequently, the sound (namely, the music) based on this music data is outputted from the loudspeaker 512.

The hard disk drive 506 stores a plurality of play lists. When one of these play lists is specified by the user through the operation input block 501 and an operation input signal for requesting the reproduction of music data in accordance with this play list is entered, the CPU 504 accordingly reads the specified play list from the hard disk drive 506.

Then, the CPU 504 reads the music data registered in this play lists from the hard disk drive 506 in the order indicated in the play list and transmits the read music data to the data processing block 511. The data processing block 511 decompresses the music data and executes equalizing, digital-to-analog conversion, and amplification on the music data and transmits the resultant music signal to the loudspeaker 512. Consequently, the sound (namely, the music) based on this music signal is outputted from the loudspeaker 512.

Further, the CPU 504 generates data for display indicative of the execution results of various programs (for example, downloading, recording, and reproduction of music data) and transmits the generated display data to a display processing block 513. The display processing block 513 displays a screen based on this display data onto a display 514.

It should be noted that the content reproducing apparatus 500 executes, through the CPU 504, various processing operations as instructed by various programs stored in the ROM 505 and the hard disk drive 506 in advance. Namely, in this content reproducing apparatus 500, various programs stored in the ROM 505 and the hard disk drive 506 are appropriately selected in accordance with various functions (namely, various processing operations to be executed) of the content reproducing apparatus 1 (FIG. 1) having the above-mentioned functional block configuration, thereby making the operation input block 501 and input processing block 502 function in substantially the same manner as the operation block 2 of the content reproducing apparatus 1 and the display 514 in substantially the same manner as the display block 4.

Further, the content reproducing apparatus 500 can make the CPU 504 and the display processing block 513 in substantially the same manner as the control block 3 of the content reproducing apparatus 1, the communications processing block 508 and the network interface 509 in substantially the same manner as the communications block 5, the hard disk drive 506 in substantially the same manner as the storage block 6, and the media drive 510, the data processing block 511, and the loudspeaker 512 in substantially the same manner as the reproducing block 7.

In addition, as for the functional blocks of the content reproducing apparatuses 100, 200, and 400, and the display control apparatus 300 based on the content reproducing apparatus 1 as the basic configuration, the content reproducing apparatus 500 can make these functional blocks function in substantially the same manner in the hardware configuration of the content reproducing apparatus 500. It should be noted that the temporary storage block 205 of the content reproducing apparatus 200 not used in the basic configuration of the content reproducing apparatus 1 may be implemented by the RAM 507 of the content reproducing apparatus 500.

Consequently, the content reproducing apparatus 500 can realize the functions (namely, the processing operations to be executed by the content reproducing apparatuses 1, 100, 200, and 400, and the display control apparatus 300) of the content reproducing apparatuses 1, 100, 200, and 400, and the display control apparatus 300 by the hardware configuration of the content reproducing apparatus 500, thereby achieving substantially the same effects as those provided by the above-described first through fourth embodiments.

It should be noted that, in the fifth embodiment, the CPU 504 realizes the functions of the content reproducing apparatus 1 and the content reproducing apparatuses 100, 200, and 400, and the display control apparatus 300 based on the content reproducing apparatus 1 as the basic configuration, as instructed by various programs stored in the ROM 505 or the hard disk drive 506; however, the present invention is not limited to this. It is also practicable to realize the functions of the content reproducing apparatus 1 and the content reproducing apparatuses 100, 200, and 400, and the display control apparatus 300 based on the content reproducing apparatus 1 as the basic configuration, as instructed by various programs recorded to a CD or a DVD (Digital Versatile Disc) and read by the CPU 504 therefrom, for example, or various programs installed from these recording media into the hard disk drive 506.

(7) Variations to the Fifth Embodiment

In the above-described first through fifth embodiments of the invention, music data of each music track is used for the content to be handled; however, the present invention is not limited to this. It is also practicable to use sound data of other than music tracks, video data, program data, and various other kinds of data for the content to be handled. It should also be noted that the embodiments of the present invention, as the content reproducing apparatus 1, the content reproducing apparatuses 100, 200, 400, and 500, and the display control apparatus 300, are widely applicable to personal computers, mobile phones, PDAs (Personal Digital Assistances), portable audio players, audio compos, DVD recorders, hard disk recorders, and various other content-handling devices.

In the first through fourth embodiments described above, the impression value of each music track obtained as a result of 12-tone analysis as a feature of each music track indicated in attribute information Ti; however, the present invention is not limited to this. It is also practicable to use, as a feature of each music track, those values which are obtained as a result of various other analysis methods, such as frequency analysis, or those music track impression values obtained by quantization by man.

As described above and according to the invention, the embodiments thereof are widely applicable to any content-handling devices including content reproducing apparatuses, such as audio players, that reproduce music data in accordance with play lists.

While preferred embodiments of the present invention have been described using specific terms, such description is for illustrative purpose only, and it is to be understood that changes and variations may be made without departing from the spirit or scope of the following claims.

What is claimed is:

1. A display control apparatus for controlling displaying of a play list, comprising:

a play list feature extraction block configured to, in conjunction with a processor, extract a numerical value from a play list based on a plurality of pieces of content belonging to said play list, said playlist specifying a reproduction sequence of the plurality of pieces of content;

a display pattern selection block configured to, in conjunction with the processor, select at least one of color and brightness for displaying said play list based on the numerical value; and a control block configured to, in conjunction with the processor, execute control such that said play list is displayed on a display device in accordance with the at least one of color and brightness selected by said display pattern selection block.

2. The display control apparatus according to claim 1, wherein said numerical value is a statistical value obtained based on content belonging to said play list.

3. The display control apparatus according to claim 2, wherein said statistical value is at least one of an amount of pieces of content belonging to said play list, a date on which a first piece of content was added to said play list, a date on which a last piece of content was added to said play list, and a reproduction frequency of content belonging to said play list.

4. The display control apparatus according to claim 3, wherein, when the amount of pieces of content belonging to said play list is no higher than a predetermined value, said control block causes said display block to display how many pieces of content must be added to said play list to reach the predetermined number of pieces of content belonging to said play list.

5. The display control apparatus according to claim 2, wherein said display pattern selection block selects the playlist as a do not display play list based on the numerical value.

6. The display control apparatus according to claim 1, wherein said play list extraction block extracts said numerical value from said play list on a basis of additional information included in said play list.

7. The display control apparatus according to claim 6, wherein said play list extraction block extracts said numerical value from said play list on a basis of a statistical value of said additional information.

8. The display control apparatus according to claim 1, further comprising a reproducing block configured to reproduce the content belonging to said play list in accordance with said play list.

9. The display control apparatus according to claim 8, wherein, upon selection of one of a plurality of play lists, said reproducing block starts reproducing content belonging to said play list from a feature position of said content.

10. The display control apparatus of claim 1, wherein the numerical value is equal to an amount of pieces of content belonging to said play list, and the display pattern selection block selects a brightness for displaying the play list based on whether the amount of pieces of content belonging to said play list is above or below a threshold value.

11. The display control apparatus of claim 1, wherein the numerical value is equal to an amount of pieces of content belonging to said play list, and the display pattern selection block selects a color for displaying the play list based on whether the amount of pieces of content belonging to said play list is above or below a threshold value.

12. The display control apparatus of claim 1, wherein the numerical value is equal to an amount of pieces of content belonging to said play list.

13. A non-transitory recording media configured to record a display control program in a computer-readable form, said display control program making a computer execute the steps of:

extracting a numerical value from a play list based on a plurality of pieces of content belonging to said play list, said play list specifying a reproduction sequence of said plurality of pieces of content;

selecting at least one of color and brightness for displaying said play list based on the numerical value; and executing control such that said play list is displayed on a display in accordance with the at least one of color and brightness selected in the selecting step.

14. A display control method comprising the steps of:

extracting a numerical value from a play list based on a plurality of pieces of content belonging to said play list, said play list specifying a reproduction sequence of said plurality of pieces of content;

selecting at least one of color and brightness for displaying said play list based on the numerical value; and executing control such that said play list is displayed on a display in accordance with the at least one of color and brightness selected in the selecting step.

15. A display control apparatus for controlling displaying of a play list, comprising:

means for extracting a numerical value from a play list based on a plurality of pieces of content belonging to said play list, said play list specifying a reproduction sequence of said plurality of pieces of content;

means for selecting at least one of color and brightness for displaying said play list based on the numerical value; and means for executing control such that said play list is displayed on a display in accordance with the at least one of color and brightness selected by the means for selecting.

* * * * *